United States Patent [19]
Kinugasa et al.

[11] Patent Number: 5,974,793
[45] Date of Patent: *Nov. 2, 1999

[54] EXHAUST GAS PURIFICATION DEVICE FOR AN INTERNAL COMBUSTION ENGINE

[75] Inventors: Yukio Kinugasa, Susono; Takaaki Itou, Mishima; Naoto Suzuki, Susono; Koichi Takeuchi, Susono; Hiroshi Tanaka, Susono; Naohide Fuwa, Susono, all of Japan

[73] Assignee: Toyota Jidosha Kabushiki Kaisha, Aichi-Ken, Japan

[ * ] Notice: This patent is subject to a terminal disclaimer.

[21] Appl. No.: 08/837,933

[22] Filed: Apr. 11, 1997

[30] Foreign Application Priority Data

Apr. 19, 1996 [JP] Japan .................................. 8-098705
Sep. 19, 1996 [JP] Japan .................................. 8-248069

[51] Int. Cl.⁶ ...................................................... F01N 3/00
[52] U.S. Cl. ................................ 60/285; 60/286; 60/301; 60/278
[58] Field of Search .............................. 60/278, 285, 286, 60/287, 301; 423/237, 213.7, 213.5

[56] References Cited

U.S. PATENT DOCUMENTS

| | | |
|---|---|---|
| 3,767,764 | 10/1973 | Dolbear . |
| 4,395,875 | 8/1983 | Virk . |
| 4,467,602 | 8/1984 | Iisuzka et al. . |
| 4,854,123 | 8/1989 | Inoue . |
| 5,021,227 | 6/1991 | Kobayashi et al. . |
| 5,207,058 | 5/1993 | Sasaki et al. . |
| 5,367,875 | 11/1994 | Aboujaoude et al. . |
| 5,406,790 | 4/1995 | Hirota et al. . |
| 5,410,873 | 5/1995 | Tashiro . |
| 5,419,121 | 5/1995 | Sung et al. ................................ 60/274 |
| 5,461,857 | 10/1995 | Itou et al. . |
| 5,473,887 | 12/1995 | Takeshima et al. ...................... 60/276 |
| 5,479,775 | 1/1996 | Kraemer et al. . |
| 5,540,047 | 7/1996 | Dahlheim et al. . |
| 5,551,231 | 9/1996 | Tanaka et al. . |

(List continued on next page.)

FOREIGN PATENT DOCUMENTS

| | | |
|---|---|---|
| 333034 | 3/1985 | Germany . |
| 4-365920 | 12/1992 | Japan . |
| 93/07363 | 4/1993 | Japan . |
| 5-131118 | 5/1993 | Japan . |
| 6-108827 | 4/1994 | Japan . |
| 6-330741 | 11/1994 | Japan . |
| 8-4522 | 1/1996 | Japan . |

OTHER PUBLICATIONS

SAE 920469, "'Catalytic Engine' $NO_x$ Reduction of Diesel Engines with New Concept Onboard Ammonia Synthesis System", Masaaki Takiguchi, et al. May 14, 1992.

Primary Examiner—F. Daniel Lopez
Assistant Examiner—Binh Tran
Attorney, Agent, or Firm—Kenyon & Kenyon

[57] ABSTRACT

In an exhaust gas purification device, a No. 1 cylinder of the engine is operated at a rich air-fuel ratio and other cylinders (No. 2 to No. 4) are operated at a lean air-fuel ratio. The exhaust gases from the No. 1 and No. 2 cylinders are mixed with each other to form a rich air-fuel ratio exhaust gas mixture. Further, since the air-fuel ratio of the No. 2 cylinder is lean, the exhaust gas from the No. 2 cylinder contains a relatively large amount of $NO_x$. This rich air-fuel ratio exhaust gas mixture which contains a relatively large amount of $NO_X$ is supplied to a three-way catalyst. At the three-way catalyst, part of the $NO_X$ in the exhaust gas mixture is converted to $NH_3$. The exhaust gas mixture flowing out from the three-way catalyst and the lean exhaust gas from the No. 3 and No. 4 flow into a common exhaust gas passage where they mix with each other to form a lean exhaust gas containing $NH_3$ from the three-way catalyst and $NO_X$ from the No. 3 and No. 4 cylinders. This lean exhaust gas flows into a denitrating catalyst disposed on the common exhaust gas passage in which $NO_X$ in the exhaust gas is reduced by the $NH_3$.

15 Claims, 27 Drawing Sheets

U.S. PATENT DOCUMENTS

| | | |
|---|---|---|
| 5,605,042 | 2/1997 | Stutzenberger . |
| 5,609,026 | 3/1997 | Berriman et al. . |
| 5,628,186 | 5/1997 | Schmelz . |
| 5,661,971 | 9/1997 | Waschatz et al. . |
| 5,740,669 | 4/1998 | Kinugasa et al. . |
| 5,746,052 | 5/1998 | Kinugasa et al. . |
| 5,778,667 | 7/1998 | Kinugasa et al. ........................ 60/286 |
| 5,782,087 | 7/1998 | Kinugasa et al. . |
| 5,783,160 | 7/1998 | Kinugasa et al. . |
| 5,802,845 | 9/1998 | Abe et al. ................................ 60/274 |
| 5,826,425 | 10/1998 | Sebastiano et al. . |

EXHAUST GAS PURIFICATION DEVICE FOR AN INTERNAL COMBUSTION ENGINE

BACKGROUND OF THE INVENTION

1. Field of the Invention

The present invention relates to an exhaust gas purification device for an internal combustion engine. More specifically, the invention relates to a device which is capable of removing $NO_X$ components in the exhaust gas from a lean burn engine at a high efficiency.

2. Description of the Related Art

An exhaust gas purification device utilizing a three-way reducing and oxidizing catalyst (hereinafter referred to as a "three-way catalyst") is commonly used for removing HC, CO and $NO_X$ components from the exhaust gas of an internal combustion engine (in this specification, the term $NO_X$ means a nitrogen oxide such as NO, $NO_2$, $N_2O$ and $N_2O_4$ in general). The three-way catalyst is capable of oxidizing HC and CO components, and reducing $NO_X$ components in the exhaust gas, when the air-fuel ratio of the exhaust gas is the stoichiometric air-fuel ratio. Namely, the three-way catalyst is capable of removing these harmful components from exhaust gas simultaneously when the air-fuel ratio of the exhaust gas is the stoichiometric air-fuel ratio.

However, the ability of the three-way catalyst for reducing $NO_X$ components becomes lower as the air-fuel ratio of the exhaust gas becomes lean (i.e., as the air-fuel ratio becomes higher than the stoichiometric air-fuel ratio). Therefore, it is difficult to remove $NO_X$ components in the exhaust gas from a lean burn engine which is operated at, as a whole, a lean air-fuel ratio using a three-way catalyst.

To solve this problem, Japanese Unexamined Patent Publication (Kokai) No. 4-365920 discloses an exhaust gas purification device utilizing a denitrating reaction.

When the air-fuel ratio of the exhaust gas is lower than the stoichiometric air-fuel ratio (i.e., when the air-fuel ratio of the exhaust gas is rich), the three-way catalyst converts a portion of $NO_X$ in the exhaust gas to $NH_3$ while reducing most of $NO_X$ in the exhaust gas and converting it into $N_2$. The device in the '920 publication produces $NH_3$ from $NO_X$ in the exhaust gas using a three-way catalyst, and reacts the produced $NH_3$ with the $NO_X$ components in the exhaust gas to reduce $NO_X$ to $N_2$ and $H_2O$ by a denitrating reactions.

In the '920 publication, a multiple-cylinder internal combustion engine is used, and a group of cylinders of the engine are operated at a rich air-fuel ratio while other cylinders are operated at a lean air-fuel ratio. Further, a three-way catalyst having a high capability for converting $NO_X$ to $NH_3$ is disposed in an exhaust gas passage connected to the rich air-fuel ratio cylinders. After it flows through the three-way catalyst, the exhaust gas from the rich air-fuel ratio cylinders mixes with the exhaust gas from the lean air-fuel ratio cylinders. Since, when the exhaust gas from the rich air-fuel ratio cylinders flows through the three-way catalyst, a portion of $NO_X$ components in the exhaust gas is converted to an $NH_3$ component, the exhaust gas downstream of the three-way catalyst contains a relatively large amount of $NH_3$. On the other hand, the exhaust gas from the lean air-fuel ratio cylinders contains a relatively large amount of $NO_X$. Therefore, by mixing the exhaust gas from the three-way catalyst and the exhaust gas from the lean air-fuel ratio cylinders, $NH_3$ in the exhaust gas from the three-way catalyst reacts with the $NO_X$ components in the exhaust gas from the lean air-fuel ratio cylinder, and $NH_3$ and $NO_X$ components produce $N_2$ and $H_2O$ by a denitrating reaction.

Thus, according to the device in the '920 publication, the $NO_X$ components are removed from the exhaust gas.

In the device in the '920 publication, it is required that the amount of $NH_3$ produced by the three-way catalyst is sufficient for reducing all the amount of $NO_X$ in the exhaust gas from the lean air-fuel ratio cylinders. For example, the greatest part of $NO_X$ in the exhaust gas discharged from the engine is composed of NO (nitrogen monoxide) and $NO_2$ (nitrogen dioxide) components. These NO and $NO_2$ components react with $NH_3$ and produce $N_2$ and $H_2O$ by the following denitrating reaction.

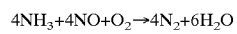

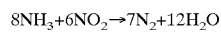

Therefore, in the device in the '920 publication, an amount of $NH_3$ which equals to a total of the number of moles of NO and ⅔ times the number of moles of $NO_2$ is required to remove all of $NO_X$ component in the exhaust gas from the lean air-fuel ratio cylinders. When the exhaust gas contains other $NO_X$ components such as $N_2O_4$, $N_2O$ components, the amount of $NH_3$ stoichiometrical to the amount of these components is required in addition to the above noted amount on $NH_3$.

However, the amount of $NO_X$ produced in the cylinders of the engine becomes the maximum when the cylinders are operated at a lean air-fuel ratio (for example, at an air-fuel ratio about 16), and decreases rapidly when the cylinders are operated at a rich air-fuel ratio. Since the device in the '920 publication converts $NO_X$ in the exhaust gas of the rich air-fuel ratio cylinder to produce $NH_3$, the amount of $NH_3$ obtained is limited by the amount of $NO_X$ produced in the rich air-fuel ratio cylinders. Therefore, in the device of the '920 publication, the amount of $NH_3$ produced by the three-way catalyst is not sufficient to reduce all the amount of $NO_X$ in the exhaust gas from the lean air-fuel ratio cylinders, and a part of $NO_X$ in the exhaust gas from the lean air-fuel ratio cylinder is released to the atmosphere without being reduced.

SUMMARY OF THE INVENTION

In view of the problems in the related art as set forth above, the object of the present invention is to provide an exhaust gas purification device for an internal combustion engine which is capable of removing $NO_X$ in the exhaust gas of a lean burn engine at a high efficiency by producing a sufficient amount of $NH_3$ from exhaust gas and removing $NO_X$ from the exhaust gas by reacting $NH_3$ and $NO_X$ in the exhaust gas.

This object is achieved by the exhaust gas purification device according to the present invention in which the device comprises conversion means for converting at least a part of the $NO_X$ components contained in the exhaust gas to $NH_3$ when the air-fuel ratio of the exhaust gas supplied to the conversion means is rich, $NO_X$ purification means disposed on an exhaust gas passage of the engine for causing the $NO_X$ components in the exhaust gas of the engine to react with $NH_3$ produced by the conversion means and causing the $NO_X$ components to be reduced to $N_2$ by $NH_3$ and $NO_X$ increasing means for adjusting the air-fuel ratio of the exhaust gas supplied to the conversion means at a rich air-fuel ratio and, at the same time, increasing the concentration of the $NO_X$ components in the exhaust gas supplied to the conversion means to a value higher than the normal concentration of $NO_X$ components in the exhaust gas of the engine where the engine is normally operated at an air-fuel ratio the same as that of the exhaust gas adjusted by the $NO_X$ increasing means.

In the present invention, conversion means such as a three-way catalyst is used to convert $NO_X$ in the exhaust gas to $NH_3$. Further, in order to produce a sufficient amount of $NH_3$ by the conversion means to reduce all the amount of $NO_X$ produced by the lean air-fuel ratio cylinders, the concentration of $NO_X$ (i.e., the raw material of $NH_3$) in the exhaust gas supplied to the conversion means is increased.

In order to increase the concentration of $NO_X$ in the exhaust gas supplied to the conversion means, the following methods, for example, can be used in the present invention.

(1) Adding a portion of the exhaust gas from the lean air-fuel ratio cylinders to the exhaust gas from the rich air-fuel ratio cylinders to form an exhaust gas mixture having a rich air-fuel ratio as a whole. Since the exhaust gas from the lean air-fuel ratio contains a higher concentration of $NO_X$ than the exhaust gas from rich air-fuel ratio cylinders, the concentration of $NO_X$ in the exhaust gas mixture becomes higher than that in the exhaust gas from the rich air-fuel ratio cylinders.

(2) Increasing the amount of $NO_X$ produced by the lean rich air-fuel ratio cylinders so that the $NO_X$ in the exhaust gas from the rich air-fuel ratio cylinders increases.

Namely, according to one aspect of the present invention, there is provided an exhaust gas purification device as set forth above, wherein at least some of the cylinders of the engine are operated at a rich air-fuel ratio and at least some of the cylinders of the engine can be operated at a lean air-fuel ratio at the same time, and wherein the $NO_X$ increasing means comprises mixing means for mixing the exhaust gas from the rich air-fuel ratio cylinders and the exhaust gas from the lean air-fuel ratio cylinders to form a rich air-fuel ratio exhaust gas mixture to be supplied to the conversion means.

The term "at least some of the cylinders of the engine are operated at a rich air-fuel ratio and at least some of the cylinders of the engine can be operated at a lean air-fuel ratio at the same time" means that an operating condition of the engine exists in which some cylinders of the engine are operated at a rich air-fuel ratio and other cylinders of the engine are operated at a lean air-fuel ratio simultaneously.

According to this aspect of the invention, since a part of exhaust gas from the lean air-fuel ratio cylinders which contain a relatively high concentration of $NO_X$ is mixed to the exhaust gas from the rich air-fuel ratio cylinders to form an exhaust gas mixture having a rich air-fuel ratio, the concentration of $NO_X$ in the exhaust gas mixture becomes higher than the concentration of $NO_X$ in the exhaust gas obtained by operating the cylinders at the air-fuel ratio same as the exhaust gas mixture. Therefore, the amount of $NH_3$ produced by the conversion means increases.

Further, according to another aspect of the present invention, there is provided an exhaust gas purification device as set forth above, wherein the engine is a lean burn engine in which at least some of the cylinders of the engine are operated at a rich air-fuel ratio at least during a certain period of operation, and wherein the $NO_X$ increasing means comprises $NO_X$ production promoting means for increasing the amount of $NO_X$ produced in the rich air-fuel ratio cylinders and supplies the $NO_X$-enriched exhaust gas from the rich air-fuel ratio cylinders to the conversion means.

The term "the engine is a lean burn engine in which at least some of the cylinders of the engine are operated at a rich air-fuel ratio at least during a certain period of operation" includes the following three type of engines (a)–(c):

(a) Some cylinders are always operated at a lean air-fuel ratio and other cylinders are always operated at a rich air-fuel ratio, and the average of the air-fuel ratio of all the cylinders is lean.

(b) In the engine of above (a) cylinders to be operated at a rich air-fuel ratio are switched sequentially and, during a certain period, all the cylinders of the engine experience the rich air-fuel ratio operation.

(c) In the normal operation, all the cylinders of the engine are operated at a lean air-fuel ratio, and some cylinders (or all the cylinders) are operated at a rich air-fuel ratio during a specific period.

According to this aspect of the invention, since the amount of $NO_X$ produced by the rich air-fuel ratio cylinders itself is increased, an exhaust gas having a rich air-fuel ratio and containing a relatively high concentration of $NO_X$ is supplied to the conversion means. Therefore, the amount of $NH_3$ produced by the conversion means increases.

BRIEF DESCRIPTION OF THE DRAWINGS

The present invention will be better understood from the description as set forth hereinafter, with reference to the accompanying drawings in which.

DESCRIPTION OF THE PREFERRED EMBODIMENT

Hereinafter, embodiments of the present invention will be explained in detail with reference to the accompanying drawings. In the following description, two types of embodiments of the present invention are explained. Namely, FIGS. 1 through 14 illustrate embodiments in which the concentration of $NO_X$ supplied to the conversion means is increased by mixing the exhaust gas from the rich air-fuel ratio cylinder and the exhaust gas from the lean air-fuel ratio cylinders, and FIGS. 15 through 27 illustrate embodiments in which the concentration of $NO_X$ in the exhaust gas supplied to the conversion means is increased by increasing the amount of $NO_X$ produced by the rich air-fuel ratio cylinders.

Figure 1:
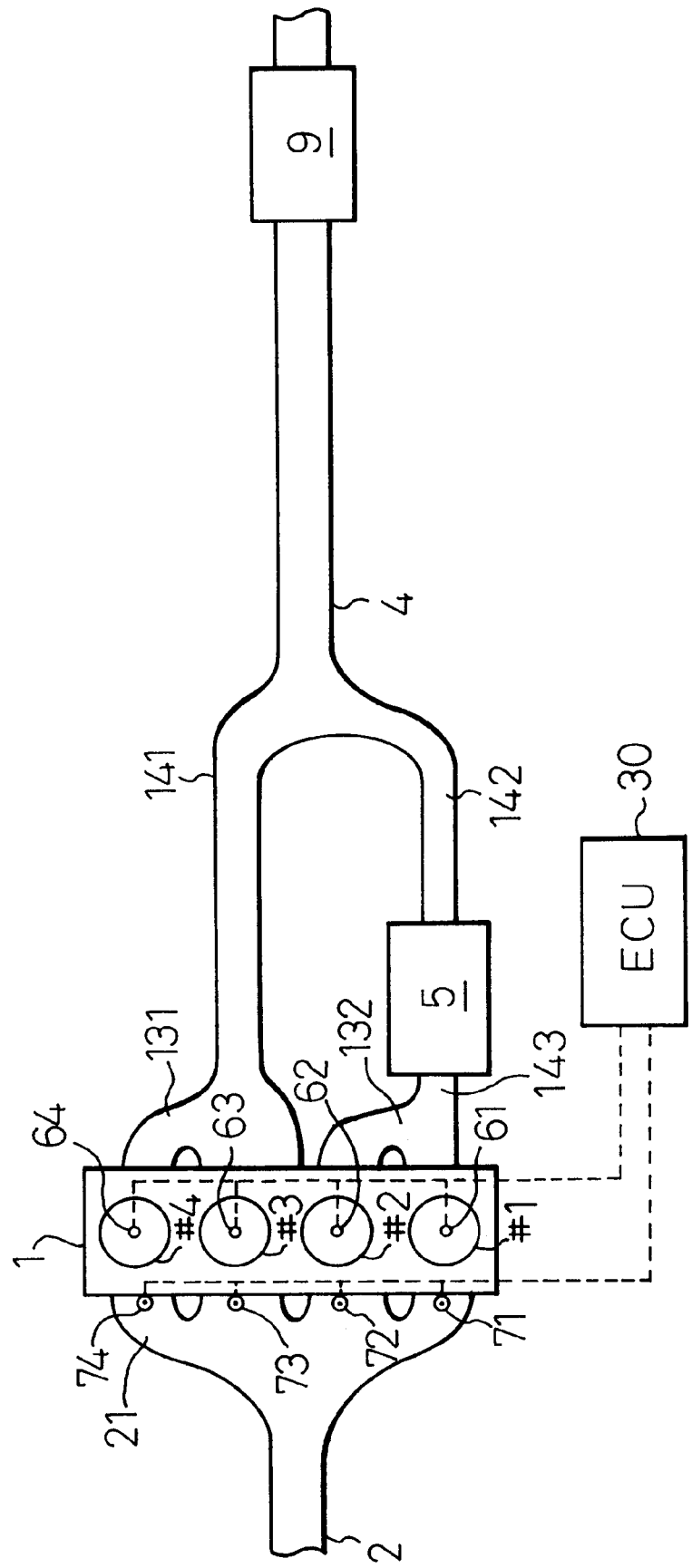
FIG. 1 schematically illustrates the general configuration of an embodiment of the exhaust gas purification device according to the present invention.

FIG. 1 shows the general configuration of an embodiment of the present invention when it is applied to a vehicle engine. In FIG. 1, reference numeral 1 designates a multiple-cylinder type internal combustion engine for an automobile. In this embodiment, the engine 1 is a 4-cylinder engine having No. 1 through No. 4 cylinders. As explained later, in this embodiment, No. 1 cylinder of the engine 1 is always operated at a rich air-fuel ratio (for example, an excess air ratio ($\lambda$) about 0.87) and the No. 2 cylinder is operated at a lean air-fuel ratio (for example, $\lambda \approx 1.03$). The other cylinders (No. 3 and No. 4 cylinders) are operated at a air-fuel ratio higher than the No. 2 cylinder (for example, $\lambda \approx 1.3-1.4$).

In FIG. 1, the exhaust ports of the No. 1 and No. 2 cylinder are connected to a common exhaust gas passage 143 via an exhaust manifold 132. Namely, the exhaust gas from the No. 1 cylinder (i.e., the rich air-fuel ratio cylinder) is mixed with the exhaust gas from the No. 2 cylinder (i.e., the lean air-fuel ratio cylinder) and forms an exhaust gas mixture having a rich air-fuel ratio in the exhaust gas passage 143. The exhaust gases from the lean air-fuel ratio cylinders (No. 3 and No. 4 cylinder) are directed to a common exhaust gas passage 141 via an exhaust manifold 131. As shown in FIG. 1, a three-way catalyst 5 which acts as the conversion means is disposed on the passage 143.

Further, the exhaust gas passage 142 downstream of the three-way catalyst merges with the exhaust gas passage 141 from the lean air-fuel ratio cylinders No. 3 and No. 4 to form a main exhaust gas passage 4. Further, on the main exhaust gas passage 4, a denitrating catalyst 9, which acts as the $NO_X$ purification means, is disposed. The denitrating catalyst 9 will be explained later in detail.

In FIG. 1, reference numeral 21 designates an intake manifold which connects the intake ports of the respective cylinders No. 1 to No. 4 to a common intake air passage 2. Numeral 71 to 74 designate fuel injection valves disposed on the intake manifold 21 near the respective intake ports of the cylinders. Numeral 61 to 64 in FIG. 1 designate spark plugs disposed on the respective cylinders No. 1 to No. 4 which produce spark in the cylinders in accordance with the ignition signal sent from an electronic control circuit 30 of the engine.

The electronic control circuit (ECU) 30 consists of, for example, a micro computer which comprises a RAM, a ROM, a CPU and input and output ports connected each other by a bi-directional bus. The control circuit 30 performs control of the engine 1 such as a fuel injection control and an ignition timing control.

In this embodiment, the exhaust gas mixture formed by adding the lean air-fuel ratio exhaust gas from the No. 2 cylinder (lean air-fuel ratio cylinder) to the rich air-fuel ratio exhaust gas from the No. 1 cylinder (rich air-fuel ratio cylinder) is supplied to the three-way catalyst 5 to, thereby convert $NO_X$ in the exhaust gas mixture to $NH_3$. The $NH_3$ formed by the three-way catalyst 5 is supplied to the denitrating catalyst 9 to reduce $NO_X$ in the exhaust gas from the No. 3 and No. 4 cylinders in the denitrating catalyst 9.

Next, the three-way catalyst 5 and the denitrating catalyst 9 in this embodiment are explained.

The three-way catalyst 5 uses, for example, a honeycomb type substrate made of cordierite, and a thin alumina layer which acts as a carrier for the catalyst is coated on the surface of the substrate. On this carrier, precious metals such as platinum Pt, rhodium Rh, and palladium Pd are carried. The three-way catalyst 5 converts HC, CO, $NO_X$ in the exhaust gas at a high efficiency when the air-fuel ratio of exhaust gas is the stoichiometric air-fuel ratio (i.e., excess air ratio $\lambda=1.0$). The conversion rates of HC and CO become higher than that of the stoichiometric air-fuel ratio when the air-fuel ratio becomes lean ($\lambda>1.0$). Conversely, the conversion rate of $NO_X$ becomes higher than that of the stoichiometric air-fuel ratio when the air-fuel ratio becomes rich ($\lambda<1.0$).

As stated before, most of the $NO_X$ in the exhaust gas from the engine 1 consists of NO. When $\lambda$ is smaller than 1.0 (i.e., when the air-fuel ratio of the exhaust gas is rich), a part of this NO is converted by the three-way catalyst 5 by reducing reactions

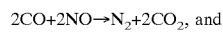

$2CO+2NO \rightarrow N_2+2CO_2$, and

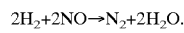

$2H_2+2NO \rightarrow N_2+2H_2O$.

However remaining part of NO is converted to $NH_3$ by the reaction

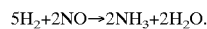

$5H_2+2NO \rightarrow 2NH_3+2H_2O$.

The conversion rate of NO to $N_2$ becomes higher as the amount of rhodium Rh contained in the three-way catalyst increases, and the conversion rate of NO to $NH_3$ becomes lower accordingly. As explained later, since this embodiment uses $NH_3$ to reduce $NO_X$ in the exhaust gas from the exhaust gas passage 141 at the denitrating catalyst 9, the three-way catalyst 5 is required to produce a sufficient amount of $NH_3$ to reduce all the $NO_X$ in the exhaust gas. Therefore, the three-way catalyst 5 in this embodiment contains a relatively small amount of rhodium Rh and a relatively large amount of other precious metal such as palladium Pd as the catalytic components to increase the conversion rate of $NO_X$ to $NH_3$.

Figure 2:
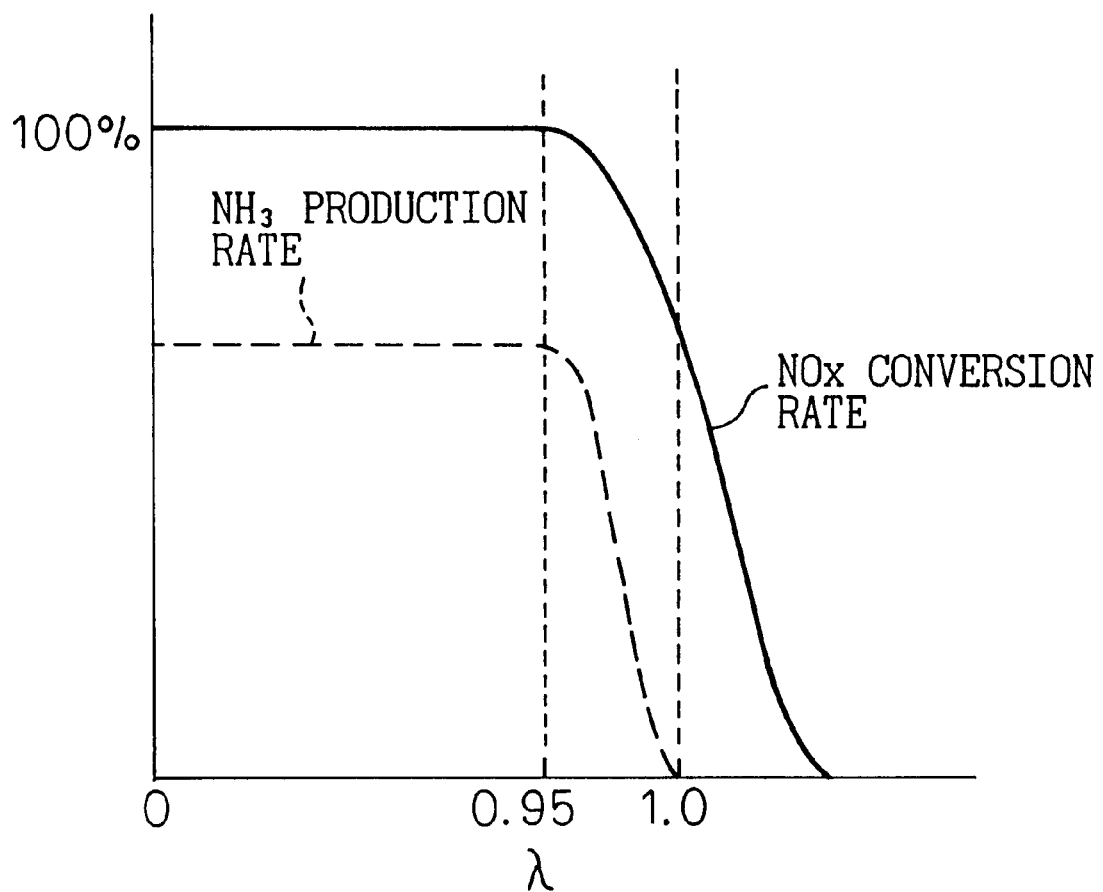
FIG. 2 is a graph showing typical changes in total conversion efficiency of $NO_X$ and a ratio of $NO_X$ converted to $NH_3$ to the total amount of converted $NO_X$.

FIG. 2 shows the changes in the total conversion rate of $NO_X$ (i.e., the ratio of the amount of $NO_X$ converted to $N_2$ and $NH_3$ to the amount of $NO_X$ flowing into the catalyst) and the production rate of $NH_3$ (i.e., the ratio of the amount of $NO_X$ converted to $NH_3$ to the amount of $NO_X$ flowing into the catalyst) of the three-way catalyst 5 in accordance with the change in the air-fuel ratio of the exhaust gas. As can be seen from FIG. 2, the total conversion rate of $NO_X$ (the solid line in FIG. 2) rapidly decreases as the air-fuel ratio of the exhaust gas becomes larger than the stoichiometric air-fuel ratio ($\lambda=1.0$). Therefore, when the exhaust gas flowing into the three-way catalyst 5 becomes lean ($\lambda>1.0$), the amount of $NO_X$ passes through the three-way catalyst 5 without being converted to $N_2$ and $NH_3$ rapidly increases.

Conversely, when the air-fuel ratio becomes rich, the total conversion rate of $NO_X$ increases and becomes almost 100% when the excess air ratio $\lambda$ of the exhaust gas is smaller than approximately 0.95. Therefore, when the excess air ratio of the exhaust gas is smaller than 0.95, all of the $NO_X$ in the exhaust gas flowing into the catalyst 5 is converted to $N_2$ and $NH_3$, and the exhaust gas flowing out from the catalyst 5 does not contain $NO_X$.

The production rate of $NH_3$ (the broken line in FIG. 2) is almost zero when the air-fuel ratio of the becomes larger than the stoichiometric air-fuel ratio. However, in the region $\lambda<1.0$, the production rate of $NH_3$ increases as the excess air ratio $\lambda$ decreases, and becomes substantially constant in the region where $\lambda \leq 0.95$. Therefore, when the excess air ratio of the exhaust gas is in the region $\lambda \leq 0.95$, all of the $NO_X$ is converted to $N_2$ and $NH_3$ and, further, the production rate of $NH_3$ becomes a maximum.

Next, the denitrating catalyst 9 in this embodiment is explained.

The denitrating catalyst in the embodiments of the present invention uses, for example, a honeycomb type substrate made of cordierite, and an alumina layer which act as a carrier for the catalyst is coated on the cell surface of the honeycomb substrate. On this carrier, at least one substance selected from elements belong to the fourth period or the eighth group in the periodic table of elements, such as copper (Cu), chrome (Cr), vanadium (V), titanium (Ti), iron (Fe), nickel (Ni), cobalt (Co), platinum (Pt), palladium (Pd), rhodium (Rh) and iridium (Ir) are carried as a catalyst.

The denitrating catalyst is capable of converting all the $NH_3$ in the exhaust gas flowing into the denitrating catalyst to $N_2$ provided that the exhaust gas is in an oxidizing atmosphere and the temperature of the catalyst is within a specific temperature range as determined by the substance being used as the catalyst. Namely, when the temperature of the denitrating catalyst 9 is in the specific temperature range and the exhaust gas flowing into the catalyst is oxidizing atmosphere, the denitrating reactions

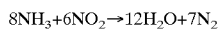

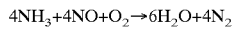

occur in the denitrating catalyst, in addition to the oxidizing reactions

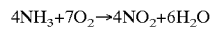

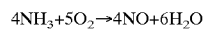

Due to these denitrating reactions, the $NO_X$ components produced by the oxidizing reactions are immediately converted to the $N_2$ component. As a result, of this sequential reactions, all of the $NH_3$ flowing into the denitrating catalyst 9 is converted to $N_2$.

Further, if the exhaust gas contains $NO_X$ in addition to $NH_3$, $NO_X$ is reduced by the above-explained denitrating reactions to $N_2$. In this case, if the amount of $NH_3$ in the exhaust gas is larger than the amount required to reduce all the $NO_X$ contained in the exhaust gas, surplus $NH_3$ is converted to $N_2$ by the above-explained sequential oxidizing and denitrating reactions and does not pass through the denitrating catalyst 9. Further, if HC and CO are contained in the exhaust gas in addition to $NH_3$, HC and CO are oxidized by the denitrating catalyst 9 and do not pass through the denitrating catalyst provided that the excess air ratio of the exhaust gas is larger than 1.0.

The specific temperature range explained above varies in accordance with the substance used as the catalyst. However, the specific temperature range of the denitrating catalyst is generally lower than the temperature range where other catalysts such as the three-way catalyst is used. For example, the specific temperature range is approximately 100° C.–400° C. when the substance such as platinum (Pt), palladium (Pd), rhodium (Rh) are used as the catalyst. More specifically, when platinum (Pt) is used, a temperature range 100° C.–300° C. is more preferable, and a temperature range 150° C. to 250° C. is most preferable. When palladium (Pd) and rhodium (Rh) are used, a temperature range 150° C.–400° C. is more preferable, and a temperature range 150° C. to 300° C. is most preferable. Further, when substances such as copper (Cu), chrome (Cr) and iron (Fe) are used, the specific temperature range is approximately 150° C.–650° C., and a temperature range 150° C.–500° C. is preferable.

When the temperature of the denitrating catalyst is above the specific temperature range, the oxidizing reactions become dominant in the catalyst and the portions of $NH_3$ which is oxidized by the catalyst increases. Thus, the denitrating reactions hardly occur in the catalyst due to the shortage of $NH_3$ in the exhaust gas, and the $NO_X$ produced by the oxidizing reactions flows out from the denitrating catalyst without being reduced by the denitrating reactions.

On the other hand, when the temperature of denitrating catalyst is below the specific temperature range, the oxidizing reactions hardly occur due to the low temperature. This causes the $NH_3$ in the exhaust gas to pass through the denitrating catalyst without being oxidized due to the shortage of $NO_X$ produced by the oxidizing reactions.

In the embodiment in FIG. 1, since the exhaust gas of $\lambda=0.87$ from the No. 1 cylinder and the exhaust gas of $\lambda=1.03$ from the No. 2 cylinder are mixed, the excess air ratio of the exhaust gas mixture flowing into the three-way catalyst 5 from the exhaust gas passage 143 becomes 0.95, i.e., the mean value of 0.87 and 1.03. Therefore, $NO_X$ contained in the exhaust gas mixture is all converted to $N_2$ and $NH_3$ and, in addition to that, the production rate of $NH_3$ becomes the maximum. Thus, the exhaust gas flows into the exhaust gas passage 142 downstream of the three-way catalyst 5 contains the maximum amount of $NH_3$, but does not contain $NO_X$.

In this embodiment, since the No. 3 and No. 4 cylinders are operated at a lean air-fuel ratio ($\lambda=1.30$–1.40), the exhaust gas flows through the exhaust gas passage 141 has an excess air ratio larger than 1.0 and contains a relatively large amount of $NO_X$. This lean exhaust gas from the passage 141 mixes with the rich exhaust gas from the passage 142 in the main exhaust gas passage 4. In this embodiment, the average excess air ratio of the rich air-fuel ratio cylinder (No. 1 cylinder) and the lean air-fuel ratio cylinders (No. 2 through No. 4 cylinders), i.e., the excess air ratio of the engine 1 as a whole, is larger than 1.0 (lean). Therefore, the exhaust gas flows into the denitrating catalyst 9 from the main exhaust gas passage 4 has an excess air ratio larger than 1.0 and contains both $NO_X$ and $NH_3$. Further, the length of the exhaust gas passages 141, 143 and 4 are determined in such a manner that the temperature of the exhaust gas flowing into the denitrating catalyst 9 is within the specific temperature of the denitrating catalyst 9 (alternatively, positive cooling means such as cooling fins or a water cooling jacket may be provided on the wall of the exhaust gas passages to adjust the temperature of the exhaust gas).

Therefore, in this embodiment, the exhaust gas of an oxidizing atmosphere and in the specific temperature range of the denitrating catalyst 9 containing both $NO_X$ and $NH_3$ flows into the denitrating catalyst 9, and $NO_X$ and $NH_3$ in the exhaust gas are simultaneously converted to $N_2$ and $H_2O$. Further, HC and CO contained in the exhaust gas are oxidized on the denitrating catalyst 9. Therefore, the exhaust gas downstream of the denitrating catalyst 9 in this embodiment does not contain $NO_X$ and $NH_3$ as well as HC and CO.

Next, the reason why the rich exhaust gas of $\lambda=0.87$ (No. 1 cylinder) and the lean exhaust gas of $\lambda=1.03$ are mixed to form the rich exhaust gas mixture of $\lambda=0.95$ is explained with reference to FIG. 3.

Figure 3:
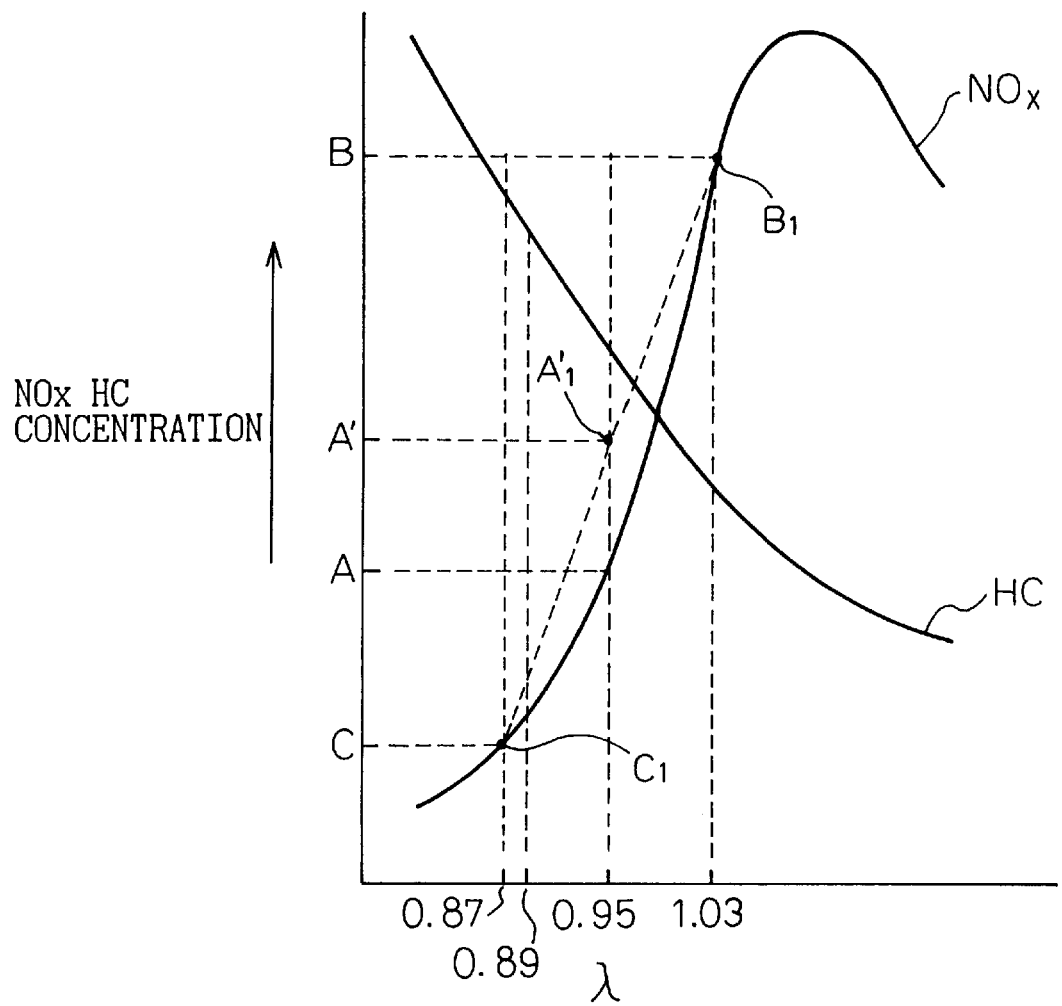
FIG. 3 is a graph showing typical changes of the amounts of $NO_X$ and HC produced in the cylinders in accordance with the change in the excess air ratio of the combustion in the cylinders.

FIG. 3 is a graph showing a typical changes in the concentrations of HC and $NO_X$ in the exhaust gas from the cylinders of the engine in accordance with the change in the excess air ratio of the cylinders. As shown in FIG. 3, the concentration of $NO_X$ in the exhaust gas increases as the excess air ratio $\lambda$ becomes larger, and reaches its maximum value at an excess air ratio $\lambda$ around 1.1 and, in the region $\lambda>1.1$, the concentration of $NO_X$ decreases as the excess air ratio $\lambda$ increases. Further, the rate of increase in the concentration with respect to the excess air ratio $\lambda$ (i.e., the inclination of the curve in FIG. 3) is relatively small when the excess air ratio $\lambda$ is smaller than 0.85. The rate of increase becomes larger as the excess air ratio $\lambda$ becomes larger and, becomes very large at an excess air ratio around 1.0. Namely, as can be seen from FIG. 3, the curve representing the concentration of $NO_X$ bulges downward in the region $\lambda \leq 1.0$.

On the other hand, the concentration of HC in the exhaust gas decreases almost uniformly as the excess air ratio $\lambda$ becomes larger and, in the region $\lambda \leq 1.05$, the curve representing the concentration of HC slightly bulges downward but is almost linear. In FIG. 3, A represents the concentration of $NO_X$ in the exhaust gas when the cylinder is operated at an excess air ratio $\lambda 0.95$ (i.e., when the excess air ratio of the exhaust gas is 0.95), and B and C represent the concentrations of $NO_X$ when the excess air ratio $\lambda$ of the exhaust gas is 1.03 and 0.87, respectively. As in the embodiment in FIG. 1, when the exhaust gas of $\lambda=1.03$ (the exhaust gas from No. 2 cylinder) and the exhaust gas of $\lambda=0.87$ (the exhaust gas from No. 1 cylinder) are mixed, the excess air ratio $\lambda$ of the exhaust gas mixture becomes 0.95. Further, the concentration of $NO_X$ in the exhaust gas mixture becomes a mean value A' of concentrations B and C, i.e., the concentration at the point $A_1$' where the line connecting the point $B_1$ (the point on the curve where $\lambda=1.03$) and the point $C_1$ (the point on the curve where $\lambda=0.87$) crosses the line $\lambda=0.95$. Note that the $NO_X$ concentration A' (i.e., the exhaust gas mixture of $\lambda=0.95$) is larger than the $NO_X$ concentration A (i.e., the $NO_X$ concentration in the exhaust gas from the cylinders when the cylinders are operated at $\lambda=0.95$) because the $NO_X$ concentration curve in FIG. 3 bulges downward in the range near $\lambda=0.95$. This means that when the No. 1 cylinder and No. 2 cylinder are operated at $\lambda=0.87$ and 1.03, respectively, and the exhaust gases from the No. 1 and No. 2 cylinders are mixed, the concentration of $NO_X$ in the exhaust gas flowing into the three-way catalyst 5 becomes larger than the concentration of $NO_X$ in the exhaust gas flowing into the three-way catalyst 5 where both the No. 1 and No. 2 cylinders are operated at $\lambda=0.95$, even though the excess air ratio of the exhaust gas flowing into the three-way catalyst 5 is the same in both cases. Therefore, in this embodiment, the exhaust gas from the rich air-fuel ratio cylinder (No. 1 cylinder) and the exhaust gas from the lean air-fuel ratio cylinder (No. 2 cylinder) are mixed to increase the concentration of $NO_X$ in the exhaust gas supplied to the three-way catalyst 5. By increasing the concentration of $NO_X$ supplied to the three-way catalyst 5, the amount of $NH_3$ produced by the three-way catalyst 5 increases, and a sufficient amount of $NH_3$ is supplied to the denitrating catalyst 9 on the main exhaust gas passage 4. Therefore, according to this embodiment, $NO_X$ contained in the exhaust gas from No. 3 and No. 4 cylinders, as well as in the exhaust gas from No. 1 and No. 2 cylinders is purified at a high efficiency.

Although the ratio of numbers of the rich air-fuel ratio cylinder ($\lambda=0.87$) and the lean air-fuel ratio cylinder ($\lambda=1.03$) is set at 1:1 to form the exhaust gas mixture of $\lambda=0.95$ in this embodiment, ratios of the cylinders may be other than 1:1 as long as the excess air ratio of the exhaust gas mixture becomes 0.95. For example, the exhaust gas from one cylinder operated at $\lambda=0.84$ and the exhaust gases from two cylinders operated at $\lambda=1.005$ may be mixed to form the exhaust gas mixture of $\lambda=0.95$.

Further, as can be seen from FIG. 3, since the concentration of HC in the exhaust gas changes almost linearly with respect to the change in the excess air ratio of the exhaust gas, the concentration of HC in the exhaust gas mixture ($\lambda=0.95$) is almost the same as that of the exhaust gas from the cylinder operated at $\lambda=0.95$.

Next, consider the case where the No. 1 cylinder is operated at $\lambda=0.89$ and the No. 2 cylinder is operated at $\lambda=1.03$. In this case, the excess air ratio $\lambda$ of the exhaust gas mixture becomes 0.96 and, as can be seen from FIG. 2, this makes the production rate of $NH_3$ at three-way catalyst 5 slightly lower than that in the above embodiment ($\lambda=0.95$). However, in this case, since the amount of $NO_X$ produced in the No. 1 cylinder becomes larger due to an increase in the excess air ratio (i.e., from 0.87 to 0.89), the concentration of $NO_X$ in the exhaust gas mixture also increases. Therefore, the decrease in the production rate of $NH_3$ and the increase in the concentration of $NO_X$ in the exhaust gas cancel each other, and the amount of the $NH_3$ produced at the three-way catalyst 5 becomes substantially the same as that in the above embodiment. In addition to that, the concentration of HC in the exhaust gas mixture in this case becomes lower than the above embodiment due to decrease in the amount of HC produced at No. 1 cylinder (refer to FIG. 3). Therefore, when the excess air ratios of the No. 1 and No. 2 cylinder are selected appropriately, the amount of HC in the exhaust gas mixture can be reduced while maintaining the amount of $NH_3$ produced at the three-way catalyst at the same level as that in the above embodiment.

Next, another embodiment of the present invention will be explained.

In the embodiment in FIG. 1, the No. 1 cylinder is always operated at a rich air-fuel ratio ($\lambda=0.87$) and the No. 2 cylinder is always operated at a lean air-fuel ratio ($\lambda=1.03$). However, if the cylinder is always operated at a rich air-fuel ratio, there is the possibility that carbon deposit is formed in the cylinder. Therefore, in this embodiment, the No. 1 cylinder and the No. 2 cylinder are operated by turns in order to prevent the formation of the carbon deposit in the No. 1 cylinder.

Figure 4:
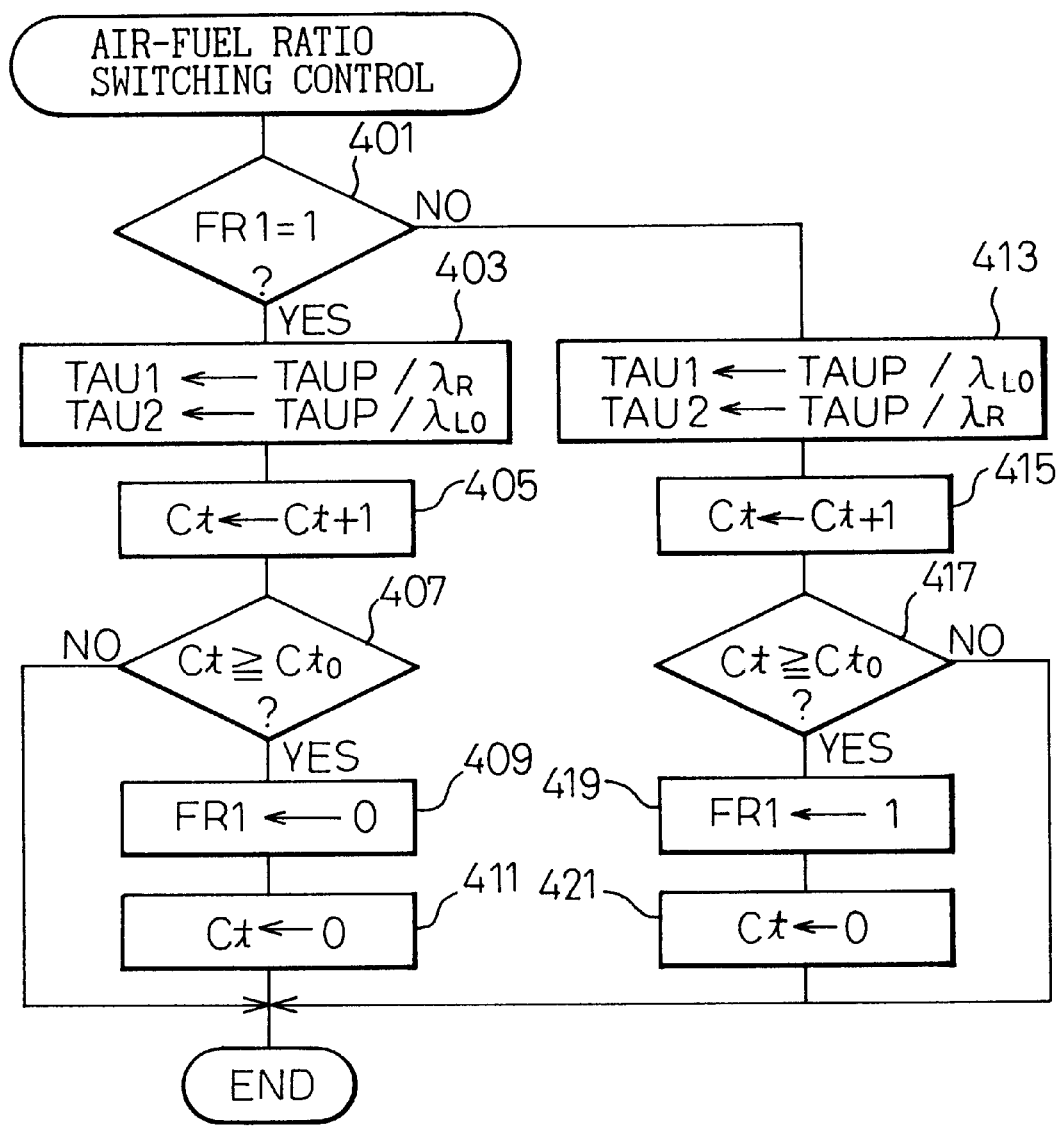
FIG. 4 is a flowchart explaining a cylinder air-fuel ratio switching control of the embodiment in FIG. 1.

FIG. 4 shows a flowchart illustrating the switching control of the rich air-fuel ratio cylinder in this embodiment. This control is performed by a routine executed by the ECU 30 at predetermined intervals, in this control, the excess air ratios of the No. 1 and No. 2 cylinders are adjusted so that the air-fuel ratio is alternately switched between a rich air-fuel ratio ($\lambda=0.87$) and a lean air-fuel ratio ($\lambda=1.03$) in order to prevent the formation of the deposit in the cylinders.

In the flowchart of FIG. 4, FR1 (steps 401, 409 and 419) is a flag representing the cylinder being operated at a rich air-fuel ratio and FR1=1 means that the No. 1 cylinder is operated at a rich air-fuel ratio and FR1≠1 means that the No. 2 cylinder is operated at a lean air-fuel ratio. Ct is a counter representing the time lapsed since the value of the flag FR1 was last switched at steps 411 and 421.

TAU1 and TAU2 represent the fuel injection amount of No. 1 and No. 2 cylinders. For example, when FP1=1 at step 401 (i.e., when the No. 1 cylinder is to be operated at a rich air-fuel ratio), TAU1 for No. 1 cylinder and TAU2 for No. 2 cylinder are calculated at step 403 as $$TAU1=TAUP/\lambda_R$$

$$TAU2=TAUP/\lambda_{LO}$$

where, TAUP is a basic fuel injection amount required to make the air-fuel ratio stoichiometric and calculated in accordance with the operating conditions of the engine. In this embodiment, for example, TAUP is calculated in accordance with the amount of intake air per one revolution of the engine Q/NE by TAUP=K×Q/NE (K is a constant). Further, $\lambda_R$ is an excess air ratio of the cylinder when the cylinder is operated at a rich air-fuel ratio (i.e., $\lambda_R=0.87$ in this embodiment), and $\lambda_{LO}$ is an excess air ratio of the cylinder when the cylinder is operated at a lean air-fuel ratio (i.e., $\lambda_{LO}=1.03$ in this embodiment). Therefore, at step 403, the operating excess air ratio of the No. 1 and No. 2 cylinders are set at 0.87 and 1.03, respectively.

Conversely, when FR1≠1 at step 401, TAU1 and TAU2 are calculated at step 413 as $$TAU1=TAUP/\lambda_{LO}$$

$$TAU2=TAUP/\lambda_R$$

and the No. 1 cylinder is operated at a lean air-fuel ratio ($\lambda=1.03$) and the No. 2 cylinder is operated at a rich air-fuel ratio ($\lambda=0.87$).

Further, in this embodiment, the value of the flag FR1 is switched between 0 and 1 every time the value of the counter Ct reaches a predetermined constant value $Ct_O$ (steps 407, 409 and 417, 419) and, at the same time, the value of the counter Ct is set to 0 (steps 411 and 421).

Therefore, the No. 1 and No. 2 cylinders are operated at a rich air-fuel ratio and a lean air-fuel ratio alternately at predetermined intervals and the formation of the deposit on one cylinder can be prevented. The value $Ct_0$ (step 407 and 417) is set at a value corresponding to a time about 20 seconds, i.e., the operating air-fuel ratios of the No. 1 and No. 2 cylinders are switched every 20 seconds.

Next, another embodiment of the present invention is explained.

Figure 5:
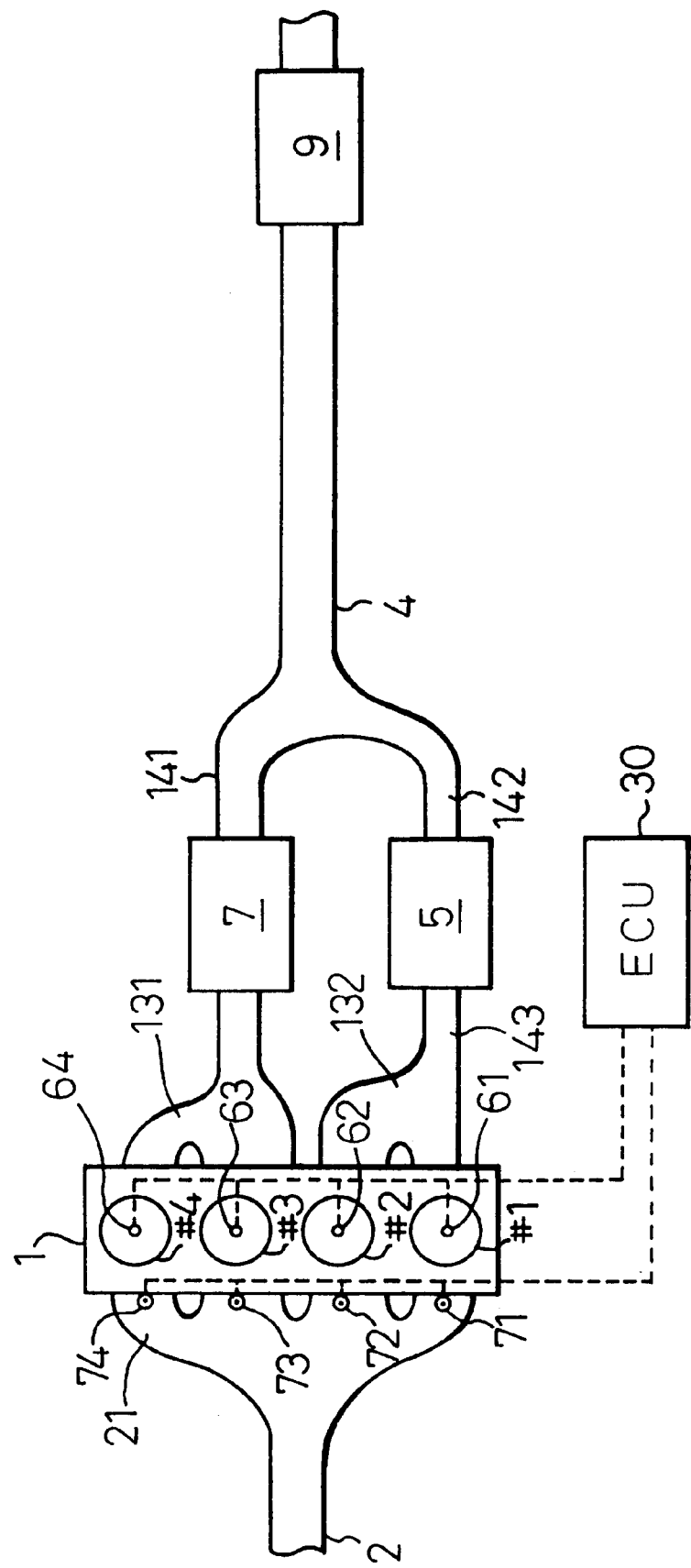
FIG. 5 schematically illustrates another embodiment of the exhaust gas purification device according to the present invention.

FIG. 5 is a drawing illustrating a general configuration of the present embodiment. In FIG. 5, reference numerals the same as those in FIG. 1 designate the same elements. FIG. 5 is different from FIG. 4 in that a $NO_X$ absorbent 7 is disposed on the exhaust gas passage 141.

The $NO_X$ absorbent 7 in this embodiment uses, for example, an alumina as a carrier and, on this carrier, precious metals such as platinum (Pt) and at least one substance selected from alkali metals such as potassium (K), sodium (Na), lithium (Li) and cesium (Cs); alkali-earth metals such as barium (Ba) and calcium (Ca); and rare-earth metals such as lanthanum (La) and yttrium (Y) carried. The $NO_X$ absorbent 7 absorbs $NO_X$ in the exhaust gas when the air-fuel ratio of the exhaust gas is lean, and releases the absorbed $NO_X$ when the excess air ratio $\lambda$ of the exhaust gas flowing the $NO_X$ absorbent is larger than 1.0 (i.e., the air-fuel ratio is lean).

Though the mechanism of this absorbing and releasing operation of the $NO_X$ absorbent is not clear at present, it is thought that the absorbing and releasing operation is conducted by the following mechanism. Though the following mechanism of the absorbing and releasing operation of the $NO_X$ absorbent is explained for the case where platinum Pt and barium Ba are carried on the carrier, as an example, it is thought that a similar mechanism also applies even if other precious metal, alkali metals, alkali earth metals, or rare earth metals are used.

Namely, when the concentration of $O_2$ in the exhaust gas increases, i.e., when the excess air ratio $\lambda$ of the exhaust gas becomes larger than 1.0, the oxygen $O_2$ in the exhaust gas is deposited on the surface of platinum Pt in the form of $O_2^-$ or $O^{2-}$. The NO in the exhaust gas reacts with $O_2^-$ or $O^{2-}$ on the surface of the platinum Pt and becomes $NO_2$ by the reaction $2NO+O_2 \rightarrow 2NO_2$. Then, $NO_2$ in the exhaust gas and the $NO_2$ produced on the platinum Pt are further oxidized on the surface of platinum Pt and absorbed into the $NO_X$ absorbent while bonding with the barium oxide BaO and diffusing in the absorbent in the form of nitric acid ions $NO_3^-$. Thus, $NO_X$ in the exhaust gas is absorbed by the $NO_X$ absorbent 7 when the excess air ratio $\lambda$ of the exhaust gas is larger than 1.0.

On the other hand, when the oxygen concentration in the exhaust gas becomes low, i.e., when the excess air ratio $\lambda$ of the exhaust gas becomes $\lambda \leq 1.0$, the production of $NO_2$ on the surface of the platinum Pt is lowered and the reaction proceeds in an inverse direction ($NO_3^- \rightarrow NO_2$), and thus nitric acid ions $NO_3^-$ in the absorbent are released in the form of $NO_2$ from the $NO_X$ absorbent 7.

In this case, if a reducing substance such as $NH_3$ and CO, or a substance such as HC and $CO_2$ exist in the exhaust gas, released $NO_X$ is reduced on the platinum Pt by these components. Namely, the $NO_X$ absorbent 7 performs the absorbing and releasing operation of the $NO_X$ in which the $NO_X$ in the exhaust gas is absorbed by the $NO_X$ absorbent when the excess air ratio of the exhaust gas $\lambda$ is $\lambda>1.0$ (lean) and, released from the $NO_X$ absorbent and reduced to $N_2$ when excess air ratio $\lambda$ of the exhaust gas becomes $\lambda \leq 1.0$.

In this embodiment, similarly to the embodiment in FIG. 1, the No. 1 cylinder is operated at $\lambda=0.87$ and the No. 2 cylinder is operated at $\lambda=1.03$ to increase the $NO_X$ concentration in the exhaust gas mixture supplied to three-way catalyst 5. The No. 3 and No. 4 cylinders are operated at a lean air-fuel ratio of $\lambda=1.30-1.40$ also in this embodiment. However, since the $NO_X$ absorbent 7 is disposed on the exhaust gas passage 141 in this embodiment, a large part of $NO_X$ contained in the lean air-fuel ratio exhaust gas from the cylinders No. 3 and No. 4 is absorbed by the $NO_X$ absorbent 7. Therefore, the exhaust gas flowing through the $NO_X$ absorbent 7 contains only a small amount of $NO_X$ which is not removed by the $NO_X$ absorbent 7. Thus, the amount of $NO_X$ flowing into the denitrating catalyst 9 becomes small compared to that in the embodiment in FIG. 1, and the amount of $NH_3$ required to reduce $NO_X$ at a denitrating catalyst 9 can be largely reduced.

In this embodiment, it is necessary to cause the $NO_X$ absorbent 7 to release the absorbed $NO_X$ by feeding a rich air-fuel ratio exhaust gas to the $NO_X$ absorbent 7 before it is saturated with the absorbed $NO_X$. In this embodiment, although the No. 3 and No. 4 cylinders are usually operated at a lean air-fuel ratio, they are operated at a rich air-fuel ratio for a short time when the amount of $NO_X$ absorbed in the $NO_X$ absorbent 7 increases. By switching the air-fuel ratio of the No. 3 and No. 4 cylinders to a rich air-fuel ratio, a rich air-fuel ratio exhaust gas is supplied to the $NO_X$ absorbent 7 and the absorbed $NO_X$ is released from the $NO_X$ absorbent 7 and reduced. This short rich air-fuel ratio operation of the cylinders No. 3 and No. 4 is hereinafter referred to as a "rich spike operation".

Figure 6:
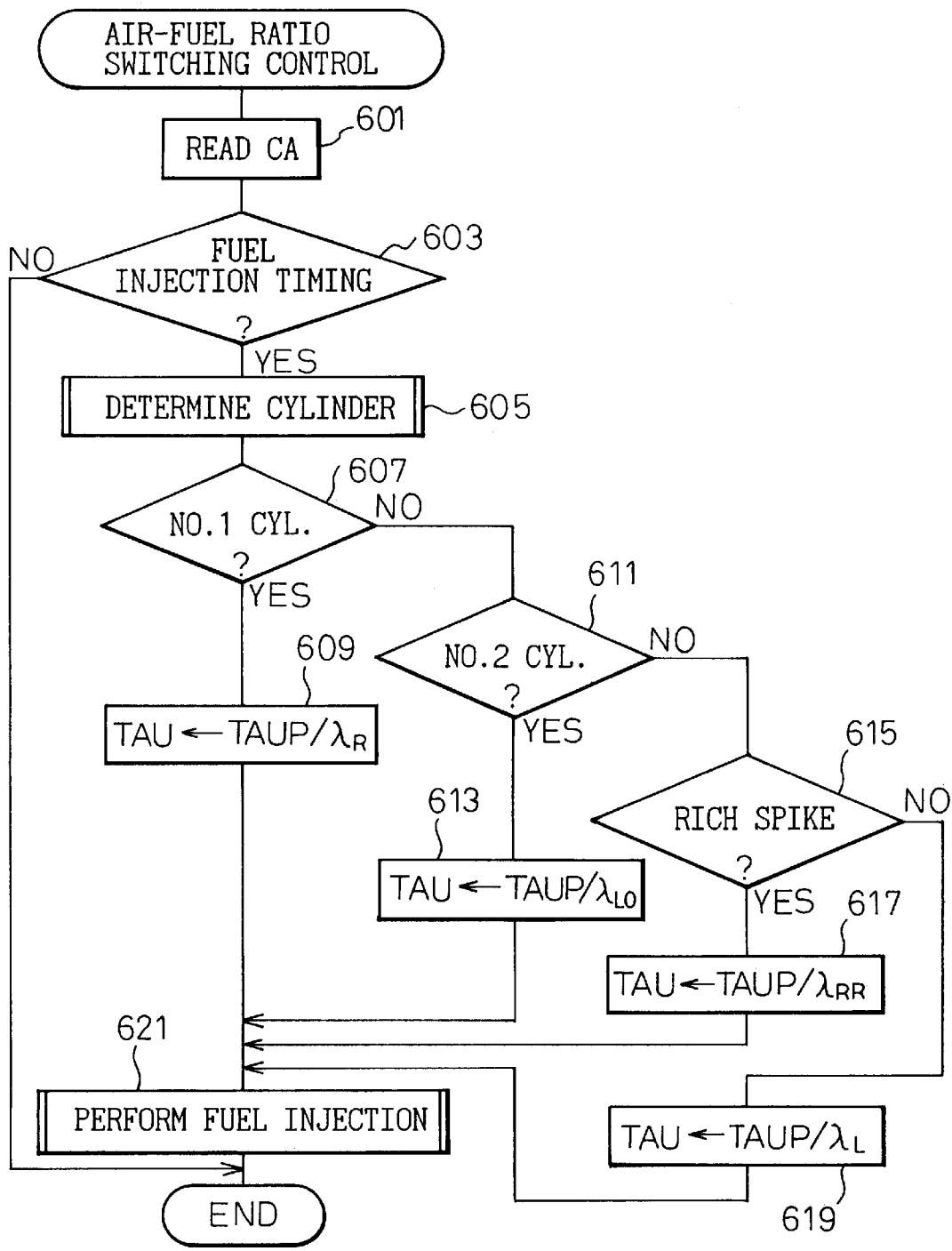
FIG. 6 shows a flowchart explaining an air-fuel ratio switching control of the cylinders of the embodiment in FIG. 5.

FIG. 6 is a flowchart illustrating the air-fuel ratio switching control of the cylinders in this embodiment. This control is performed by a routine executed by the ECU 30 at a predetermined rotation angle of the crankshaft of the engine (for example, every 30° rotation of the crankshaft).

In FIG. 6, at step 601, crank angle CA of the engine 1 is read in. The crank angle CA is calculated by another routine (not shown) performed by the ECU 30 in accordance with a crank angle pulse signal produced by a crank angle sensor (not shown) disposed at the crankshaft of the engine 1. At step 603, then, it is determined whether the crank angle CA read in at step 601 corresponds to fuel injection timing of any one of cylinders of the engine. If the crank angle CA does not correspond to fuel injection timing of any of the cylinders, the routine immediately terminates, i.e., steps 605 through 621 are performed only at fuel injection timings.

At step 605, the cylinder which is now at fuel injection timing is identified and, at step 607, it is determined whether the identified cylinder is No. 1 cylinder. If it is the No. 1 cylinder, the routine performs step 609 to calculate the fuel injection amount by TAU=TAUP/$\lambda_R$. TAUP is a basic fuel injection amount explained in the embodiment in FIG. 4, and $\lambda_R$ is a target excess air ratio of the No. 1 cylinder (in this embodiment, $\lambda_R$=0.87). After calculating the fuel injection amount TAU, the amount of fuel corresponding to TAU is injected into the cylinder identified at step 605 (in this case, the No. 1 cylinder). The excess air ratio of the No. 1 cylinder is controlled at $\lambda$=0.87 by this fuel injection.

If the identified cylinder is not the No. 1 cylinder at step 607, it is determined whether the identified cylinder is the No. 2 cylinder, and, if it is the No. 2 cylinder, the fuel injection amount TAU is calculated by TAU=TAUP/$\lambda_{LO}$. $\lambda_{LO}$ is a target excess air ratio of the No. 2 cylinder ($\lambda_{LO}$=1.03 in this embodiment). Then, at step 613, the calculated amount of fuel TAU is injected into the identified cylinder at step 605 (i.e., the No. 2 cylinder in this case). Therefore, the excess air ratio $\lambda$ of the No. 2 cylinder is controlled at $\lambda$=1.03 by the fuel injection.

If the identified cylinder is not the No. 2 cylinder at step 611, i.e., if the No. 3 or No. 4 cylinder is at the fuel injection timing, the routine performs step 615 to determine whether the rich spike is being performed. In this embodiment, the rich spike operation of the No. 3 and No. 4 cylinders is performed for a short time (for example, several seconds) when a cumulative operation time of the engine since the rich spike operation was last performed reaches a predetermined value. The cumulative operation time after the rich spike operation was last performed is measured by a separate routine (not shown) performed by ECU 30. Instead of the cumulative operation time, a cumulative number of revolution of the engine or a cumulative amount of intake air since the rich spike operation was last performed may be used.

If the rich spike operation is being performed at step 615, the routine performs step 617 to calculate the fuel injection amount by TAU=TAUP/$\lambda_{RR}$. $\lambda_{RR}$ is a target excess air ratio of the No. 3 and No. 4 cylinders during the rich spike operation and is set at a value less than 1.0. If the rich spike operation is not being performed at step 615, then the routine performs step 619 to calculate the fuel injection amount by TAU=TAUP/$\lambda_L$. $\lambda_L$ is a target excess air ratio of the No. 3 and No. 4 cylinders when the rich spike operation is not being performed, and is set at $\lambda_L$=1.30–1.40.

By the control in FIG. 6, the rich spike operation of No. 3 and No. 4 cylinders is performed when the amount of $NO_X$ absorbed in the $NO_X$ absorbent 7 increases and, thereby, the absorbed $NO_X$ is released from the $NO_X$ absorbent 7 and reduced to $N_2$. Further, after the rich spike operation is completed, the No. 3 and No. 4 cylinders are operated at a lean air-fuel ratio ($\lambda$=$\lambda_L$), and a large part of the $NO_X$ produced by the No. 3 and No. 4 cylinders are absorbed by the $NO_X$ absorbent 7. In this case, a small amount of $NO_X$ passing through the $NO_X$ absorbent 7 is reduced by $NH_3$ at the denitrating catalyst 9 as explained before.

In the embodiment in FIG. 5, an additional three-way catalyst may be disposed on the exhaust gas passage 141 upstream of the $NO_X$ absorbent 7 in order to reduce the amount of $NO_X$ absorbed by the $NO_X$ absorbent 7 by reducing a part of $NO_X$ in the exhaust gas during the lean air-fuel ratio operation of the No. 3 and No. 4 cylinders. In this case, $NH_3$ is produced by the additional three-way catalyst upstream of the $NO_X$ absorbent 7. As explained before, since $NH_3$ is a reducing substance which causes the $NO_X$ absorbent to release absorbed $NO_X$ and reduce it to $N_2$, the releasing of $NO_X$ from the $NO_X$ absorbent 7 during the rich spike operation is promoted by disposing the additional three-way catalyst on the exhaust gas passage upstream of the $NO_X$ absorbent 7. Also, since a relatively large amount of $NO_X$ is released from $NO_X$ absorbent 7 in a short time when the rich spike operation is performed, a part of $NO_X$ flows out from the $NO_X$ absorbent 7 without being reduced. This $NO_X$ is also reduced by $NH_3$ in the exhaust gas mixture at the denitrating catalyst 9. However, since a relatively large amount of $NO_X$ flows into the denitrating catalyst 9 during the rich spike operation, a $NH_3$ adsorbing substance may be attached to the substrate of the denitrating catalyst 9, as explained later in order to prevent the shortage of $NH_3$ from occurring.

Next, another embodiment of the present invention is explained with reference to FIG. 7.

Figure 7:
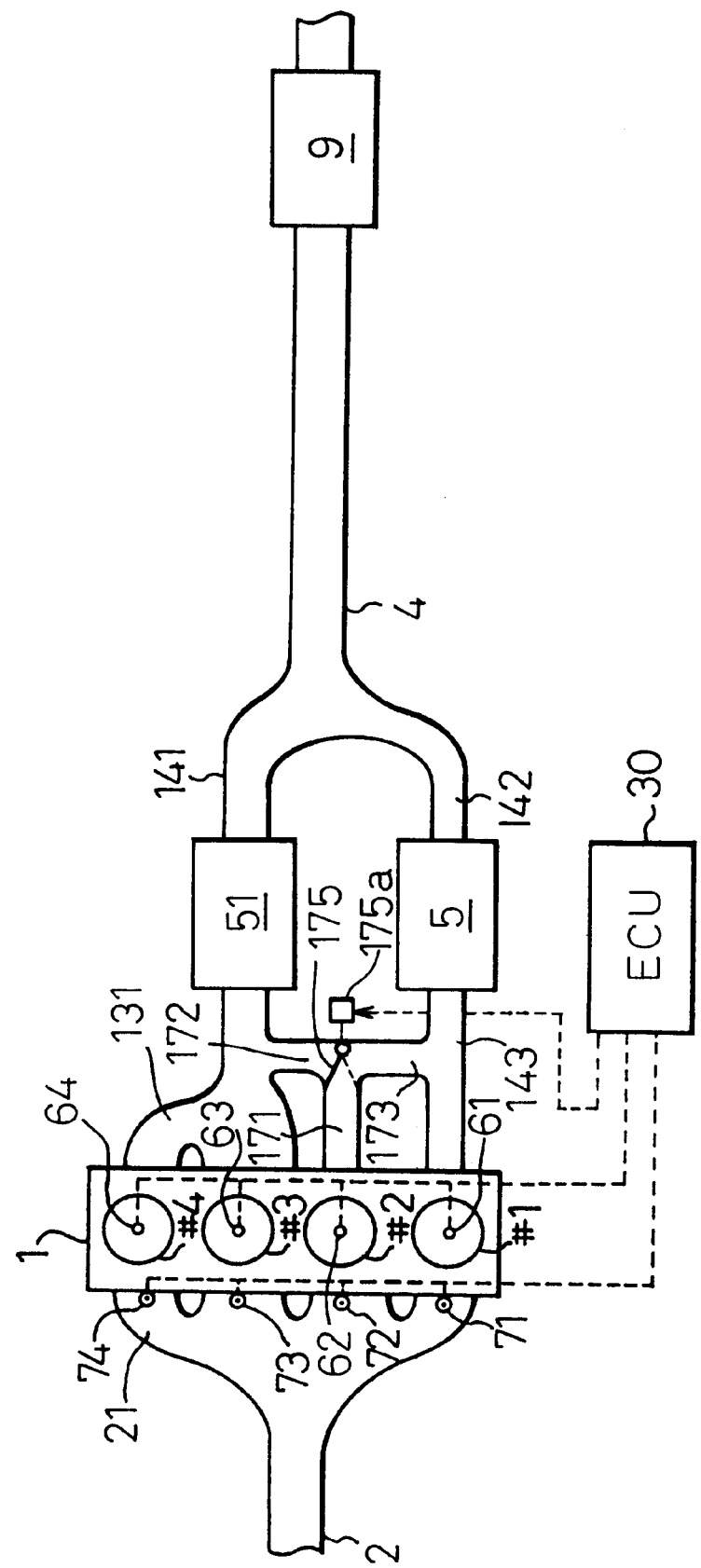
FIG. 7 schematically illustrates another embodiment of the exhaust gas purification device according to the present invention.

In FIG. 7, reference numerals the same as those in FIG. 1 designate the same elements. The embodiment of FIG. 7 is different from the embodiment in FIG. 1 in that the embodiment in FIG. 1 is capable of directing the exhaust gas from the No. 2 cylinder to either of the exhaust gas passages 143 and 141 selectively. Namely, as shown in FIG. 7, the exhaust port of the No. 1 cylinder is connected to the exhaust gas passage 143, and the exhaust port of the No. 2 cylinder is connected to an exhaust gas passage 171 which is separate from the exhaust gas passage 143. The exhaust gas passage 171 diverges into two exhaust gas passages 172 and 173.

The branch exhaust gas passage 172 is connected to the exhaust gas passage 141 from the No. 3 and No. 4 cylinders, and the branch exhaust gas passage 173 is connected to the exhaust gas passage 143 upstream of the three-way catalyst 5. Further, a switching valve 175 is disposed on the exhaust gas passage 171 at the diverging point of branch exhaust gas passages 172 and 173. The switching valve 175 is provided with an appropriate type actuator 175a such as a solenoid actuator or a vacuum actuator and is capable of directing the flow of the exhaust gas to either of exhaust gas passages 172 and 173 selectively. When the switching valve 175 takes a position in which the exhaust gas from the No. 2 cylinder is directed to the exhaust gas passage 173, the amount of exhaust gas, i.e., the amount of $NO_X$ supplied to the three-way catalyst 5 increases. Therefore, in this embodiment, the amount of $NH_3$ can be changed in accordance with the engine operating condition by switching the valve 175. Further, an three-way catalyst 51 is disposed on the exhaust gas passage 172 downstream of the point where the exhaust gas passage 172 merges. This three-way catalyst 51 is used for removing HC and CO emitted from the cylinders No. 4 and No. 2 when the engine starts.

In this embodiment, the position of the switching valve 175 is determined in accordance with the engine operating load. When the engine is operated at a high load and a high speed, since the amount of $NO_X$ produced by the engine increases, a relatively large amount of $NH_3$ is required at the denitrating catalyst 9 to reduce $NO_X$ in the exhaust gas. Conversely, when the engine is operated at a low load and a low speed, the amount of $NO_X$ produced by the engine 1 decreases and, accordingly, the amount of $NH_3$ required at the denitrating catalyst 9 becomes small. Therefore, the amount of $NH_3$ supplied to denitrating catalyst 9, i.e., the amount of $NH_3$ produced by the three-way catalyst 5 is controlled in accordance with the engine operating condition by switching the position of the switching valve 175.

Figure 8:
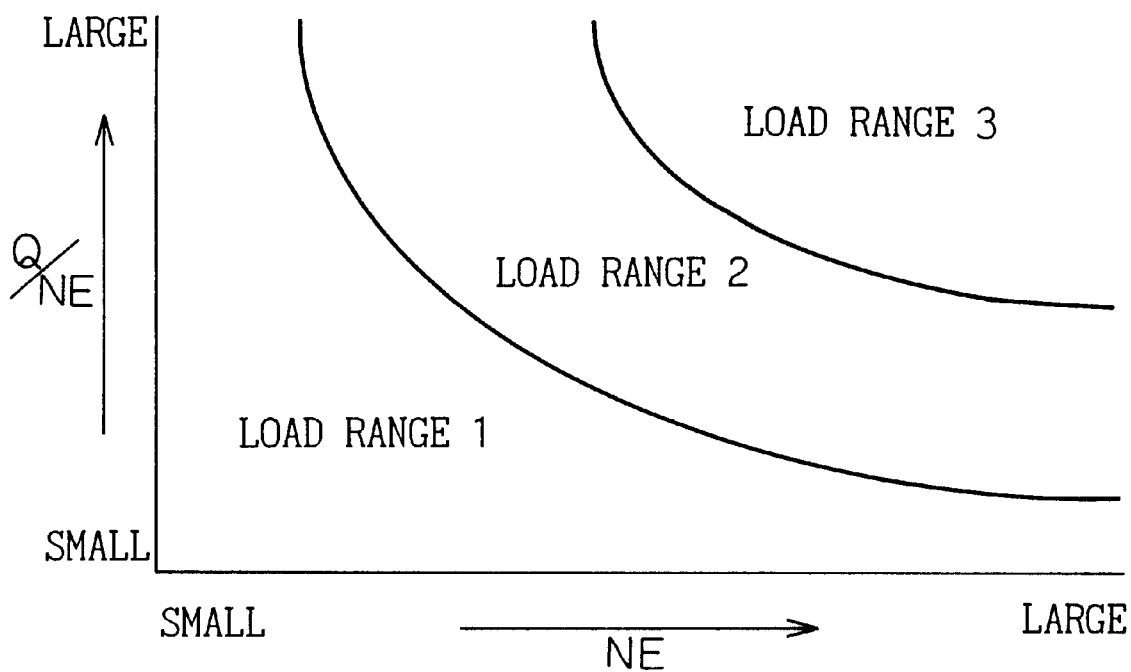
FIG. 8 shows a operating load range map of the engine in the embodiment in FIG. 7.

FIG. 8 shows a map illustrating load ranges of the engine 1 used for controlling the switching operation of the valve 175. In FIG. 8, the vertical axis represents the engine load (such as the amount of intake air per one revolution of the engine, Q/NE), and the horizontal axis represents the engine speed NE. As shown in FIG. 8, the load region of the engine 1 in this embodiment is divided into 3 ranges. The load range 1 is a range where the engine 1 is operated at a relatively low load and a low speed, and the amount of $NO_X$ produced by the engine is relatively small in this range. The load range 2 is a range where the engine is operated at a higher load and higher speed than range 1, and the amount of $NO_X$ produced by the engine becomes larger than that of the range 1. The load range 3 in FIG. 8 is a range where the engine is operated at a high load and a high speed. In this range, all of the cylinders of the engine 1 is operated at a stoichiometric air-fuel ratio ($\lambda=1.0$) in order to increase the output of the engine in this embodiment.

Figure 9:
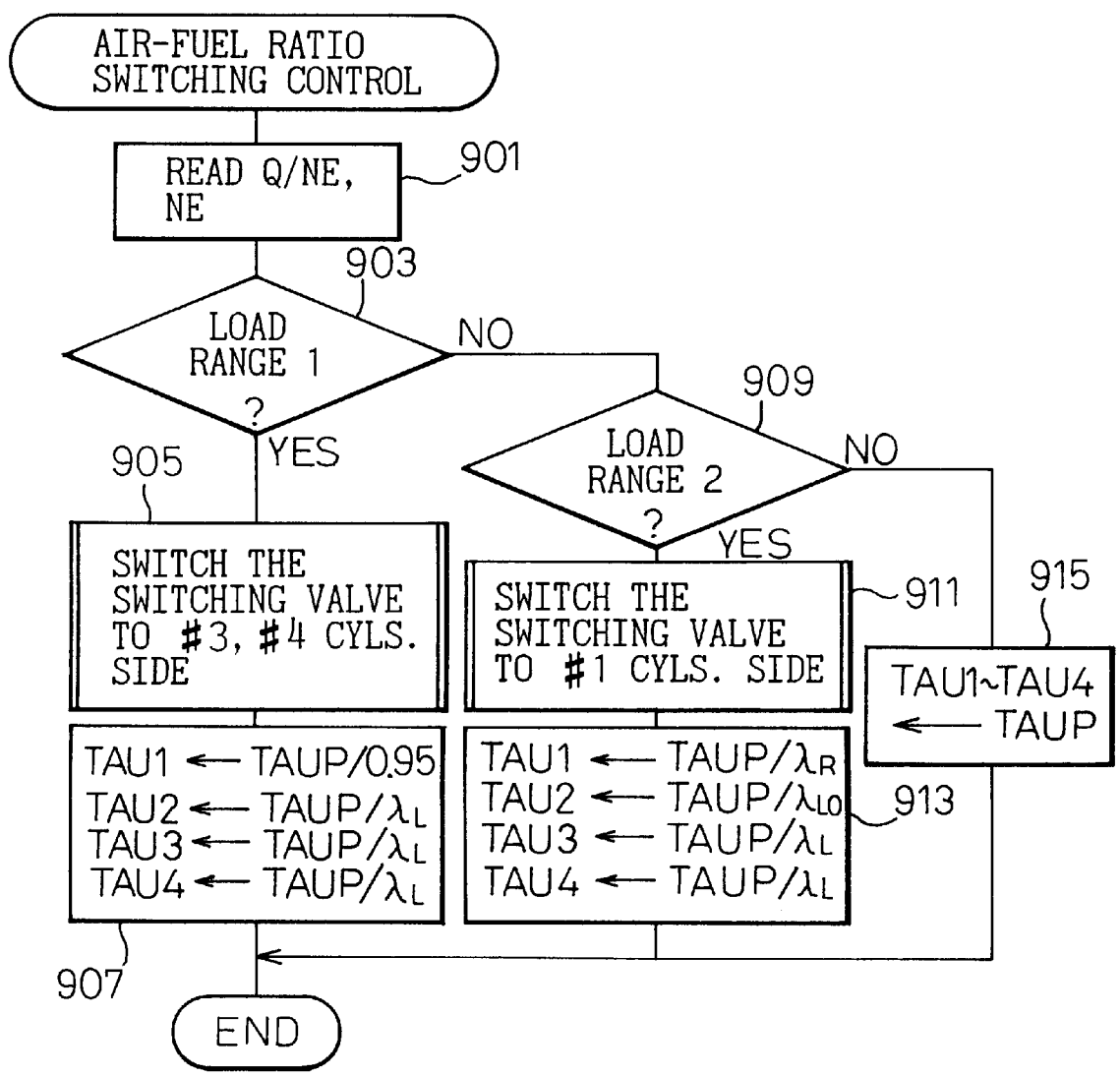
FIG. 9 shows a flowchart explaining an air-fuel ratio switching control of the cylinders in the embodiment in FIG. 7.

FIG. 9 is a flowchart illustrating the air-fuel ratio switching control of the cylinders in which the position of the switching valve 175 in FIG. 7 is controlled. This control is performed by a routine executed by the ECU at predetermined intervals.

In FIG. 9, at step 901, the engine speed NE and the amount of intake air per one revolution of the engine Q/NE is calculated. At step 903, it is determined whether the engine is operated in the load range 1 in FIG. 8 based on the calculated NE and Q/NE. If the engine is operated in the load range 1, the routine performs step 905 to switch the switching valve 175 to No. 3 and No. 4 cylinders side, i.e., to the position where the exhaust gas from the No. 2 cylinder is directed to the exhaust gas passage 172 in FIG. 7. Then the routine performs step 907 to set the fuel injection amount TAU1 of the No. 1 cylinder at TAUP/0.95 and the fuel injection amounts TAU2, TAU3, and TAU4 of the No. 2, No. 3 and No. 4 cylinders, respectively are all set at TAUP/$\lambda_L$. Therefore, when the engine is operated in the load range 1, the No. 1 cylinder is operated at $\lambda=0.95$ (rich) and only the exhaust gas from the No. 1 cylinder is supplied to the three-way catalyst 5. Thus, the amount of $NH_3$ produced by the three-way catalyst 5 becomes small. Further, the No. 2, No. 3 and No. 4 cylinders are all operated at $\lambda=\lambda_L$ ($\lambda_L=$ 1.30–1.40) and the fuel consumption of the engine 1 is reduced.

If engine is not operated in the load range 1 in FIG. 8, the routine proceeds to step 905 to determine whether the engine is operated in the load range 2 in FIG. 8. If the engine is operated in the load range 2, the position of the switching valve 175 is set to the No. 1 cylinder side, i.e., to the Position where the exhaust gas from the No. 2 cylinder is directed to the three-way catalyst 5. Further, at step 913, the fuel injection amounts TAU1 and TAU2 for the No. 1 and the No. 2 cylinders are set at TAUP/$\lambda_R$ and TAUP/$\lambda_{LO}$, and the fuel injection amount TAU3 and TAU4 for the No. 3 and the No. 4 cylinders are both set at TAUP/$\lambda_L$. Therefore the exhaust gas from the No. 1 cylinder ($\lambda=0.87$) and the exhaust gas from the No. 2 cylinder ($\lambda=1.03$) are mixed with each other in the exhaust gas passage 143, and the exhaust gas mixture of $\lambda=0.95$ is supplied to the three-way catalyst 5. Therefore, the amount of $NH_3$ produced by the three-way catalyst 5 increases.

When the engine is not operated in the load range 2 at step 909, i.e., when the engine is operated in the load range 3, the fuel injection amount TAU1–TAU4 are all set at TAUP. Therefore, in this case, all the cylinders of the engine are operated at the stoichiometric air-fuel ratio ($\lambda=1.0$), and the engine output is increased. Further, since the exhaust gas of the stoichiometric air-fuel ratio flows into the three-way catalysts 5 and 51, HC, CO, and $NO_X$ in the exhaust gas are removed from the exhaust gas by the three-way catalysts 5 and 51.

As explained above, according to the present embodiment, the amount of $NO_X$ flowing into the denitrating catalyst 9 is estimated in accordance with the operating condition of the engine, and the amount of the exhaust gas from the lean air-fuel ratio cylinder (the No. 2 cylinder) in the exhaust gas mixture supplied to the three-way catalyst 5 is adjusted in accordance with the estimated amount of $NO_X$. Therefore, according to the present embodiment, $NO_X$ in the exhaust gas is removed at a high efficiency and, at the same time, the fuel consumption of the engine is reduced.

Figure 10:
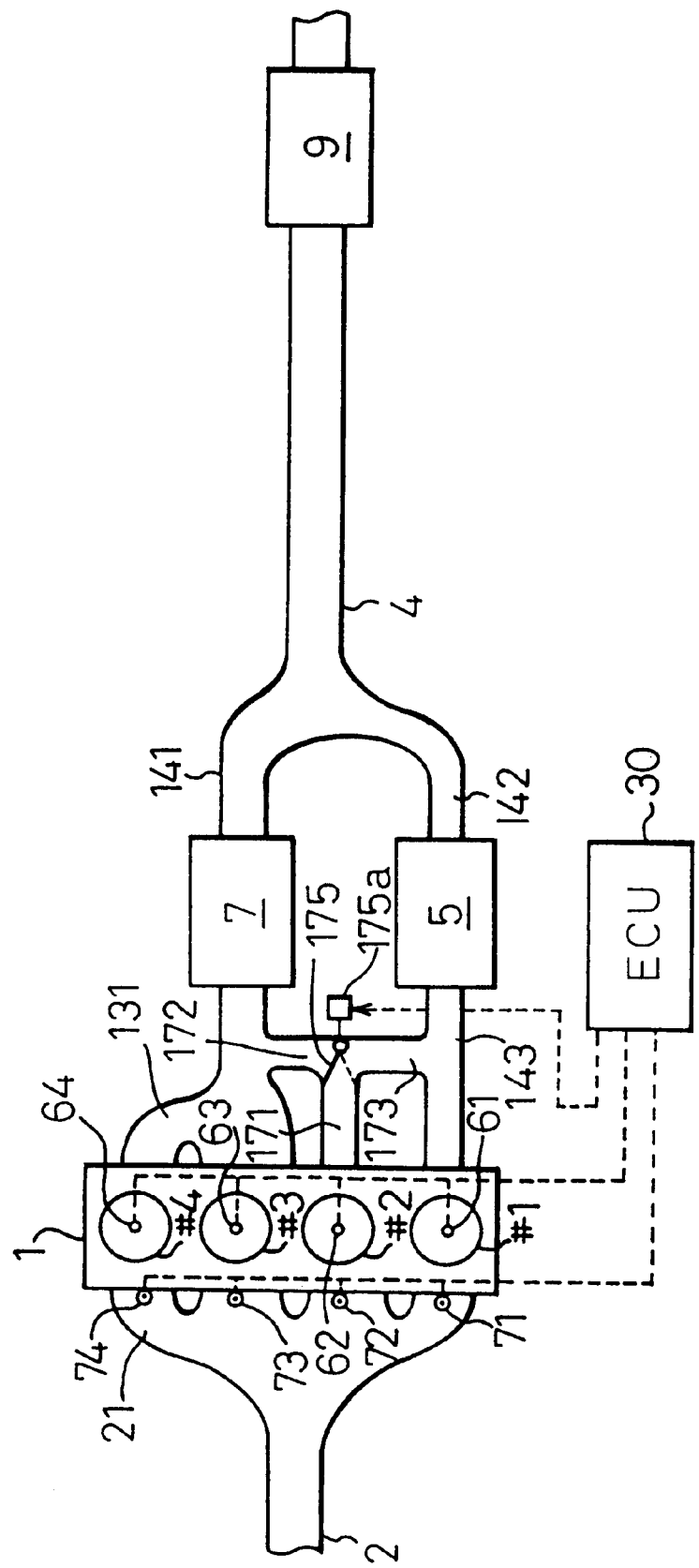
FIG. 10 schematically illustrates another embodiment of the exhaust gas purification device according to the present invention.

Next, another embodiment of the present invention is explained with reference to FIG. 10. The embodiment in FIG. 10 is different from the embodiment in FIG. 7 in that the three-way catalyst 51 disposed on the lean air-fuel ratio exhaust gas passage 141 in FIG. 7 is replaced by the $NO_X$ absorbent 7. $NO_X$ in the exhaust gas flowing through the lean air-fuel ratio exhaust gas passage 141 is absorbed and temporarily stored by the $NO_X$ absorbent 7 also in this embodiment. When the amount of the $NO_X$ absorbed in the $NO_X$ absorbent 7 increases, the No. 3 and No. 4 cylinders are operated at a rich air-fuel ratio ($\lambda=\lambda_{RR}$), and the No. 1 and No. 2 cylinders are operated at air-fuel ratios in such a manner that the excess air ratio $\lambda$ of the exhaust gas mixture becomes 0.95. Therefore, the $NO_X$ released from the $NO_X$ absorbent 7 is reduced at the denitrating catalyst 9 by the $NH_3$ produced by the three-way catalyst 5.

Further, in this embodiment, an $NH_3$ adsorbing substance is attached to the substrate of the denitrating catalyst 9 to make the denitrating catalyst 9 adsorption and releasing of $NH_3$. It is known in the art that an acidic inorganic substance (which includes Broensted acids such as zeolite, silica ($SiO_2$), silica-alumina ($SiO_2$—$Al_2O_3$), and titania ($TiO_2$) as well as Lewis acids including oxides of transition metals such as copper (Cu), cobalt (CO), nickel (Ni) and iron (Fe)) adsorb $NH_3$, and especially when the temperature is low, the substances adsorbs a large amount of $NH_3$. In this embodiment, one or more of these acidic inorganic substances is carried on the substrate of the denitrating catalyst 9, or the substrate itself may be formed by a porous material made of such acidic inorganic substances.

When the rich spike operation is performed, a relatively large amount of $NO_X$ is released at the beginning of the rich spike operation, and sometimes, a part of released $NO_X$ passes through the $NO_X$ absorbent without being reduced. To prevent this $NO_X$ outflow, the denitrating catalyst 9 disposed on the exhaust gas passage 4 downstream of the $NO_X$ absorbent 7 in this embodiment is given a $NH_3$ adsorbing and releasing capability by the $NH_3$ adsorbing substance. Namely, when the excess air ratio of the exhaust gas flowing into the denitrating catalyst 9 is low, the $NH_3$ not oxidized by the denitrating catalyst 9 is adsorbed stored in the denitrating catalyst 9. The $NH_3$ stored in the denitrating catalyst 9 is released when the concentration of $NH_3$ in the exhaust gas flowing into the denitrating catalyst 9 becomes low. Therefore, in this embodiment, the surplus $NH_3$ produced by the three-way catalyst 5 during the normal operation and not used for reducing $NO_X$ in the exhaust gas at the denitrating catalyst 9 is adsorbed by the denitrating catalyst 9. Further, the amount of $NH_3$ produced by the three-way catalyst 5 is controlled in such a manner that the denitrating catalyst 9 is nearly saturated with the adsorbed $NO_X$. Therefore, when the $NO_X$ is released from the $NO_X$ absorbent 7 without being reduced at the beginning of the rich spike, the $NO_X$ flowing into the denitrating catalyst 9 is completely reduced by the $NH_3$ adsorbed and stored in the denitrating catalyst 9.

Figure 11:
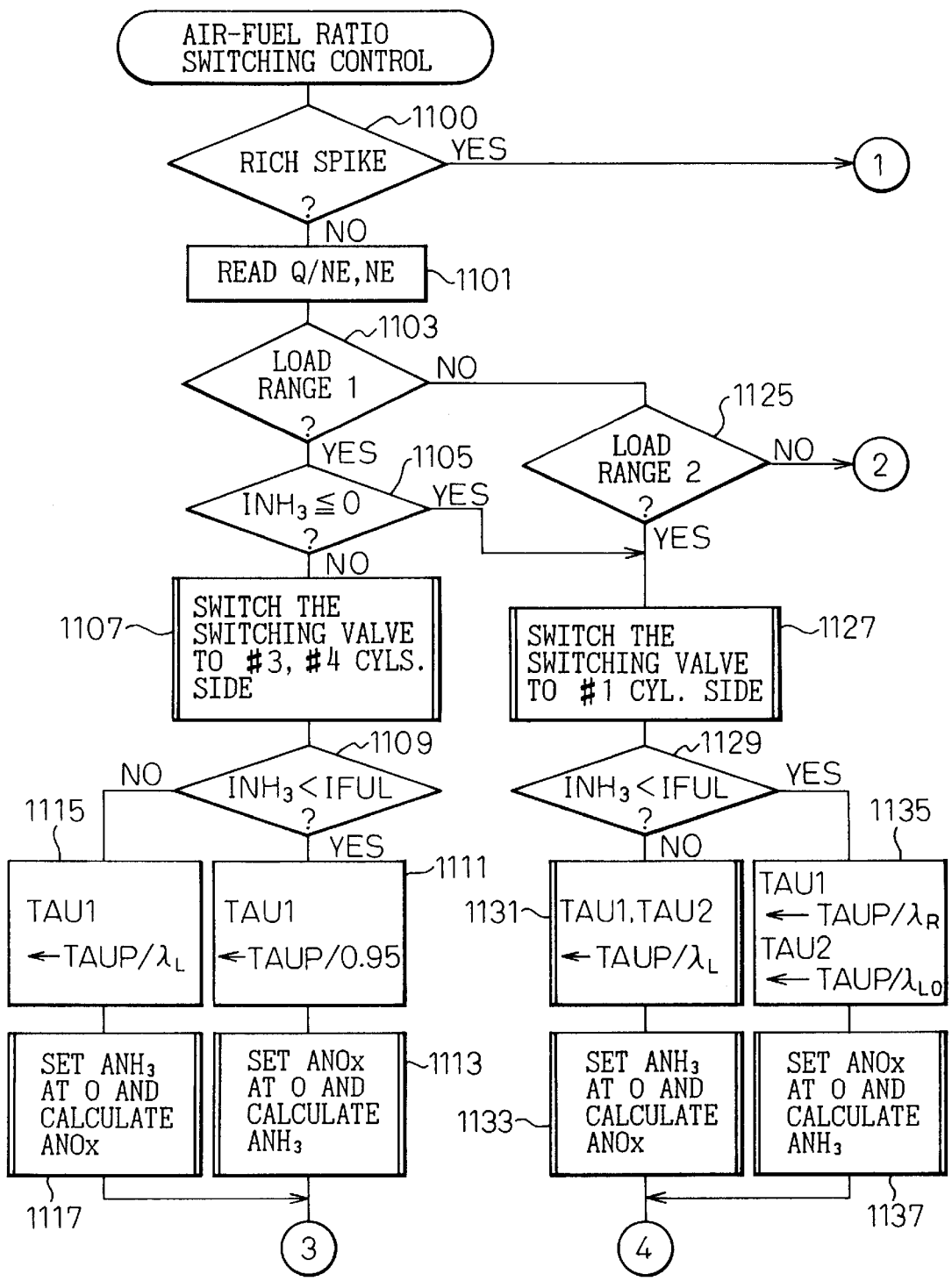
FIGS. 11 and 12 show a flowchart explaining an air-fuel ratio switching control of the cylinders in the embodiment in FIG. 10.
Figure 12:
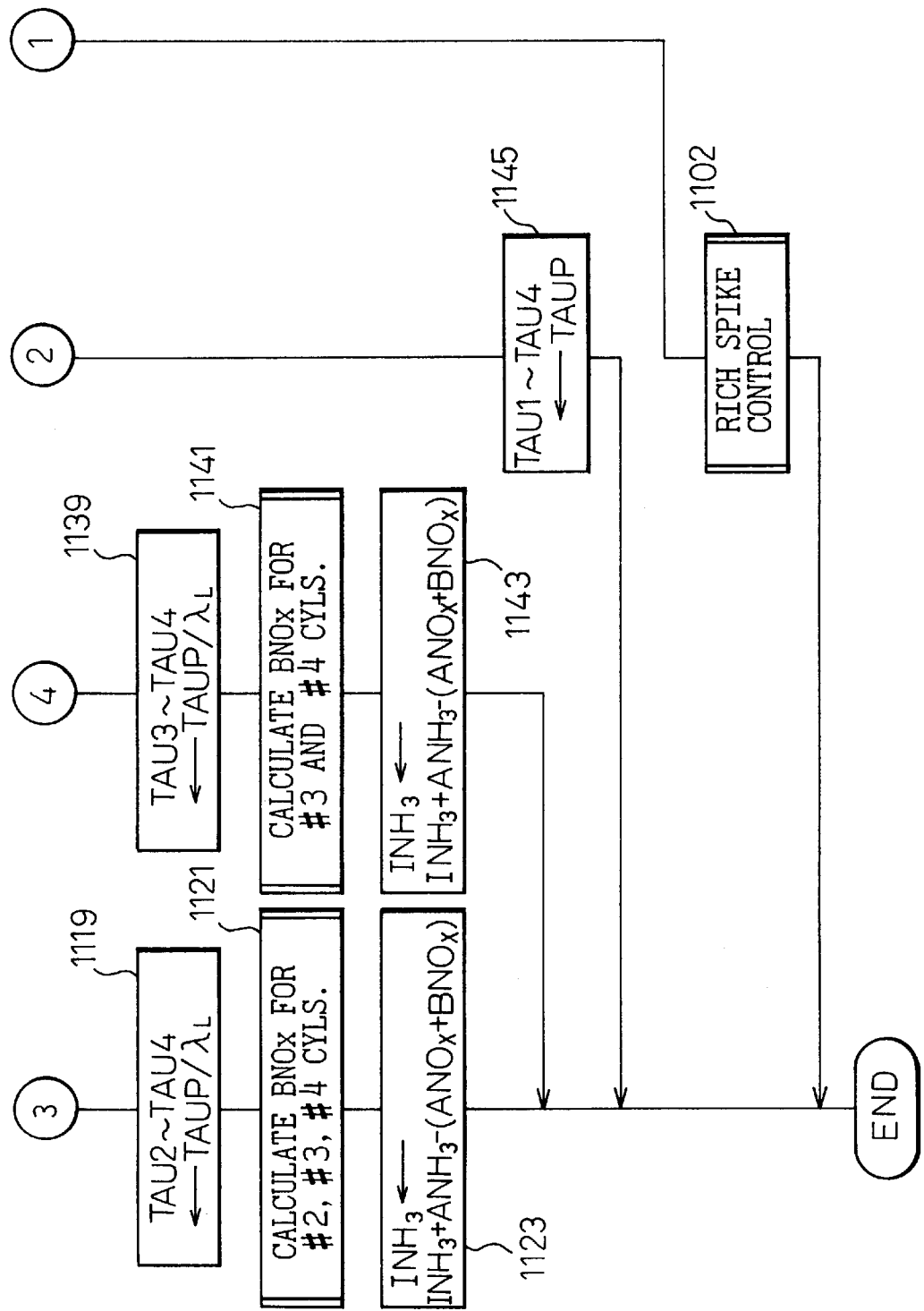

FIGS. 11 and 12 show a flowchart explaining the air-fuel ratio switching control of the cylinders in this embodiment in which the amount of $NH_3$ adsorbed by the denitrating catalyst 9 is controlled by adjusting the air-fuel ratio of the cylinders. This control is performed by a routine executed by the ECU 30 at predetermined intervals.

In FIG. 11, at step 1100, it is determined whether the rich spike is being carried out at present, and if the rich spike is being performed, the routine performs step 1102 to carry out the rich spike control, and terminates after that. In this embodiment, the rich spike operation is carried out for short period when the operation time of the engine after the rich spike operation was last performed reaches a predetermined value as explained in FIG. 6. In the rich spike control of step 1102, the switching valve 175 is switched to the position where the exhaust gas from the No. 2 cylinder is directed to the exhaust gas passage 173, and the No. 1 and No. 2 cylinders are operated at excess air ratios of λ=0.87 and λ=1.03, respectively. Therefore, the exhaust gas mixture of λ=0.95 and containing a relatively large amount of $NO_X$ flows into the three-way catalyst 5. No. 3 and No. 4 cylinders are operated at a rich air-fuel ratio ($\lambda=\lambda_{RR}$) during the rich spike operation, and the absorbed $NO_X$ is released from the $NO_X$ absorbent 7.

If the rich spike operation is not being performed at step 1100, the load range where the engine is being operated is determined at steps 1101, 1103 and 1125 in the manner same as those of steps 901, 913 and 909 in FIG. 9. After determining the load range where the engine is being operated, the amount of $NO_X$ adsorbed in the denitrating catalyst 9 is controlled as explained below.

When the engine is operated in the load range 1 at step 1103, i.e., when the amount of $NO_X$ flowing into the denitrating catalyst 9 is relatively small, the amount $INH_3$ of the $NH_3$ stored (adsorbed) in the denitrating catalyst 9 is determined at steps 1105 and 1109. Namely, it is determined whether $INH_3 \leq 0$ at step 1105, and when $INH_3 \leq 0$, i.e., when no $NH_3$ is stored in the denitrating catalyst 9, the amount of $NH_3$ produced by the three-way catalyst 5 is increased by supplying the exhaust gas from the No. 2 cylinder to the three-way catalyst 5 at step 1127 and after.

If $INH_3 > 0$ at step 1105, the switching valve 175 is switched to the position where the exhaust gas from the No. 2 cylinder is directed to the exhaust gas passage 172 at step 1107 to stop the supply of the exhaust gas from the No. 2 cylinder to the three-way catalyst 5. Then, it is determined at step 1109 whether $INH_3$ reaches the maximum storage amount IFUL (the saturating amount) of $NH_3$ in the denitrating catalyst at step 1109. If the amount $INH_3$ of the $NH_3$ adsorbed by the denitrating catalyst 9 has reached the maximum amount IFUL at step 1109, since the denitrating catalyst 9 cannot adsorb $NH_3$ further, the fuel injection amount TAU1 for the No. 1 cylinder is set at TAUP/$\lambda_L$ at step 1115. By doing so, the lean air-fuel ratio exhaust gas flows into the three-way catalyst 5 and, thereby, the production of $NO_X$ by the three-way catalyst 5 stops. The calculation of $INH_3$ is explained later. After performing step 1115, the amount $ANH_3$ of the $NH_3$ produced by the three-way catalyst 5 is set at 0 and $ANO_X$ of the $NO_X$ produced by the No. 1 cylinder is calculated at step 1117. In this embodiment, the amount $ANO_X$ of $NH_3$ produced in the No. 1 cylinder is actually measured beforehand by operating the actual engine under various engine loads, speeds and air-fuel ratios of No. 1 cylinder, and the measured values of $ANO_X$ are stored in the ROM of the ECU 30 in the form of a numerical table using the engine load, speed and air-fuel ratio of the No. 1 cylinder as parameters. At step 1117, the amount $ANO_X$ is determined from this numerical table in accordance with the engine load read at step 1100 and the air-fuel ratio of the No. 1 cylinder. Then, at step 1119, the fuel injection amounts TAU2–TAU4 of the No. 2 to No. 4 cylinders are all set at TAUP/$\lambda_L$, and the amount $BNO_X$ of the $NO_X$ in the exhaust gas flowing into the denitrating catalyst 9 is calculated at step 1121. The values of $BNO_X$ are measured by operating the actual engine and are stored in the ROM of ECU 30 in the form of a numerical table similar to that for $ANO_X$.

At step 1123, the amount $INH_3$ of $NH_3$ stored in the denitrating catalyst 9 is calculated from $ANH_3$, $ANO_X$ and $BNO_X$ by the formula $$INH_3 = INH_3 + ANH_3 - K \times (ANO_X + BNO_X).$$

In the above formula, $K \times (ANO_X + BNO_X)$ represents the amount of $NH_3$ required for reducing the $NO_X$ flowing into the denitrating catalyst 9 at present (K is a constant). Namely, the amount $INH_3$ of $NH_3$ stored in the denitrating catalyst 9 at present is calculated by cumulating the amount of the surplus $NH_3$ which is not used for reducing the $NO_X$ at denitrating catalyst 9.

When $INH_3 <$ IFUL at step 1109, i.e., when the amount of $NH_3$ stored in the denitrating catalyst 9 does not reach the maximum amount, the fuel injection amount TAU1 is set at TAUP/0.95 at step 1111 and the No. 1 cylinder is operated at λ=0.95. Then the amount $ANH_3$ of the $NH_3$ produced by the three-way catalyst 5 is calculated from the numerical table stored in the ROM of ECU 30 at step 1113 and the amount $ANO_X$ of the $NO_X$ produced in the No. 1 cylinder is set at 0. Then the amount $INH_3$ of $NH_3$ stored in the denitrating catalyst 9 is calculated at steps 1119 through 1123.

The reason why the value of $ANH_3$ is set at 0 at step 1117 is that $NH_3$ is not produced by the three-way catalyst 5 when all the cylinders are operated at a lean air-fuel ratio, and the reason why the value of $ANO_X$ is set at 0 at step 1113 is that all the $NO_X$ produced in the No. 1 cylinder is converted to $N_2$ and $NH_3$ when the No. 1 cylinder is operated at $\lambda=0.95$ and the $NO_X$ produced in the No. 1 cylinder does not reach the denitrating catalyst 9.

If it is determined that the engine is operated in the load range 2 at step 1125, since the amount of $NO_X$ in the exhaust gas flowing into the denitrating catalyst 9 is relatively large, the switching valve 175 is switched to the position where the exhaust gas from the No. 2 cylinder is directed to the exhaust gas passage 173, and the exhaust gas from the No. 2 cylinder is supplied to the three-way catalyst 5. Then, at step 1129, it is determined whether $INH_3$ has reached IFUL, and if $INH_3$ has reached IFUL, all the cylinders are operated at a lean air-fuel ratio ($\lambda=\lambda_L$) at steps 1131 and 1139 (FIG. 12) to, thereby, stop the production of $NH_3$ by the three-way catalyst 5.

When $INH_3<IFUL$ at step 1129, the excess air ratio of the No. 1 and No. 2 cylinders are set at $\lambda_R$ and $\lambda_{LO}$ at step 1135, respectively, and the excess air ratio of the No. 3 and No. 4 cylinders are both set at $\lambda_L$ at step 1139. Therefore, the exhaust gas gases from the No. 1 and No. 2 cylinders form a exhaust gas mixture of $\lambda=0.95$ and containing a relatively large amount of $NO_X$, and the amount of $NH_3$ produced by the three-way catalyst 5 increases. In this case, $INH_3$ is calculated by steps 1133, 1137, 1141 and 1143 in accordance with whether $INH_3$ is smaller than IFUL.

If it is determined that the engine is operated in the load range 3 at step 1125, all the cylinders are operated at the stoichiometric air-fuel ratio (FIG. 12, step 1145).

According to the present embodiment, since the denitrating catalyst 9 is provided with the capability for storing $NH_3$ and always stores the amount of $NH_3$ near the maximum amount, all the $NO_X$ flowing into the denitrating catalyst 9 is reduced by the $NH_3$ stored in the denitrating catalyst 9 even if a large amount of $NO_X$ is released from the $NO_X$ absorbent 7 at the beginning of the rich spike operation.

Figure 13:
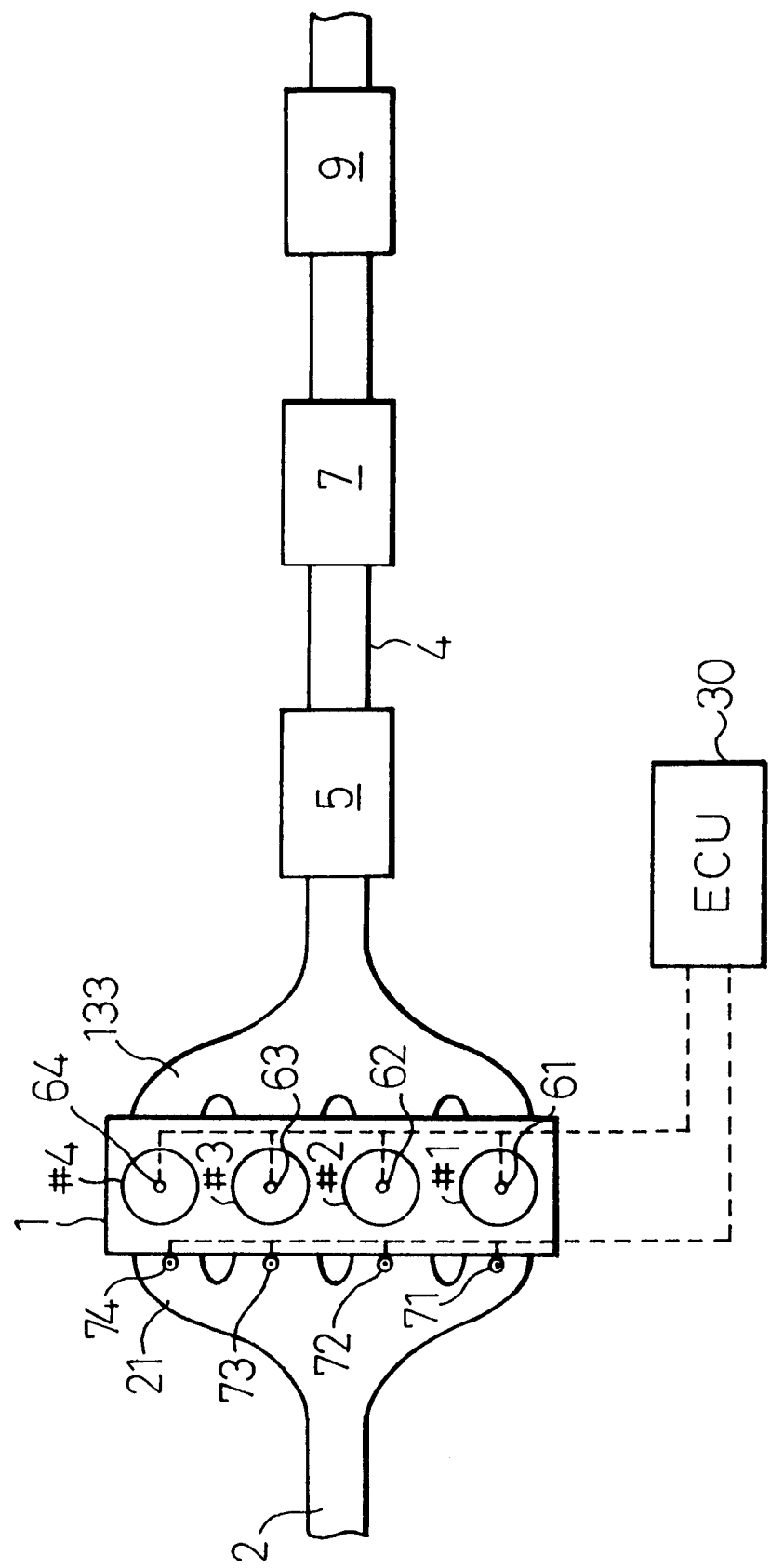
FIG. 13 schematically illustrates another embodiment of the exhaust gas purification device according to the present invention.

Next, another embodiment of the present invention is explained with reference to FIG. 13. In FIG. 13, reference numerals the same as those in the previous embodiments designate the same elements.

In this embodiment, all the cylinders are connected to a common exhaust gas passage 4 via a common exhaust manifold 133, and the three-way catalyst 5, $NO_X$ absorbent 7 and denitrating catalyst 9 are disposed on the exhaust gas passage 4 in this order from the upstream end. Further, in the normal operation of the engine, all the cylinders are operated at a lean air-fuel ratio ($\lambda=\lambda_L$ and $\lambda_L=1.30-1.40$) in this embodiment. In the normal operation, the $NO_X$ produced by the cylinders passes through the three-way catalyst 5 and absorbed by the $NO_X$ absorbent 7. Similarly to the previous embodiments, the rich spike operation is performed in this embodiment when the amount of $NO_X$ in the $NO_X$ absorbent 7 increases by, for example, operating the No. 2 and No. 3 cylinders at a rich air-fuel ratio of $\lambda=0.87$ and the No. 1 and No. 4 cylinders at a lean air-fuel ratio of $\lambda=1.03$. Therefore, the exhaust gases from the No. 2 and No. 3 cylinders and the No. 1 and No. 4 cylinders are mixed to form the exhaust gas mixture of $\lambda=0.95$. Since this exhaust gas mixture of a rich air-fuel ratio ($\lambda=0.95$) flows into the three-way catalyst 5, $NH_3$ is produced at the three-way catalyst 5. Since $NH_3$ has a large reducing capability, when the $NH_3$ produced at the three-way catalyst 5 flows into the $NO_X$ absorbent 7 downstream of the three-way catalyst 5, the absorbed $NO_X$ is released from the $NO_X$ absorbent 7 and reduced to $N_2$ in a short time. Further, the $NH_3$ adsorbing substance is attached to the substrate of the denitrating catalyst 9 downstream of the $NO_X$ absorbent 7 also in this embodiment. Therefore, even if the amount of $NH_3$ produced by the three-way catalyst 5 during the rich spike is larger than the amount required to reduce the $NO_X$ released from the $NO_X$ absorbent 7, the surplus $NH_3$ is adsorbed by and stored in the denitrating catalyst 9 and, thereby, the surplus $NO_X$ is not released into the atmosphere. Further, if a small amount of $NO_X$ passes through the $No_X$ absorbent during the normal (the lean air-fuel ratio) operation of the engine, $NO_X$ is reduced by the denitrating catalyst 9 using the $NH_3$ stored therein. Therefore, according to the present embodiment, $NO_X$ in the exhaust gas from a lean burn engine is purified at a high efficiency.

Figure 14:
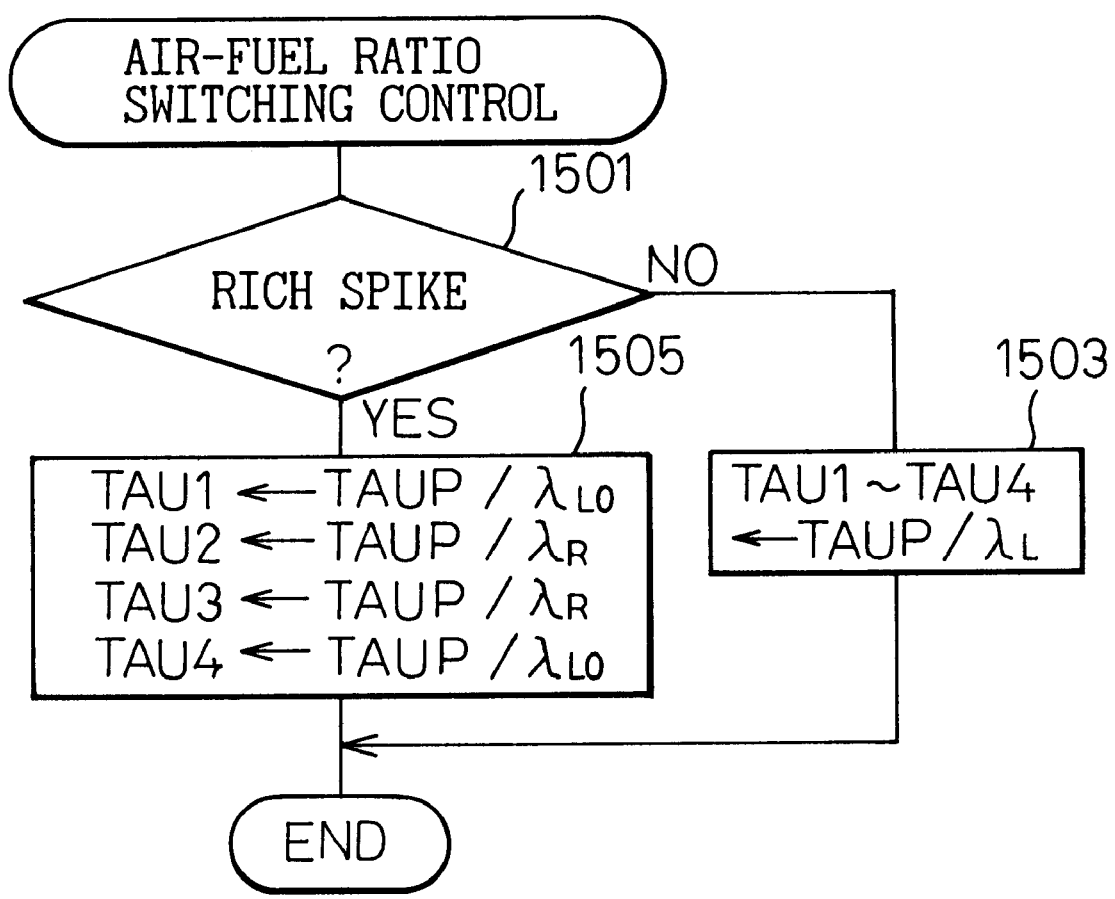
FIG. 14 shows a flowchart explaining an air-fuel ratio switching control of the cylinders in the embodiment in FIG. 13.

FIG. 14 shows a flowchart explaining the air-fuel ratio switching control of the present embodiment. This control is performed by a routine executed by ECU 30 at predetermined intervals.

In FIG. 14, at step 1501, it is determined whether the rich spike operation is being performed at present. Similarly to the embodiment in FIG. 6 the rich spike operation is performed when the operation time of the engine since the rich spike operation was last performed reaches a predetermined value.

If the rich spike operation is not being performed at step 1501, the routine performs step 1503 to set the air-fuel ratio of all the cylinders at $\lambda=\lambda_L$ ($\lambda_L=1.30-1.40$). When all the cylinders are operated at $\lambda=\lambda_L$, the $NO_X$ produced in the cylinders is absorbed by the $NO_X$ absorbent 7, and a small amount of $NO_X$ which passes through the $NO_X$ absorbent 7 is reduced by the denitrating catalyst 9 using the $NH_3$ adsorbed therein.

If the rich spike operation is being performed at step 1501, the No. 2 and No. 3 cylinders are operated at a rich air-fuel ratio of $\lambda=\lambda_R$ ($\lambda_R=0.87$), and the No. 1 and No. 4 cylinders are operated at a lean air-fuel ratio of $\lambda=\lambda_{LO}$ ($\lambda_{LO}=1.03$) at step 1505. Therefore, a rich exhaust gas mixture of $\lambda=0.95$ flows into the three-way catalyst 5, and a large amount of $NH_3$ is produced at the three-way catalyst 5. Therefore, the exhaust gas containing a large amount of $NH_3$ flows into the $NO_X$ absorbent downstream of the three-way catalyst 5, and the $NO_X$ absorbed in the $NO_X$ absorbent 7 is released and reduced by $NH_3$, HC and CO in the exhaust gas.

The reason why the No. 2 and No. 3 cylinders are operated at a rich air-fuel ratio and the No. 1 and No. 4 cylinders are operated at a lean air-fuel ratio during the rich spike operation in this embodiment is to ignite the rich air-fuel ratio cylinder and the lean air-fuel ratio cylinder alternately. Namely, since the firing order of the cylinders in this embodiment is 1-3-4-2, by setting the air-fuel ratio of the cylinders as stated above, the exhaust gas from the rich air-fuel ratio cylinder (the No. 2 and No. 3 cylinders) and the exhaust gas from the lean air-fuel ratio cylinder (the No. 1 and No. 4 cylinders) flows into the common exhaust gas passage 4 alternately and, thereby, a uniform exhaust gas mixture is formed before flowing into the three-way catalyst 5. If the firing order of the cylinders is different, the rich air-fuel ratio cylinders and the lean air-fuel ratio cylinders during the rich spike operation is preferably determined in accordance with the firing order of the cylinders.

In the embodiments explained in FIGS. 1 through 14, an exhaust gas mixture having a rich air-fuel ratio is formed by mixing the exhaust gas from the rich air-fuel ratio cylinder and the exhaust gas from the lean air-fuel ratio cylinder. This exhaust gas mixture containing a larger amount of $NO_X$ than the exhaust gas from the cylinders operated at the air-fuel ratio the same as that of the exhaust gas mixture. Therefore, a larger amount of $NH_3$ can be produced by the three-way catalyst by feeding this exhaust gas mixture. Thus, according to the embodiments explained above, a sufficient amount of NH3 for reducing $NO_X$ in the exhaust gas is supplied and, thereby, $NO_X$ in the exhaust gas can be purified at a high efficiency.

Next, embodiments of the present invention which are different from the embodiments in FIGS. 1 through 14 are explained with reference to FIGS. 15 through 27.

In the embodiments in FIGS. 1 through 14, the concentration of $NO_X$ in the exhaust gas mixture supplied to the conversion means (three-way catalyst) is increased by mixing the exhaust gases from the rich air-fuel ratio cylinders and the lean air-fuel ratio cylinders. However, the embodiments in FIGS. 15 through 27 are different from the embodiments in FIGS. 1 through 14 in that the concentration of $NO_X$ in the exhaust gas supplied to the conversion means is increased by increasing the amount of $NO_X$ produced by the rich air-fuel ratio cylinders.

FIGS. 15 through 18 illustrate the general configurations of the embodiments having various means for increasing the amount of $NO_X$ produced in the rich cylinders.

Figure 15:
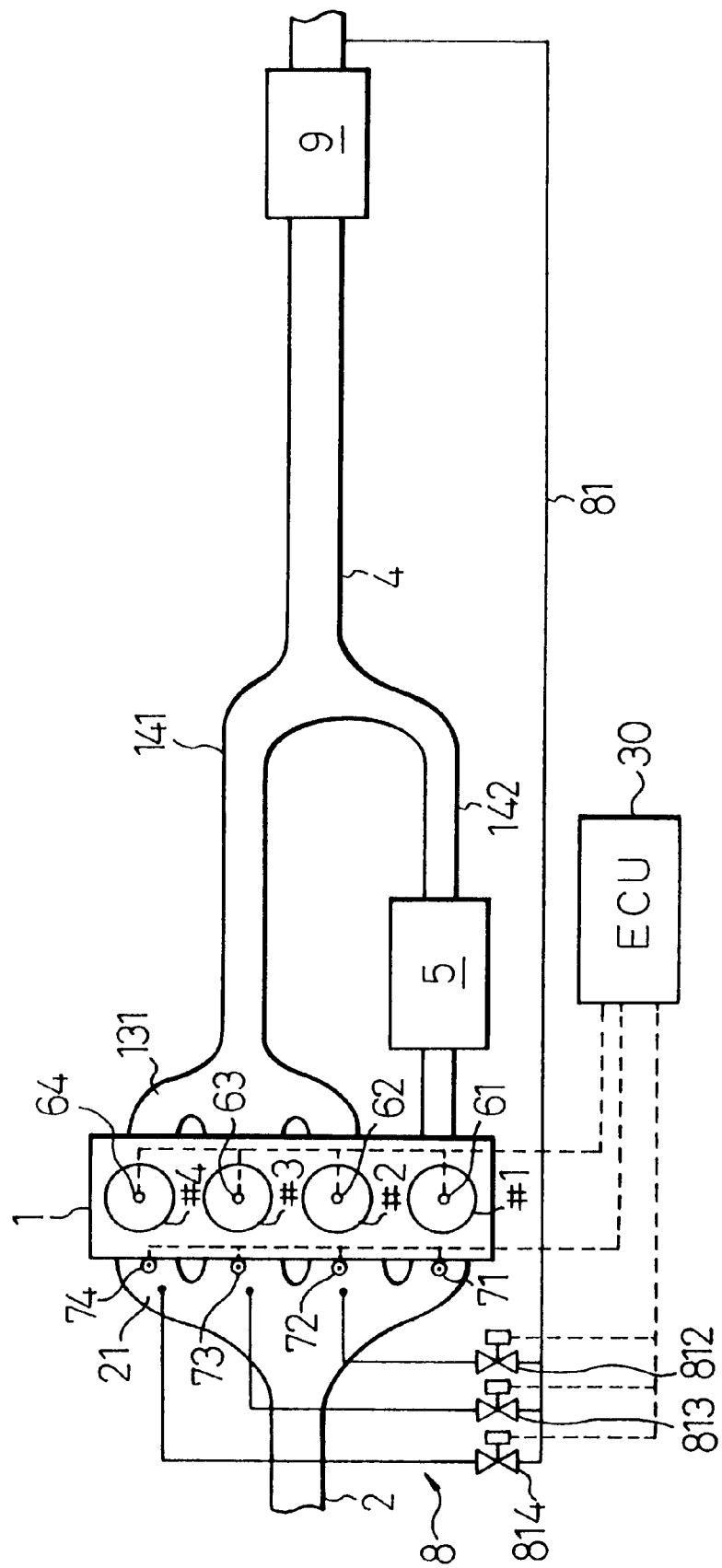
FIG. 15 schematically illustrates another embodiment of the exhaust gas purification device according to the present invention.
Figure 16:
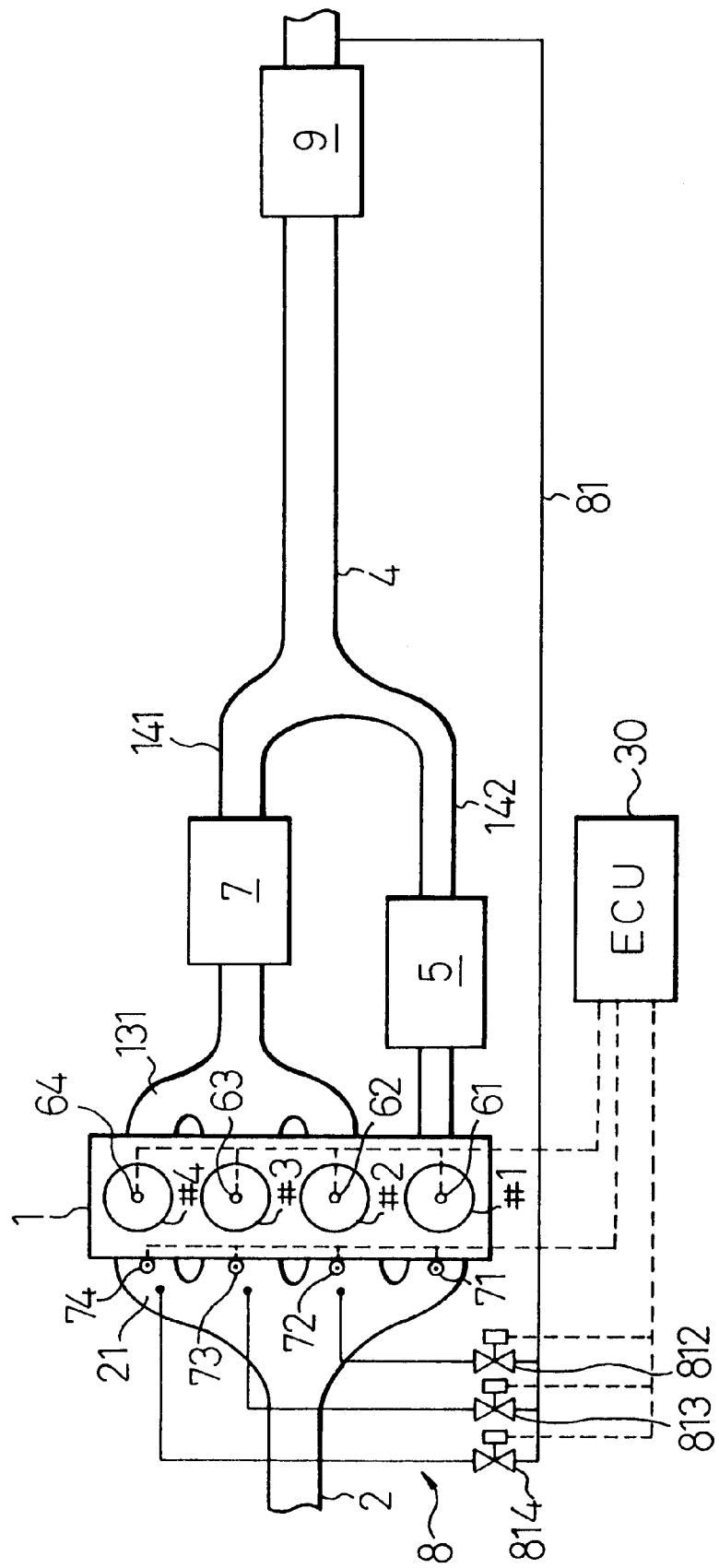
FIG. 16 schematically illustrates another embodiment of the exhaust gas purification device according to the present invention.
Figure 17:
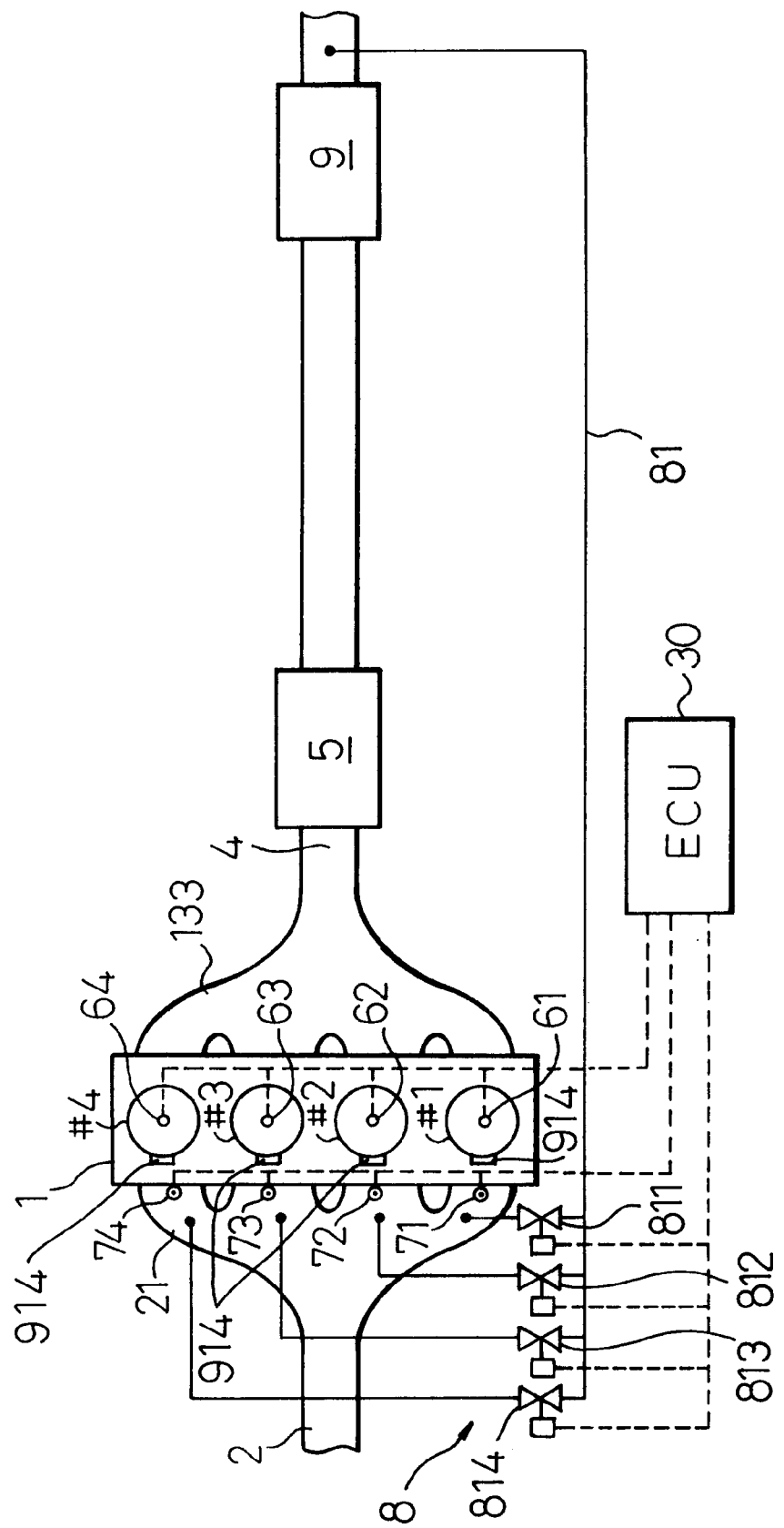
FIG. 17 schematically illustrates another embodiment of the exhaust gas purification device according to the present invention.
Figure 18:
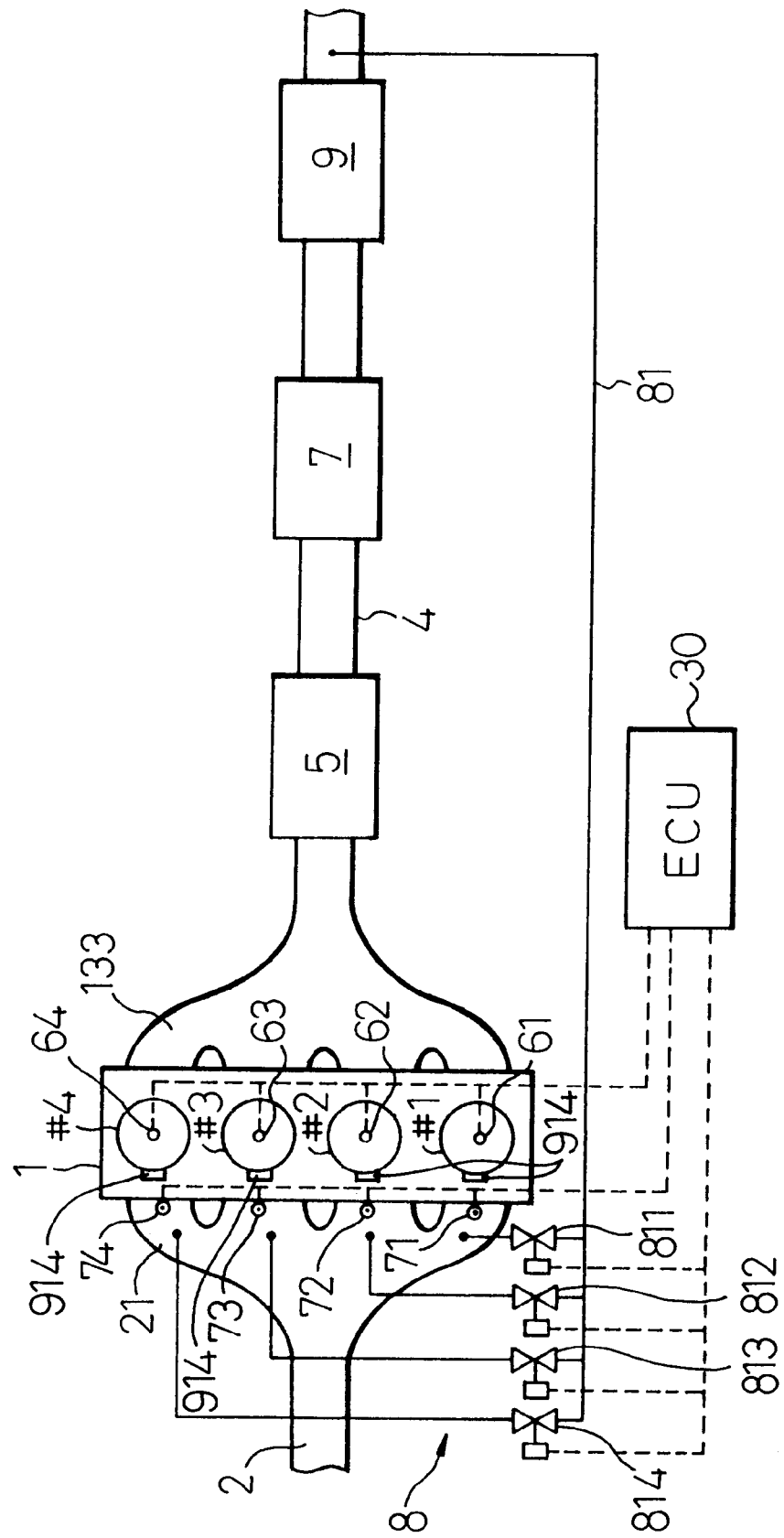
FIG. 18 schematically illustrates another embodiment of the exhaust gas purification device according to the present invention.

FIGS. 15 and 16 illustrate the embodiments when the present invention is applied to lean burn engines in which specific cylinders are always operated at a rich air-fuel ratio and other cylinders of the engine are always operated at a lean air-fuel ratio, i.e., lean burn engines in which the rich air-fuel ratio cylinders are fixed. This type of the engine will be hereinafter referred to as "the fixed rich air-fuel ratio cylinder engines". Further, FIGS. 17 and 18 show the embodiments when the present invention is applied to lean burn engines in which the cylinders operated at a rich air-fuel ratio are changed sequentially, i.e., lean burn engines in which the cylinders operated at a rich air-fuel ratio are not fixed. This type of the engines, therefore, will be hereinafter referred to as "the variable rich air-fuel ratio cylinder engines".

In FIGS. 15 through 18, reference numerals the same as those in FIGS. 1, 5, 7, 10 and 13 represent the same elements.

First, FIG. 15 is explained. In FIG. 15, the engine 1 is a fixed rich air-fuel ratio cylinder engine in which the No. 1 cylinder is always operated at a rich air-fuel ratio (for example, λ=0.95) and other cylinders (the No. 2 to No. 4 cylinders) are always operated at a lean air-fuel ratio (for example, λ=1.30–1.40). In FIG. 15, the exhaust ports of the No. 2 to No. 4 cylinders are connected to a lean air-fuel ratio exhaust gas passage 141 via an exhaust manifold 131 and the exhaust port of the No. 1 cylinder is connected to a rich air-fuel ratio exhaust gas passage 142. A three-way catalyst 5 which acts as the conversion means is disposed on the rich air-fuel ratio exhaust gas passage 142. The rich air-fuel ratio exhaust gas passage 142 and the lean air-fuel ratio exhaust gas passage 141 merge to a main exhaust gas passage 4 on which a denitrating catalyst 9 is disposed.

In FIG. 15, numeral 21 designates an intake manifold connecting the intake ports of the No. 1 through No. 4 cylinders to a common intake air passage 2. On the intake air manifold 2, fuel injection valve 71 through 74 are disposed near the intake ports of the respective cylinders to inject fuel in accordance with fuel injection signal from the ECU 30. Further, numeral 8 in FIG. 15 designates an exhaust gas recirculating (EGR) device. In this embodiment, the EGR device comprises an EGR passage 81 connected to the main exhaust gas passage 4 downstream of the denitrating catalyst 9 at one end thereof. The branch passages of the intake manifold 21 connected to the intake ports of the No. 2 to No. 4 cylinders are connected to the EGR passage 81 via solenoid valves 812 to 814. In this embodiment, the solenoid valves 812 to 814 opens in accordance with the signal from the ECU 30 and feed the exhaust gas from the main exhaust gas passage 4 to the intake ports of the respective cylinders during the intake stroke of the cylinders.

In this embodiment, the rich air-fuel ratio exhaust gas from the No. 1 cylinder flows into the three-way catalyst 5, and a part of $NO_X$ in the exhaust gas is converted to $NH_3$ by the three-way catalyst 5 while the remaining $NO_X$ is reduced to $N_2$. Thus, the exhaust gas flowing into the main exhaust gas passage 4 from the rich air-fuel ratio exhaust gas passage 142 contains $NH_3$. This rich air-fuel ratio exhaust gas from the passage 142 mixes with the lean air-fuel ratio exhaust gas from the passage 141 which contains a relatively large amount of $NO_X$ produced by the cylinders No. 1 through No. 3. In this embodiment, the air-fuel ratios of No. 1 cylinder and the No. 2 to No. 4 cylinders are selected so that the air-fuel ratio of the exhaust gas mixture formed in the main exhaust gas passage 4 becomes lean (λ>1.0).

Therefore, the exhaust gas mixture having a excess air ratio λ larger than 1.0 and containing both $NH_3$ and $NO_X$ flows into the denitrating catalyst 9. Further, the length of the exhaust gas passages 141, 142 and 4 are selected so that the temperature of the exhaust gas mixture flowing into the denitrating catalyst 9 is in the specific temperature range of denitrating catalyst 9 as explained in FIG. 1. Therefore, $NH_3$ and $NO_X$ as well as HC and CO in the exhaust gas mixture are purified by the denitrating catalyst 9. However, usually the amount of $NO_X$ in the exhaust gas from the rich air-fuel ratio cylinder is relatively small, and the amount of $NO_X$ produced by the three-way catalyst 5 becomes small accordingly. Therefore, in order to produce a sufficient amount of $NH_3$ for reducing all the $NO_X$ in the exhaust gas, means are provided for increasing the concentration of $NO_X$ in the rich air-fuel ratio exhaust gas from the No. 1 cylinder. The means for increasing the concentration of $NO_X$ are explained later.

FIG. 16 shows another embodiment when the present invention is applied to the fixed rich air-fuel ratio cylinder engine similar to the engine in FIG. 15. In FIG. 16, reference numerals the same as those in FIG. 15 designate the same elements. Further, means are also provided in this embodiment for increasing the concentration of $NO_X$ in the rich air-fuel ratio exhaust gas from the No. 1 cylinder. The embodiment in FIG. 16 is different from that in FIG. 15 in that the $NO_X$ absorbent 7 is disposed on the lean air-fuel ratio exhaust gas passage 141, and the exhaust gas from the lean air-fuel ratio cylinders No. 2 to No. 3 flows into the main exhaust gas passage 4 after passing through the $NO_X$ absorbent 7. In this embodiment, a large part of the $NO_X$ in the exhaust gas from the lean air-fuel ratio cylinders No. 2 to No. 4 is absorbed by the $NO_X$ absorbent 7, and a remaining small amount of $NO_X$ which is not absorbed by the $NO_X$ absorbent 7 flows into the main exhaust gas passage 4 and the denitrating catalyst 9. Therefore, the amount of $NH_3$ required for reducing the $NO_X$ by the denitrating catalyst 9 becomes smaller compared to that in the embodiment of FIG. 15.

In this embodiment, when the $NO_X$ absorbed in the $NO_X$ absorbent 7 increases, the rich spike operation in which ten No. 2 to No. 4 cylinders are operated at a rich air-fuel ratio for a short time is performed in order to prevent the $NO_X$ absorbent 7 from being saturated with the absorbed $NO_X$.

Contrary to FIGS. 15 and 16, FIG. 17 shows an embodiment in which the present invention is applied to the variable rich air-fuel ratio cylinder engine. In this embodiment, all the cylinders No. 1 through No. 4 are connected to a main exhaust gas passage 4 via a common intake manifold 133, and the three-way catalyst 5 and the denitrating catalyst 9 are disposed on the main exhaust gas passage 4. Further, in addition to the solenoid valves 812 to 814, a solenoid valve 811 which connects the EGR passage 81 to the intake port of the No. 1 cylinder is provided.

Figure 19:
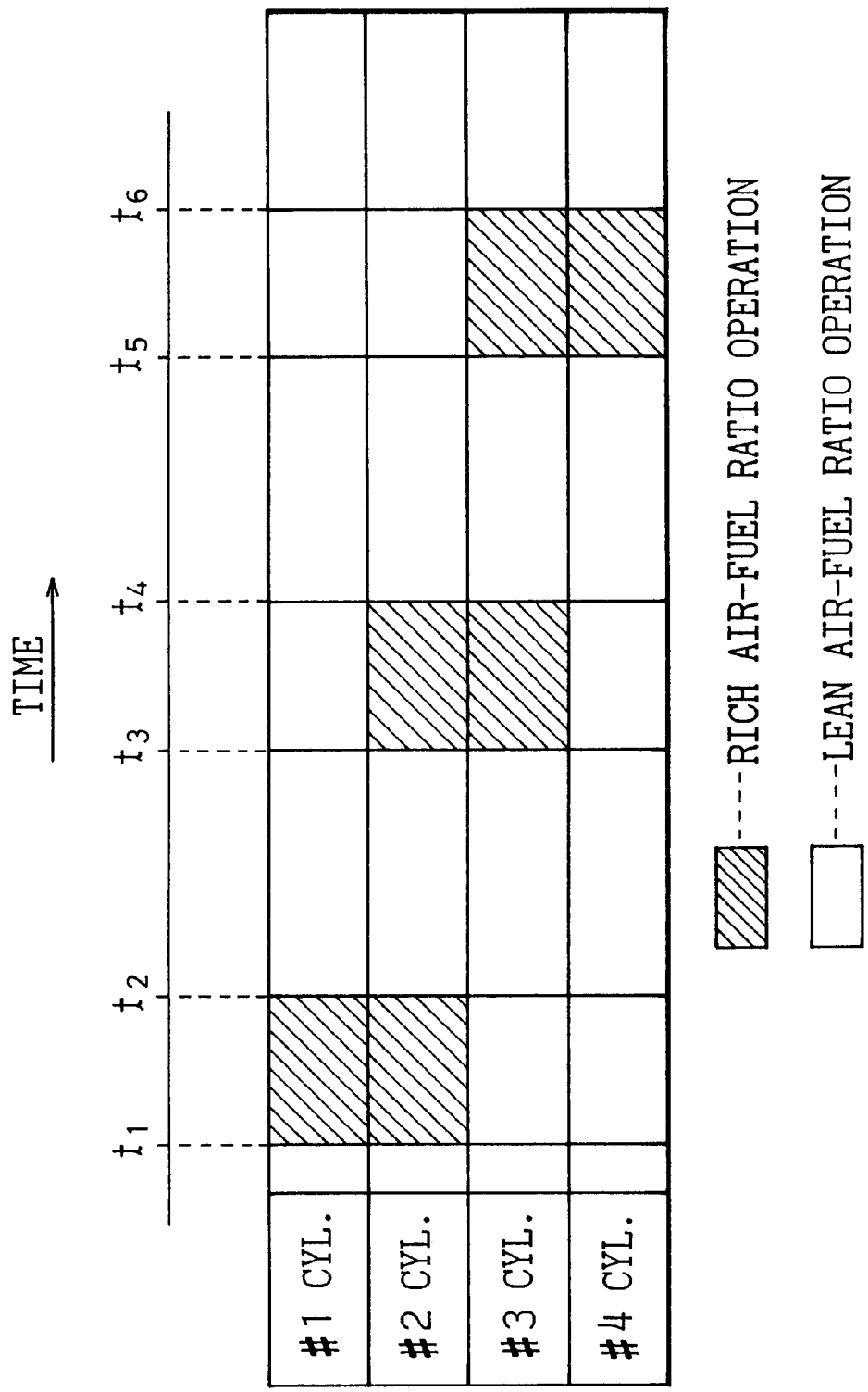
FIG. 19 shows a timing chart illustrating the air-fuel ratio switching control of the cylinders in the embodiment in FIG. 17.

In this embodiment, some of the cylinders of the engine 1 are operated at a rich air-fuel ratio for a predetermined period, and the cylinders to be operated at the rich air-fuel ratio are not fixed but are switched sequentially in such a manner that all the cylinders experience the rich air-fuel ratio operation equally during the operation. FIG. 19 is a timing diagram showing an example of the rich air-fuel ratio operation of the respective cylinders in the case where two cylinders are operated at the rich air-fuel ratio at the same time. In FIG. 19, the hatched areas represent the periods where the respective cylinders are operated at a rich air-fuel ratio. As can be seen from FIG. 19, the No. 1 and No. 2 cylinders are operated at a rich air-fuel ratio and the No. 3 and No. 4 cylinders are operated at a lean air-fuel ratio, for example, during the period from the time $t_1$ to $t_2$, simultaneously. Further, in the subsequent period from the time $t_2$ to $t_3$, all the cylinders No. 1 through No. 4 are operated at a rich air-fuel ratio. Then, in the further subsequent period from the time $t_3$ to $t_4$, the No. 2 and No. 3 cylinders are operated at a rich air-fuel ratio and the No. 1 and No. 4 cylinders are operated at a lean air-fuel ratio. Similarly, all the cylinders are operated at a lean air-fuel ratio in the period from $t_4$ to $t_5$, and the No. 3 and No. 4 cylinders are operated at a rich air-fuel ratio and the No. 1 and No. 2 cylinders are operated at a lean air-fuel ratio during the period from $t_5$ to $t_6$. Namely, in this embodiment, the period in which all the cylinders are operated at a lean air-fuel ratio (for example, the period $t_2$ to $t_3$, and $t_4$ to $t_5$) and the period in which two cylinders are operated at a rich air-fuel ratio and other two cylinders are operated at a lean air-fuel ratio (for example, the period $t_1$ to $t_2$, $t_3$ to $t_4$, and $t_5$ to $t_6$) are repeated alternately. Further, the combinations of the cylinders operated at a rich air-fuel ratio is changed in each rich air-fuel ratio operation period. In the rich air-fuel ratio operation period, the air-fuel ratios of the rich air-fuel ratio cylinders and the lean air-fuel ratio cylinders are selected in such a manner that the air-fuel ratio of the mixture of the exhaust gases from all the cylinders becomes rich ($\lambda \leq 1.0$). Therefore, in this embodiment, the excess air ratio of the exhaust gas mixture flowing into the exhaust gas passage 4 alternately changes between $\lambda \leq 1.0$ and $\lambda > 1.0$.

When the excess air ratio of the exhaust gas mixture flowing into the three-way catalyst 5 is rich ($\lambda \leq 1.0$), a part of $NO_X$ in the exhaust gas is converted to $NH_3$, and the remaining part of $NO_X$ in the exhaust gas is reduced to $N_2$. When the excess air ratio of the exhaust gas mixture flowing into the three-way catalyst 5 is lean $\lambda > 1.0$), $NO_X$ in the exhaust gas passes through the three-way catalyst 5 without being reduced. Therefore, the rich air-fuel ratio exhaust gas containing $NH_3$ and the lean air-fuel ratio exhaust gas containing $NO_X$ flows into the denitrating catalyst 9 alternately in this embodiment.

A $NH_3$ adsorbing substance as explained in FIG. 10 is attached to the substrate of the denitrating catalyst 9 also in this embodiment. Therefore, when the rich air-fuel ratio exhaust gas containing $NH_3$ flows into the denitrating catalyst 9, $NH_3$ in the exhaust gas is adsorbed by and stored temporarily in the denitrating catalyst 9, and when the lean air-fuel ratio exhaust gas containing $NO_X$ flows into the denitrating catalyst 9, $NO_X$ is reduced at the denitrating catalyst 9 by the $NH_3$ stored in the denitrating catalyst 9.

In this embodiment, a sufficient amount of $NH_3$ for reducing the $NO_X$ discharged from cylinders during the lean air-fuel ratio operation period must be stored in the denitrating catalyst 9 during the rich air-fuel ratio operation period. Therefore, also the means for increasing $NO_X$ in the exhaust gas from the rich air-fuel ratio cylinders are provided in order to increase the amount of $NO_X$ produced by the three-way catalyst 5.

This means for increasing $NO_X$ in the exhaust gas from the rich air-fuel ratio cylinders will be explained later.

FIG. 18 shows another embodiment where the present invention is applied to the variable rich air-fuel ratio cylinder engine. The embodiment in FIG. 18 is only different from the embodiment in FIG. 17 in that the $NO_X$ absorbent 7 is disposed on the exhaust gas passage 4 between the three-way catalyst 5 and the denitrating catalyst 9. In this embodiment, during the lean air-fuel ratio operation period, a large part of $NO_X$ in the exhaust gas passes through the three-way catalyst 5 without being reduced. This $NO_X$ flows into the $NO_X$ absorbent 7 downstream of the three-way catalyst 5 and absorbed in the $NO_X$ absorbent 7. In this case, a small amount of $NO_X$ passes through the $NO_X$ absorbent 7 without being absorbed and flows into the denitrating catalyst 9 where the $NO_X$ is reduced by the $NH_3$ stored in the denitrating catalyst 9. Conversely, during the rich air-fuel ratio operation period, the rich air-fuel ratio exhaust gas containing $NH_3$ flows into the $NO_X$ absorbent 7. Therefore, the absorbed $NO_X$ is released from the $NO_X$ absorbent 7 and reduced by $NH_3$ as well as HC and CO in the exhaust gas at the $NO_X$ absorbent 7. In this case, the surplus $NH_3$ which is not used for reducing the $NO_X$ released from the $NO_X$ absorbent 7 flows into the denitrating catalyst 9 and adsorbed and stored therein.

In this embodiment, the amount of $NH_3$ produced by three-way catalyst 5 during the rich air-fuel ratio operation period must be sufficient for reducing all the $NO_X$ produced by the cylinders during the lean air-fuel ratio operation period. Therefore, to increase the amount of $NH_3$ produced by the three-way catalyst 5, means are provided for increasing the concentration of $NO_X$ in the exhaust gas from the rich air-fuel ratio cylinders.

As explained in FIG. 2, the production rate of $NH_3$ in the three-way catalyst 5 becomes the maximum when the excess air ratio $\lambda$ of the exhaust gas is lower than or equals to 0.95. Therefore, in the embodiments in FIGS. 15 through 18, the operating excess air ratio of the respective cylinders are controlled in such a manner that the excess air ratio of the exhaust gas flowing into the three-way catalyst becomes 0.95. Namely, in the embodiments in FIGS. 15 and 16, the No. 1 cylinder is operated at excess air ratio $\lambda = 0.95$, and in the embodiments in FIGS. 17 and 18, the excess air ratios of the rich air-fuel ratio cylinders and the lean air-fuel ratio cylinders are selected so that the excess air ratio of the mixtures of the exhaust gases from these cylinders becomes 0.95. Further, when the production rate of the $NH_3$ at the three-way catalyst 5 is the same, the amount of $NH_3$ produced by the three-way catalyst 5 increases as the concentration of $NO_X$ in the exhaust gas. Therefore, in this embodiment, means are provided to increase the concentration of $NO_X$ in the exhaust gas from the cylinders by increasing the amount of $NO_X$ produced by the cylinders.

Next, the means for increasing the $NO_X$ in the exhaust gas from the cylinders which is used in the embodiments in FIGS. 15 through 18 is explained.

When assuming that the operating excess air ratio $\lambda$ is constant (for example, $\lambda=0.95$), the amount of $NO_X$ produced by the combustion in the cylinder can be increased by the following means:

(1) Advancing the ignition timing of the cylinder.

(2) Increasing the compression ratio of the cylinder.

(3) Decreasing the amount of EGR gas supplied to the cylinder.

(4) Feeding the cylinder a substance which produces $NO_X$ when burns.

Hereinafter, these means are explained one by one.

(1) Advancing the ignition timing of the cylinder.

Figure 20:
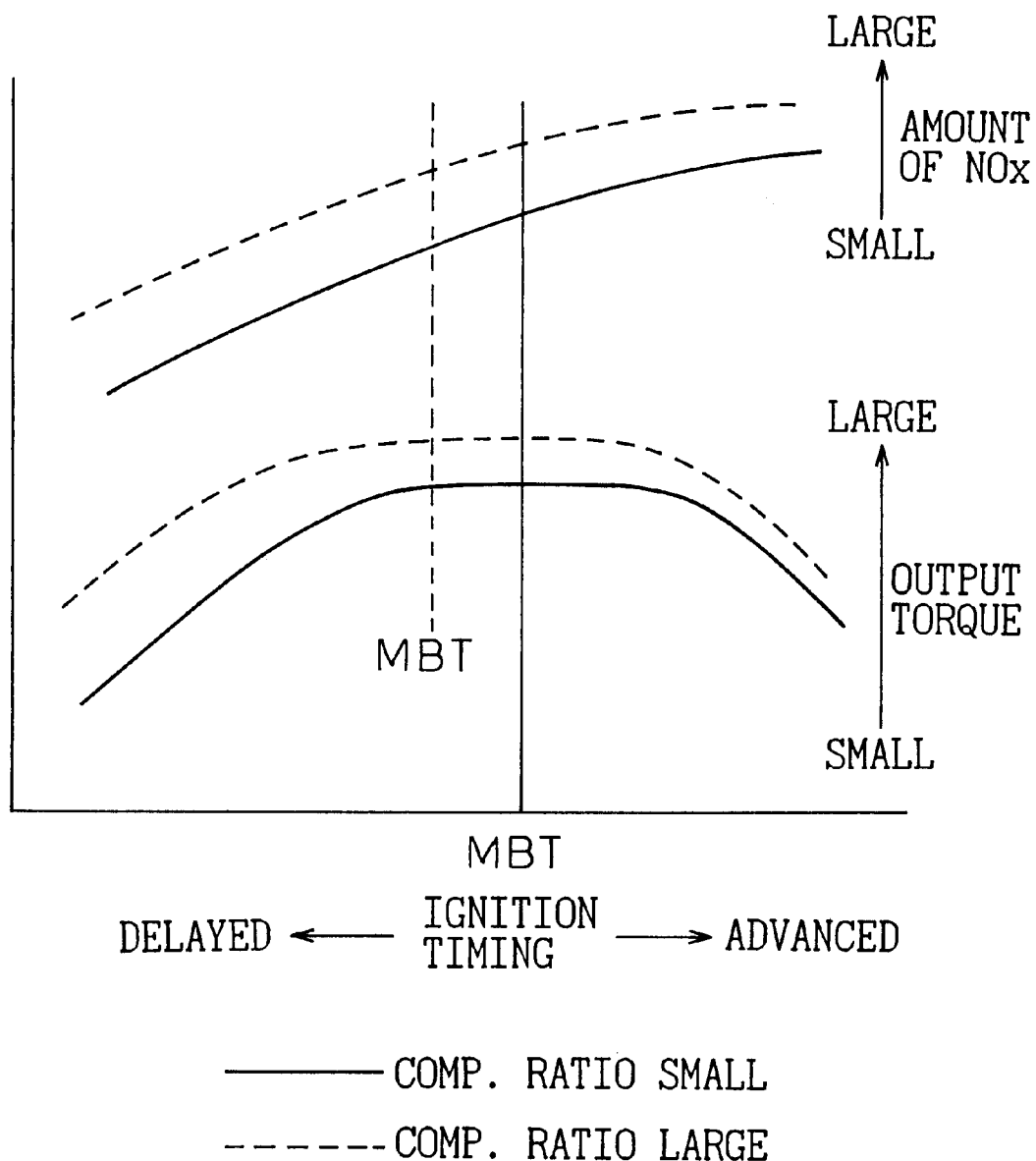
FIG. 20 is a graph showing the change in the amount of $NO_X$ produced in the cylinder in accordance with the changes in the ignition timing and the compression ratio of the cylinder.

When the ignition timing is advanced, the maximum temperature of the combustion in the cylinder becomes higher, and the amount of $NO_X$ produced by the combustion in the cylinder increases. FIG. 20 is a graph illustrating the changes in the amount of $NO_X$ produced by the combustion in the cylinder and the output torque of the engine in accordance with the changes in the ignition timing and compression ratio of the cylinder. As can be seen from FIG. 20, in the region where the ignition timing is relatively late (delayed), the output increases as the ignition timing is advanced, and reaches the maximum torque region where the output torque becomes constant regardless of the change in the ignition timing. When the ignition timing is advanced beyond the maximum torque region, the output torque decreases as the ignition timing is advanced. The center of the maximum torque region in FIG. 20 where the output torque curve is substantially flat is usually referred to as a MBT (Minimum Advance for Best Torque) and, since the output torque of the engine becomes the maximum at the MBT when other conditions are the same, the ignition timing of the engine is usually set at near the MBT. It is known that the MBT is delayed as the air-fuel ratio of the cylinder becomes lean.

On the other hand, the amount of $NO_X$ produced by the cylinder almost uniformly increases as the ignition timing advances. Therefore, the amount of $NO_X$ produced by the cylinder can be increased by advancing the ignition timing of the cylinder beyond the MBT.

(2) Increasing the compression ratio of the cylinder.

When the compression ratio of the cylinder is increased, since the maximum combustion temperature and pressure increases, the amount of $NO_X$ produced by the combustion increases. The broken line in FIG. 20 indicates the output torque and the amount of $NO_X$ produced in the case where the compression ratio of the cylinder is larger than that of the case designated by the solid line in FIG. 20. As can be seen from FIG. 20, both the output torque at MBT and the amount of produced $NO_X$ increase as the compression ratio of the cylinder becomes larger. Therefore, for example, in the fixed rich air-fuel ratio cylinder engines as shown in FIGS. 15 and 16, the amount of $NO_X$ produced by the rich air-fuel ratio cylinders can be increased by setting the compression ratio of the rich air-fuel ratio cylinders at a higher value than other cylinders of the engine. Further, in the variable rich air-fuel ratio cylinder engines as shown in FIGS. 17 and 18, a variable compression mechanism (designated by numerals 911 to 914 in FIGS. 17 and 18) may be provided to the respective cylinders. Each of the variable compression mechanisms 911 to 914 comprises, for example, a sub-cylinder communicating to the engine cylinder and a plunger disposed in the cylinder. The compression ratio of the rich air-fuel ratio cylinders can be changed by adjusting the inner volume of the sub-cylinders of the rich air-fuel ratio cylinders by adjusting the position of the plunger.

As shown in FIG. 20, the optimum ignition timing (MBT) delays as the compression ratio of the cylinder becomes larger. Therefore, when the compression ratios of the rich air-fuel ratio cylinders are increased, the ignition timing of the rich air-fuel ratio cylinders becomes earlier (advanced) than the MBT even if the ignition timing of the rich air-fuel ratio cylinders are set at the same as the ignition timing of other cylinders due to delay of the MBT in the rich air-fuel ratio cylinders. This means that when only the compression ratios of the rich air-fuel ratio cylinders are increased, both the effect of the increased compression ratio and of the advancing of the ignition timing can be obtained.

However, when the compression ratios of the cylinders are increased, the engine knock occurs due to preignition in the cylinders. The engine knock can be prevented by keeping the wall temperature of the combustion chamber of the rich air-fuel ratio cylinders at a low value by increasing the cooling capacity of the cooling system of the rich air-fuel ratio cylinders. By increasing the cooling capacity of the rich air-fuel ratio cylinders, the amount of $NO_X$ produced by the rich air-fuel ratio cylinders can be largely increased by largely increasing the compression ratio of the rich air-fuel ratio cylinders.

In order to increase the cooling capacity of the rich air-fuel ratio cylinders, a radiator may be disposed at the position where the hot air from the radiator does not hit the rich air-fuel ratio cylinders. Further, the cooling water passage of the cylinder may be arranged in such a manner that the low temperature cooling water flowing out from the radiator first passes the rich air-fuel ratio cylinders.

(3) Decreasing the amount of EGR gas supplied to the cylinder.

When the exhaust gas recirculation (EGR) is carried out, the maximum temperature of the combustion in the cylinders becomes low because the inert gas (exhaust gas) which does not contribute to the combustion is introduced into the cylinder by the EGR. Therefore, the EGR is usually used for reducing the $NO_X$ produced by the engine. This means that the $NO_X$ produced by the rich air-fuel ratio cylinders can be increased by reducing the amount of the EGR gas (or stop the supply of the EGR gas) supplied to the rich air-fuel ratio cylinders. For example, in the fixed rich air-fuel ratio cylinder engines in FIGS. 15 and 16, the intake port of the rich air-fuel ratio cylinder No. 1 is not connected to the EGR passage 81 while other cylinders are connected to the EGR passage 81 by the solenoid valve 812 to 814. Therefore, since the EGR gas is not supplied to the rich air-fuel ratio cylinder, the amount of $NO_X$ produced by the rich air-fuel ratio cylinder increases. Regarding the means for reducing (or stopping) the supply of the EGR gas to the rich air-fuel ratio cylinders in the variable rich air-fuel ratio engines as shown in FIGS. 17 and 18 will be explained later.

(4) Feeding the cylinder a substance which produces $NO_X$ when burns.

It is known that the aromatic hydrocarbons such as benzene, toluene, xylene and styrene produce a relatively large amount of $NO_X$ when burned. Therefore, the amount of $NO_X$ produced in the rich air-fuel ratio cylinders can be increased by adding such a substance to the fuel injected to the rich air-fuel ratio cylinders. In the fixed rich air-fuel ratio cylinder engines as showing in FIGS. 15 and 16, the rich air-fuel ratio cylinders are provided with a separate fuel system, and the $NO_X$ increasing substance can be added to the fuel system connected to the rich air-fuel ratio cylinders. In the variable rich air-fuel ratio cylinder engines, each of the cylinders of the engine is provided with two fuel injection valves, and the fuel added with the substance is injected from one fuel injection valve when the cylinder is operated at a rich air-fuel ratio and the normal fuel is injected from the other fuel injection valve when the cylinder is operated at a lean air-fuel ratio.

In the present invention, the amount of $NO_X$ produced by the rich air-fuel ratio cylinders is increased using one or more of the above-explained methods (1) to (4).

Hereinafter, the means for increasing the $NO_X$ production in FIGS. 15 through 18 when the above explained methods (1) and (3), i.e., the ignition timing advance and the reduction of EGR gas are applied are explained.

Figure 21:
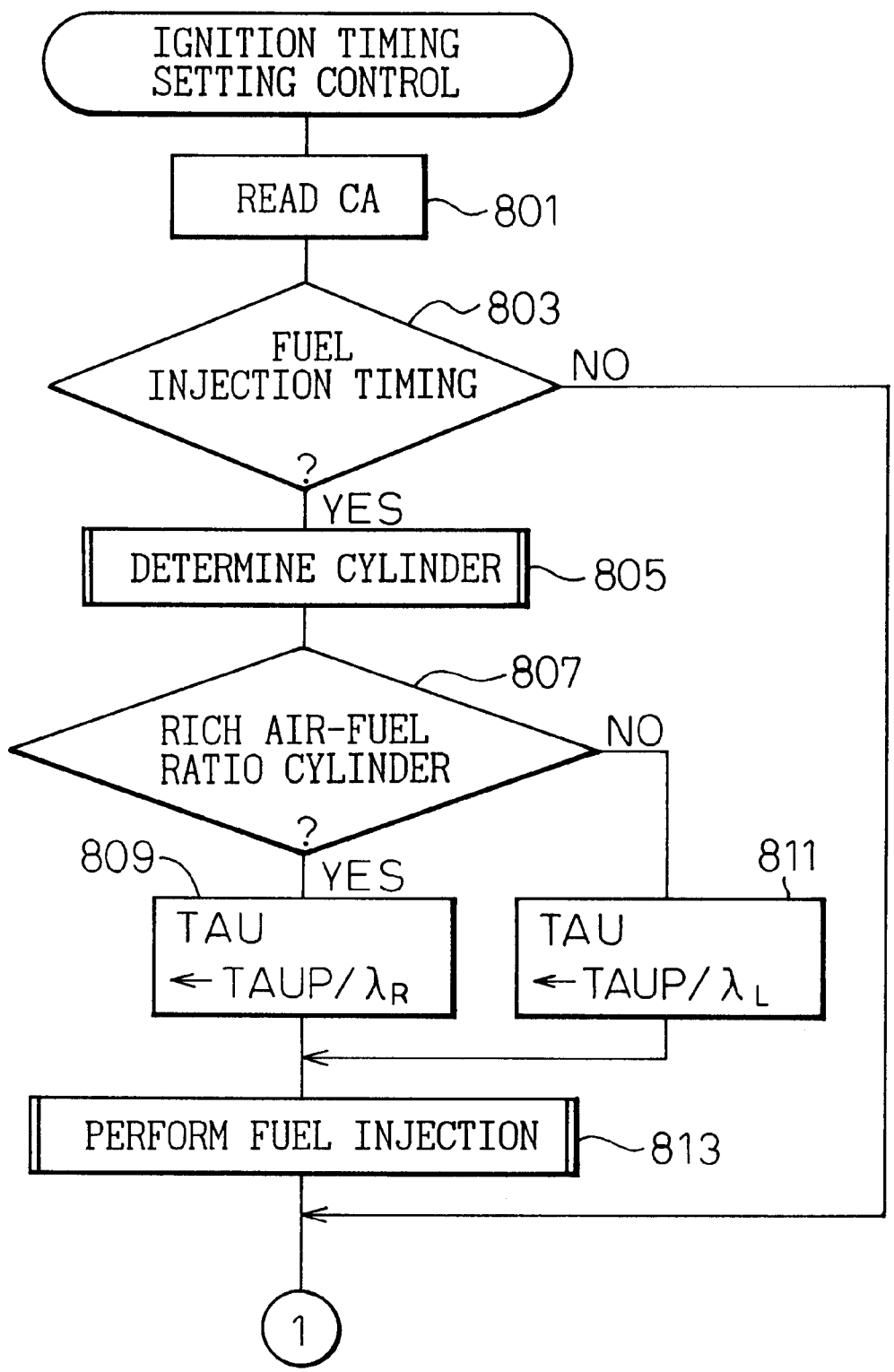
FIGS. 21 and 22 are a flowchart explaining an ignition timing setting operation in the embodiment in FIG. 15.
Figure 22:
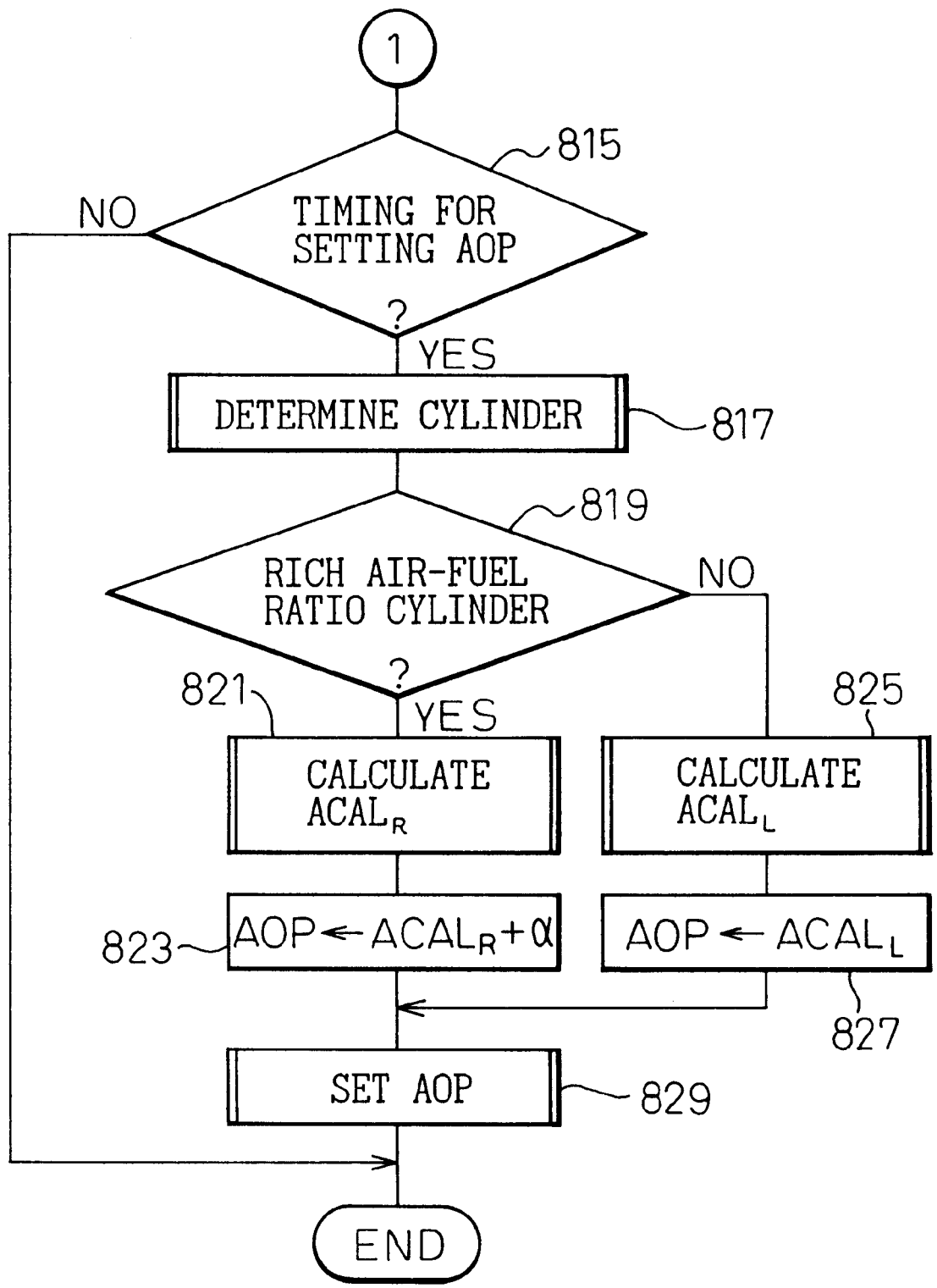

FIGS. 21 and 22 show a flowchart illustrating the control for setting the ignition timing and the fuel injection amount of the embodiment in FIG. 15. This control is performed by a routine executed by the ECU 30 at predetermined rotation angles of the crankshaft of the engine (for example, at every 30° rotation angle).

In FIG. 21, at step 801 through 805, the determination whether any one of the cylinders is at the fuel injection timing (step 803), and if there is a cylinder at the fuel injection timing, the cylinder is identified (step 805) based on the crank angle CA. The steps 801 through 805 are the same steps as steps 601 through 605 in FIG. 6. If no cylinder is at the fuel injection timing at step 803, the routine proceeds to step 815 in FIG. 22 to set the ignition timing of the cylinder.

After the cylinder at the fuel injection timing is identified at step 805, it is determined whether the identified cylinder is the cylinder which should be operated at a rich air-fuel ratio (i.e., in this case, whether it is the No. 1 cylinder) at step 807. If the rich air-fuel ratio cylinder (the No. 1 cylinder) is at the fuel injection timing at step 807, the fuel injection amount TAU of the cylinder is calculated by TAU=TAUP/$\lambda_R$ at step 809. TAUP is the basic fuel injection amount as explained in FIG. 6 and $\lambda_R$ is the target excess air ratio of the rich air-fuel ratio cylinder which is set at $\lambda_R$=0.95 in this embodiment.

If the cylinder at the fuel injection timing is not the rich air-fuel ratio cylinder at step 807, i.e., when one of the lean air-fuel ratio cylinders No. 2 to No. 4 is at the fuel injection timing, the fuel injection amount TAU is calculated by TAU =TAUP/$\lambda_L$ at step 811. $\lambda_L$ is the target excess air ratio of the lean air-fuel ratio cylinders and set at the value larger than 1.0 in this embodiment. After calculating the fuel injection amount TAU at steps 809 or 811, the amount TAU of fuel is injected into the cylinder now at the fuel injection timing. Therefore, the fuel injection amounts of the rich air-fuel ratio cylinder and the lean air-fuel ratio cylinders are controlled at their target air-fuel ratio.

Then the routine performs steps 815 through 829 to set the ignition timing of the cylinders. Namely, at step 815, the routine determines whether it is the timing where the ignition timing AOP of any one of the cylinders should be set, and if it is not the timing, the routine immediately terminates. If it is the timing for setting AOP of any one of the cylinders, the routine identify which cylinder is at the timing for setting AOP at step 817, and determines whether the cylinder identified at step 817 is the rich air-fuel ratio cylinder at step 819.

If the cylinder is the rich air-fuel ratio cylinder, the routine calculates the optimum ignition timing (the MBT) of the rich air-fuel ratio cylinder ACALR at step 821 based on the air-fuel ratio $\lambda_R$ and the engine load condition Q/NE using a numerical table stored in the ROM of the ECU 30. Further, at step 823 the actual ignition timing AOP of the rich air-fuel ratio cylinder is set at the value earlier than the optimum ignition timing ACALR by a predetermined value α.

Namely, the ignition timing AOP of the rich air-fuel ratio cylinder is advanced with respect to the MBT. On the other hand, if the identified cylinder is the lean air-fuel ratio cylinder at step 819, the routine performs steps 825 and 827 to set the ignition timing of the cylinder AOP at the optimum ignition timing ACALL of the lean air-fuel ratio cylinders. After calculating the ignition timing AOP at steps 821, 823 or 825, 827, the timing AOP is set at the ignition circuit to actuate the spark plug of the respective cylinders at the timing corresponding to AOP. By the routine explained above, since the ignition timing of the rich air-fuel ratio cylinder is advanced with respect to the MBT, the amount of $NO_X$ produced by the rich air-fuel ratio cylinder increases.

Figure 23:
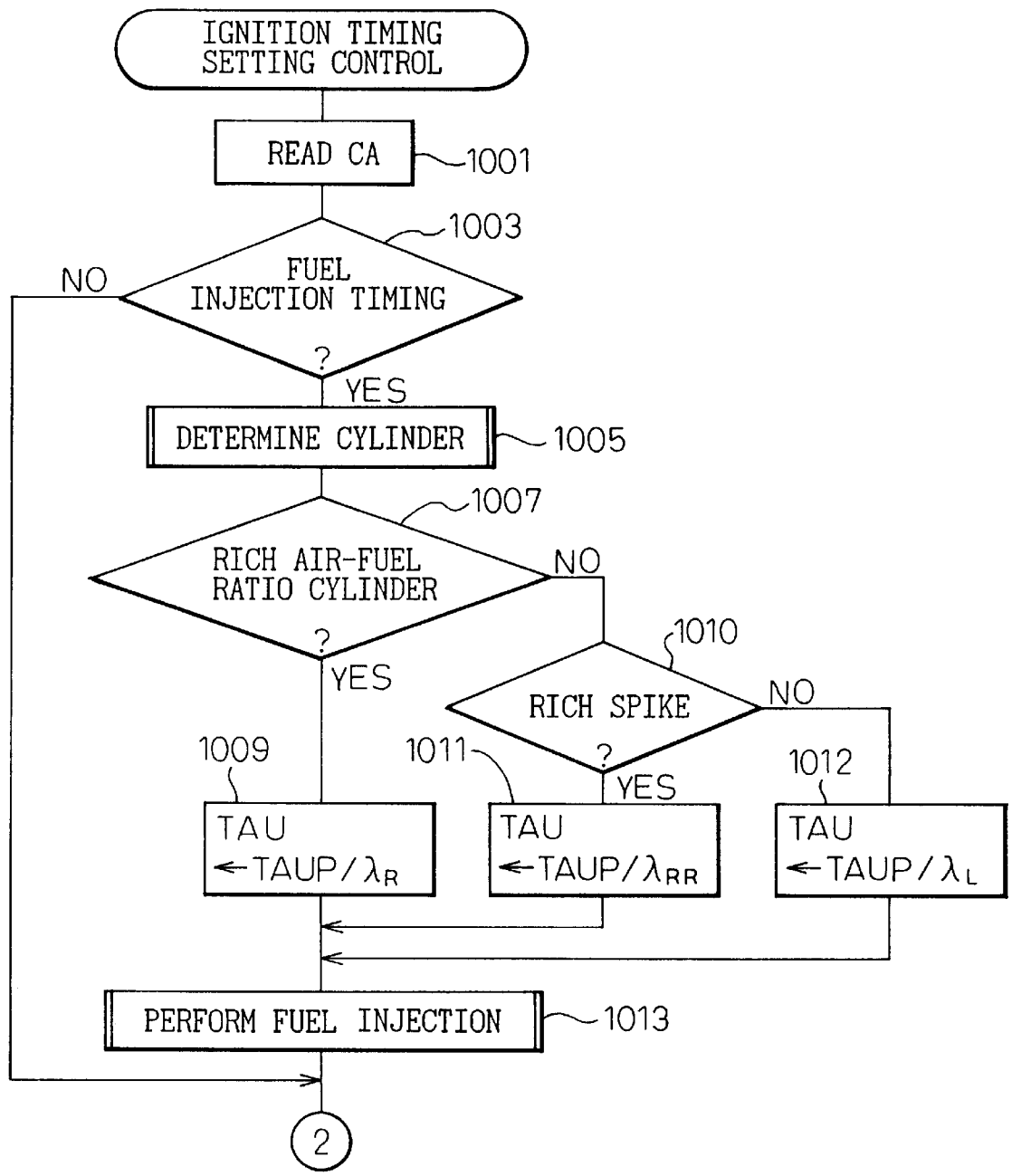
FIGS. 23 and 24 are a flowchart explaining an ignition timing setting operation in the embodiment in FIG. 16.
Figure 24:
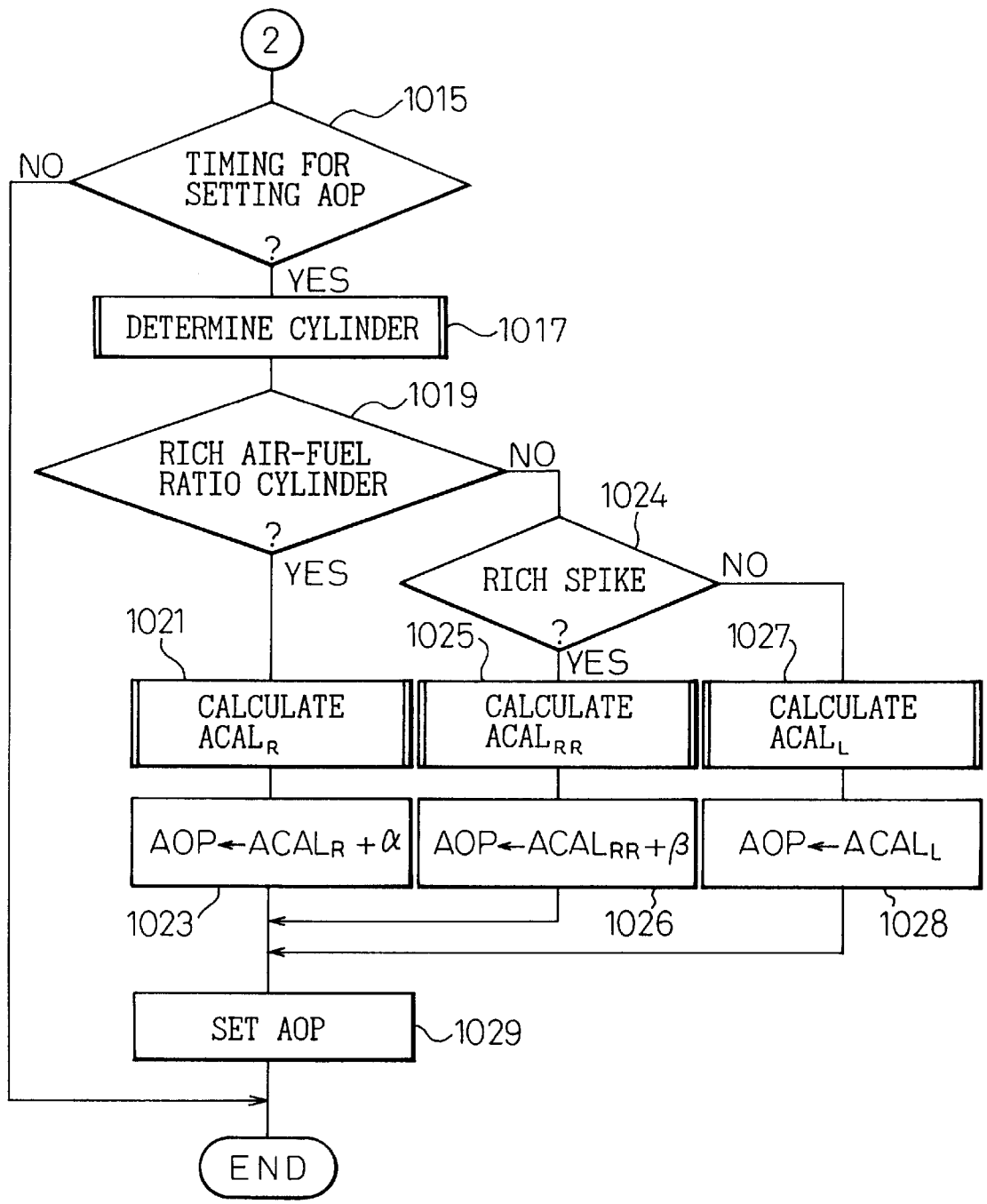

FIGS. 23 and 24 show a flowchart illustrating the control for setting the ignition timing and the fuel injection amount of the embodiment in FIG. 16. This control is performed by a routine executed by the ECU 30 at predetermined angles of rotation of the crankshaft of the engine (for example, at every 30° rotation angle).

In the embodiment in FIG. 16, though the fixed rich air-fuel ratio cylinder engine is used, the rich spike operation of the lean air-fuel ratio cylinders must be performed in order to cause the $NO_X$ absorbent 7 disposed on the exhaust gas passage 141 to release the absorbed $NO_X$. During the rich spike operation, the lean air-fuel ratio cylinders are operated at a rich air-fuel ratio and the ignition timing thereof is largely advanced with respect to the MBT. When the air-fuel ratio of the cylinders are switched from a lean air-fuel ratio to a rich air-fuel ratio, the output torque of the cylinders increases. Therefore, when the rich spike operation is performed, the engine output torque increases suddenly. In this embodiment, the sudden increase of the output torque during the rich spike operation is prevented from occurring by advancing the ignition timing of the lean air-fuel ratio cylinders largely. As can be seen from FIG. 20, when the ignition timing is advanced largely with respect to the MBT, the output torque of the cylinder falls rapidly. Therefore, even through the air-fuel ratio of the lean air-fuel ratio cylinders are switched to a rich air-fuel ratio, a sudden increase in the output torque of the engine does not occur.

In the flowchart of FIGS. 23 and 24, steps 1001 through 1009 and 1015 through 1023 are the same as steps 801 through 809 and 815 through 823. Therefore, only the steps different from those in the flowchart in FIGS. 21 and 22 (i.e., steps 1010 through 1012 and 1024 through 1028) are explained hereinafter.

In FIG. 23, if it is the fuel injection timing for any of the lean air-fuel ratio cylinders at 1007, the routine performs step 1010 to determine whether the rich spike operation is being performed. In this embodiment, the timing for performing the rich spike operation is determined by another routine in the manner same as that in the embodiment in FIG. 5. If the rich spike operation is being performed at step 1010, the fuel injection amount TAU of the lean air-fuel ratio cylinder is calculated by TAU =TAUP/$\lambda_{RR}$ at step 1011. $\lambda_{RR}$ is the target excess air ratio of the lean air-fuel ratio cylinder during the rich spike operation, and is set at a value smaller than 1.0 in this embodiment.

On the other hand, if the rich spike operation is not being performed at step 1010, the fuel injection amount TAU is calculated at step 1012 in the same manner as step 811 in FIG. 21.

Further, in the setting operation of the ignition timing in FIG. 24, when the rich spike operation is being performed at step 1024, the ignition timing AOP of the lean air-fuel ratio cylinders are calculated at steps 1025 and 1026 by AOP= $ACAL_{RR}$+β. $ACAL_{RR}$ is the optimum ignition timing (MBT) when the excess air ratio of the cylinder is $\lambda_{RR}$, and $\beta$ is a relatively large constant. On the other hand, if the rich spike operation is not being performed at step 1024, the ignition timing AOP is calculated at steps 1027 and 1028 in the same manner as steps 825 and 827 in FIG. 22.

As explained above, by performing the routine in FIGS. 23 and 24, the ignition timing of the rich air-fuel ratio cylinder is advanced with respect to the MBT, and the rich spike operation is performed in the lean air-fuel ratio cylinders periodically to cause the $NO_X$ absorbent 7 to release the absorbed $NO_X$. Further, since the ignition timing of the lean air-fuel ratio cylinders is largely advanced with respect to the MBT, the sudden change in the output torque during the rich spike operation does not occur in this embodiment.

Figure 25:
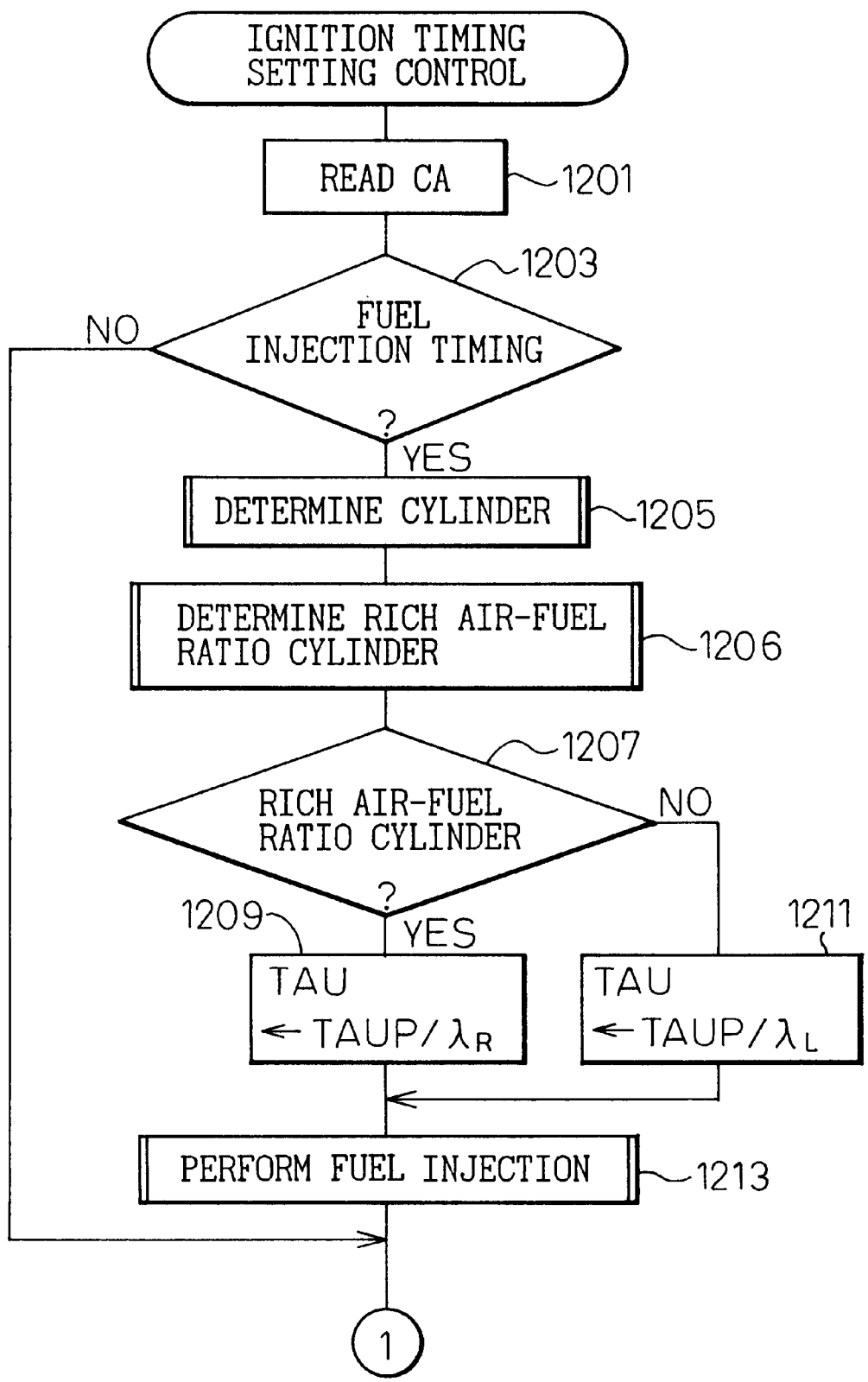
FIGS. 25 and 26 are a flowchart explaining an ignition timing setting operation in the embodiments in FIGS. 17 and 18.
Figure 26:
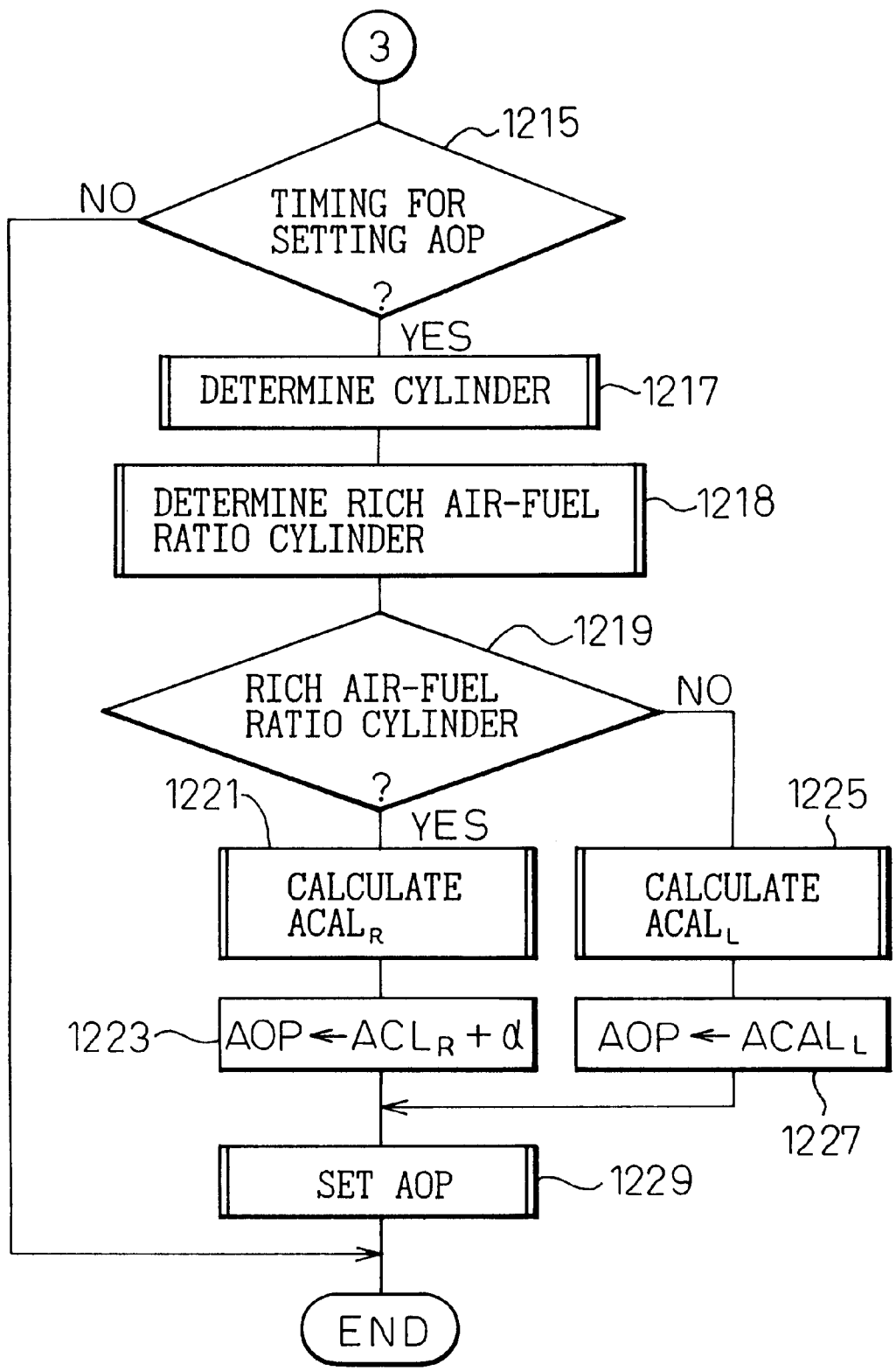

FIGS. 25 and 26 show a flowchart illustrating the control for setting the ignition timing and the fuel injection amount for the variable rich air-fuel ratio cylinder engines in the embodiments in FIGS. 17 and 18. This control is performed by a routine executed by the ECU 30 at predetermined rotation angles of the crankshaft of the engine (for example, at every 30° rotation angle). In this control, the fuel injection amount and the ignition timing of the respective cylinders are switched in accordance with the timing diagram in FIG. 19.

The flowchart in FIGS. 25 and 26 are different from the flowchart in FIGS. 21 and 22 only in that steps 1206 and 1218 are newly added. Namely, in this embodiment, the cylinder which is to be operated at a rich air-fuel ratio is determined at step 1206 and 1218 based on the timing diagram in FIG. 19, and, at step 1207 and 1219, it is determined whether the identified cylinder at step 1203 and 1217 agrees with the rich air-fuel ratio cylinder determined at step 1206 and 1218.

By determining the rich air-fuel ratio cylinders at steps 1206 and 1218 based on the timing diagram in FIG. 19, only the ignition timing of the rich air-fuel ratio cylinder can be advanced with respect to the MBT.

Next, the embodiment in which the amount of $NO_X$ produced in the cylinder is increased by reducing the amount of EGR gas is explained. As explained before, in the fixed rich air-fuel ratio cylinder engines such as in FIGS. 15 and 16, the amount of EGR gas supply can be reduced (supply of EGR gas can be stopped) by disconnecting the rich air-fuel ratio cylinder from the EGR passage. Namely, in FIGS. 15 and 16, the EGR passage 81 is connected only to the lean air-fuel ratio cylinders No. 2 to No. 4 by the solenoid valves 812, 813, 814, and the rich air-fuel ratio cylinder No. 1 is not connected to the EGR passage 81. Therefore, EGR gas is not supplied to the rich air-fuel ratio cylinder No. 1.

Figure 27:
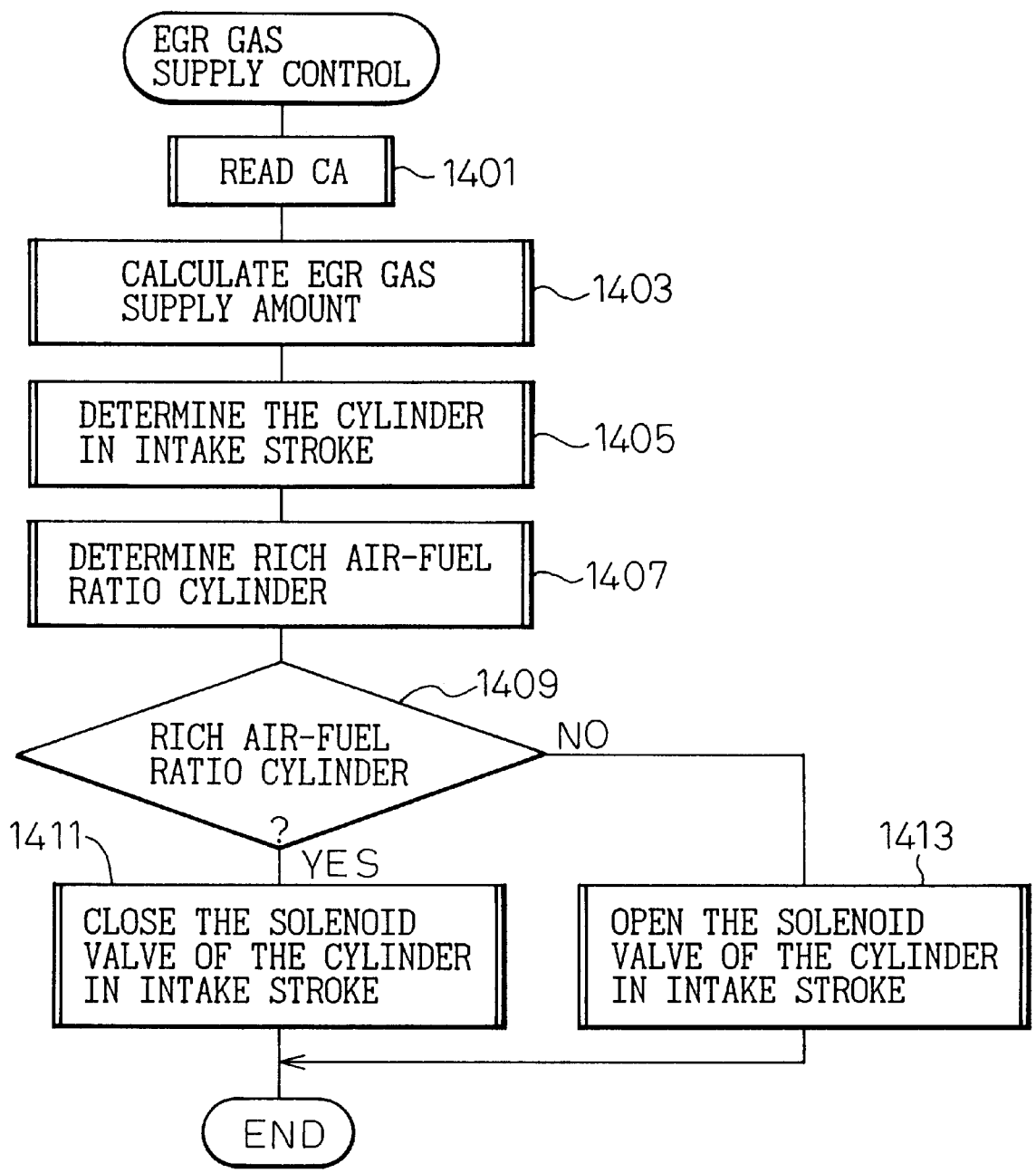
FIG. 27 is a flowchart explaining an exhaust gas recirculation control in the embodiment in FIGS. 17 and 18.

However, since the rich air-fuel ratio cylinders in the variable rich air-fuel ratio cylinder engines in FIGS. 17 and 18 are switched sequentially, the EGR gas supply control in FIG. 27 is required to reduce (stop) the supply of EGR gas to the rich air-fuel ratio cylinders.

FIG. 27 is a flowchart Illustrating the EGR gas supply control in the embodiment in FIGS. 17 and 18. This control is performed by the routine executed by the ECU 30 at predetermined intervals.

In FIG. 27, at step 1401, the crank angle CA is read in. At step 1403, the target EGR gas supply amount (which corresponds to the degree of opening of the solenoid valves 811 to 814) is calculated in accordance with the engine load condition. Then, at step 1405, the cylinder which is in the intake stroke is determined from the crank angle CA. Further, at step 1407, the cylinders which are to be operated at a rich air-fuel ratio is determined in accordance with the timing diagram in FIG. 19.

At step 1409, it is determined whether the cylinder which is determined as being in the intake stroke at step 1405 is the rich air-fuel ratio cylinder, and if the cylinder is the rich air-fuel ratio cylinder, the routine performs step 1411 to close the solenoid valve connecting the EGR passage 81 to the cylinder in the intake stroke. By doing so, EGR gas is not supplied to the intake ports of the rich air-fuel ratio cylinders. Conversely, if the cylinder which is determined as being in the intake stroke is not the rich air-fuel ratio cylinder, the solenoid valve is opened at the degree of opening calculated by step 1403. Therefore, the calculated amount of EGR gas is supplied to the intake port of the lean air-fuel ratio cylinder.

By the EGR supply control as explained above, the supply of the EGR gas to only the cylinders operated at a rich air-fuel ratio can be stopped and, thereby, the amount of $NO_X$ produced in the rich air-fuel ratio cylinders increases.

Though the EGR passage 81 is connected to the exhaust gas passage 4 downstream of the denitrating catalyst 9 in the embodiments in FIGS. 15 through 18, the EGR passage 81 may be connected other portions of the exhaust gas passage or the exhaust manifold (for example, 131 in FIG. 15).

Further, though the EGR gas supply to the rich air-fuel ratio cylinders is completely stopped in the embodiment in FIGS. 15 through 18, the amount of $NO_X$ produced by the rich air-fuel ratio cylinder can be increased if the amount of EGR gas supplied to the rich air-fuel ratio cylinders is reduced. Further, when the exhaust gas containing a large amount of $NO_X$ is recirculated to the cylinders, the amount of $NO_X$ produced by combustion decreases to keep the reaction in equilibrium. Therefore, it is preferable to recirculate the exhaust gas containing smaller amount of $NO_X$ by, for example, connecting the EGR passage 81 to the exhaust gas passage 4 downstream of the denitrating catalyst 9.

Though the present invention has been described with reference to specific embodiments selected for the purpose of illustration, it should be understood that numerous modifications could be applied by those skilled in the art without departing from the basic concept and scope of the present invention. For example, instead of denitrating catalyst 9 in the embodiment explained in FIGS. 1 through 27, a $NO_X$ reducing catalyst which is capable of selectively reducing $NO_X$ even in an oxidizing atmosphere may be disposed on the exhaust gas passage 4.

The $NO_X$ reducing catalyst has a substrate made of, for example, zeolite ZSM-5, and metals such as copper Cu and iron Fe are attached there to by an ion exchange method. Alternatively, a substrate made of zeolite such as mordenite and precious metal such as platinum Pt attached thereon can also be used as the $NO_X$ reducing catalyst. The $NO_X$ reducing catalyst traps $NH_3$, HC and CO components in the exhaust gas in the pores of the porous zeolite, and selectively reduces the $NO_X$ in the exhaust gas using these trapped components even in an oxidizing atmosphere. Therefore, by disposing the $NO_X$ reducing catalyst instead of the denitrating catalyst 9, $NO_X$ in the exhaust gas can be reduced using the $NH_3$ produced by the three-way catalyst 5.

We claim:

1. An exhaust gas purification device for an internal combustion engine comprising:

conversion means for converting, when the air-fuel ratio of exhaust gas supplied to the conversion means is rich, at least a portion of $NO_X$ contained in the exhaust gas to $NH_3$;

$NO_X$ purification means disposed in an exhaust gas passage of the engine for causing the $NO_X$ in the exhaust gas to react with the $NH_3$ produced by the conversion means and for causing the $NO_X$ to be reduced to $N_2$ by the $NH_3$; and $NO_X$ increasing means for adjusting an air-fuel ratio of the exhaust gas supplied to the conversion means to a rich air-fuel ratio and, at the same time, increasing a concentration of $NO_X$ in the exhaust gas supplied to the conversion means to a value higher than a normal concentration of $NO_X$ in the exhaust gas of the engine, the normal concentration of $NO_X$ being defined as a concentration of $NO_X$ when the engine is operated at an air-fuel ratio the same as that of the exhaust gas adjusted by the $NO_X$ increasing means.

2. A device according to claim 1, wherein the engine includes a plurality of cylinders and wherein at least one of the cylinders of the engine is operated at a rich air-fuel ratio and at least one of the cylinders of the engine is, at the same time, be operated at a lean air-fuel ratio, and wherein the $NO_X$ increasing means comprises mixing means for mixing exhaust gas from the at least one rich air-fuel ratio cylinder and exhaust gas from the at least one lean air-fuel ratio cylinder to form a rich air-fuel ratio exhaust gas mixture to be supplied to the conversion means.

3. A device according to claim 2, wherein the mixing means mixes the exhaust gas from the at least one rich air-fuel ratio cylinder and the exhaust gas from the at least one lean air-fuel ratio cylinder in such a manner that the air-fuel ratio of the exhaust gas mixture becomes a predetermined rich air-fuel ratio at which an amount of $NO_X$ converted to $NH_3$ by the conversion means is a maximum amount.

4. A device according to claim 3, wherein engine sequentially changes the at least one cylinder to be operated at a rich air-fuel ratio.

5. A device according to claim 2, wherein the $NO_X$ increasing means further comprises $NO_X$ estimating means for estimating an amount of $NO_X$ in the exhaust gas flowing into the $NO_X$ purification means and the mixing means comprises a mixing control means for adjusting an amount of exhaust gas from the at least one lean air-fuel ratio cylinder included in the exhaust gas mixture in accordance with the amount of the $NO_X$ estimated by the $NO_X$ estimating means.

6. A device according to claim 1, wherein the engine is a multi-cylinder lean burn engine in which, under predetermined operating conditions, at least one of the cylinders is operated at a rich air-fuel ratio, and wherein the $NO_X$ increasing means comprises $NO_X$ production promoting means for increasing an amount of $NO_X$ produced in the at least one rich air-fuel ratio cylinders and supplies the $NO_X$-enriched exhaust gas from the at least one rich air-fuel ratio cylinder to the conversion means.

7. A device according to claim 6, wherein the $NO_X$ production promoting means increases the amount of $NO_X$ produced in the rich air-fuel ratio cylinders by raising a combustion temperature in the at least one rich air-fuel ratio cylinder.

8. A device according to claim 6, wherein the $NO_X$ production promoting means increases the amount of $NO_X$ produced in the at least one rich air-fuel ratio cylinder by advancing an ignition timing of the at least one rich air-fuel ratio cylinder to a timing earlier than an optimum ignition timing.

9. A device according to claim 6, wherein the engine comprises an EGR device for recirculating a part of the exhaust gas of the engine into the cylinders and wherein the $NO_X$ production promoting means increases the amount of $NO_X$ produced in the at least one rich air-fuel ratio cylinders by decreasing an amount of exhaust gas recirculated into the at least one rich air-fuel ratio cylinder.

10. A device according to claim 6, wherein the $NO_X$ production promoting means increases the amount of $NO_X$ produced in the at least one rich air-fuel ratio cylinder by increasing a compression ratio of the at least one rich air-fuel ratio cylinder.

11. A device according to claim 10, wherein the $NO_X$ production promoting means further comprises means for lowering a wall temperature of a combustion chamber of the at least one rich air-fuel ratio cylinder.

12. A device according to claim 6, wherein the $NO_X$ production promoting means increases the amount of $NO_X$ produced in the at least one rich air-fuel ratio cylinder by supplying a material which, when burned, increases an amount of $NO_X$ in the exhaust gas.

13. A device according to claim 12, wherein the material contains at least one substance selected from benzene, toluene, xylene and styrene.

14. A device according to claim 1, wherein the conversion means comprises a three-way catalyst.

15. A device according to claim 1, wherein the $NO_X$ purification means comprises a denitrating catalyst.

* * * * *